US007912057B2

(12) United States Patent
Petry et al.

(10) Patent No.: US 7,912,057 B2
(45) Date of Patent: Mar. 22, 2011

(54) CONVERGENCE SUBLAYER FOR USE IN A WIRELESS BROADCASTING SYSTEM

(75) Inventors: Brian D. Petry, San Diego, CA (US); Dennis P. Connors, San Diego, CA (US); Gene W. Marsh, Del Mar, CA (US); Srikanth Gummadi, San Diego, CA (US); Keerthi S. Govind, San Diego, CA (US); William S. Burchill, San Diego, CA (US); Seema Madan, San Diego, CA (US)

(73) Assignee: Wi-LAN Inc., Ottawa, Ontario, CA (US)

( * ) Notice: Subject to any disclaimer, the term of this patent is extended or adjusted under 35 U.S.C. 154(b) by 397 days.

(21) Appl. No.: 11/623,034

(22) Filed: Jan. 12, 2007

(65) Prior Publication Data
US 2008/0170531 A1 Jul. 17, 2008

(51) Int. Cl.
*H04L 12/28* (2006.01)
(52) U.S. Cl. ...................................... 370/390
(58) Field of Classification Search .................. None
See application file for complete search history.

(56) References Cited

U.S. PATENT DOCUMENTS

| | | | |
|---|---|---|---|
| 5,452,288 A | 9/1995 | Rahuel et al. | |
| 5,544,198 A | 8/1996 | Saalfrank et al. | |
| 5,659,685 A | 8/1997 | Williams et al. | |
| 5,740,534 A | 4/1998 | Ayerst et al. | |
| 5,867,791 A | 2/1999 | Chambert | |
| 5,892,910 A * | 4/1999 | Safadi | 709/217 |
| 6,009,325 A | 12/1999 | Retzer et al. | |
| 6,112,100 A | 8/2000 | Ossoinig et al. | |
| 6,172,988 B1 * | 1/2001 | Tiernan et al. | 370/473 |
| 6,192,038 B1 | 2/2001 | Wallerius et al. | |
| 6,212,190 B1 | 4/2001 | Mulligan et al. | |
| 6,502,131 B1 | 12/2002 | Vaid et al. | |
| 6,628,638 B1 | 9/2003 | Sato et al. | |
| 6,847,826 B1 | 1/2005 | Wesby et al. | |
| 6,898,640 B1 | 5/2005 | Kurita et al. | |
| 7,058,407 B2 | 6/2006 | Chi et al. | |
| 7,099,348 B1 | 8/2006 | Warwick et al. | |
| 7,283,817 B2 | 10/2007 | Salo et al. | |
| 7,324,832 B2 | 1/2008 | Van Rooyen | |
| 7,362,735 B2 | 4/2008 | Mantha | |
| 7,450,899 B2 | 11/2008 | Roberts et al. | |
| 2001/0030956 A1 | 10/2001 | Chillariga et al. | |
| 2002/0061012 A1 * | 5/2002 | Thi et al. | 370/352 |
| 2002/0086691 A1 | 7/2002 | Kostic et al. | |
| 2002/0138560 A1 | 9/2002 | Aaltonen et al. | |
| 2003/0002474 A1 | 1/2003 | Alexander et al. | |
| 2003/0072255 A1 | 4/2003 | Ma et al. | |
| 2003/0095513 A1 | 5/2003 | Woodmansee et al. | |
| 2004/0017777 A1 | 1/2004 | Chaudhuri et al. | |
| 2004/0141502 A1 | 7/2004 | Corson et al. | |
| 2004/0153767 A1 | 8/2004 | Dolgonos | |
| 2005/0090235 A1 | 4/2005 | Vermola et al. | |
| 2005/0117070 A1 | 6/2005 | Wu et al. | |
| 2005/0130661 A1 | 6/2005 | Aerrabotu et al. | |
| 2005/0286408 A1 | 12/2005 | Jin et al. | |
| 2006/0039285 A1 | 2/2006 | Chapman et al. | |
| 2006/0079224 A1 | 4/2006 | Welnick et al. | |
| 2006/0088023 A1 | 4/2006 | Muller | |
| 2006/0128426 A1 | 6/2006 | Van Rooyen | |
| 2006/0153147 A1 | 7/2006 | Chillariga et al. | |
| 2006/0153232 A1 * | 7/2006 | Shvodian | 370/468 |
| 2006/0205406 A1 | 9/2006 | Pekonen et al. | |
| 2006/0233359 A1 | 10/2006 | Jung et al. | |
| 2006/0246890 A1 | 11/2006 | Yasuda et al. | |
| 2006/0262744 A1 | 11/2006 | Xu et al. | |
| 2006/0262751 A1 | 11/2006 | Vermola et al. | |
| 2006/0262793 A1 | 11/2006 | Vare et al. | |
| 2006/0268673 A1 | 11/2006 | Roh et al. | |
| 2006/0285508 A1 | 12/2006 | Vermola et al. | |
| 2007/0026866 A1 | 2/2007 | Krishnamurthi et al. | |
| 2007/0165104 A1 * | 7/2007 | Khan et al. | 348/14.02 |
| 2007/0171910 A1 | 7/2007 | Kumar | |
| 2007/0223612 A1 | 9/2007 | Simon | |
| 2007/0240188 A1 | 10/2007 | Vermola et al. | |
| 2007/0249380 A1 | 10/2007 | Stewart et al. | |
| 2008/0037460 A1 | 2/2008 | Venkatachalam | |

(Continued)

FOREIGN PATENT DOCUMENTS

EP 1 237 371 9/2002

(Continued)

OTHER PUBLICATIONS

Wang et al., "System Architecture and Cross-Layer Optimization of Video Broadcast over WiMAX", IEEE Journal on Selected Areas in Communications, vol. 25, No. 4, May 2007, pp. 712-721.
Faria et al., "DVB-H: Digital Broadcast Services to Handheld Devices", Proceedings of the IEEE, vol. 94, No. 1, Jan. 2006, pp. 194-209.
"Mobile WiMAX—Part 1: A Technical Overview and Performance Evaluation", WiMAX Forum, Aug. 2006, pp. 1-53.
"Mobile WiMAX—Part II: A Comparative Analysis", WiMAX Forum, May 2006, pp. 1-47.
IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands. and Corrigendum 1, IEEE Computer Society and the IEEE Microwave Theory and Techniques Society, IEEE Std 802.16e—2005 and IEEE Std 802.16—2004/Cor1-2005, Feb. 28, 2006.

(Continued)

*Primary Examiner* — Chirag G Shah
*Assistant Examiner* — Otis L Thompson, Jr.
(74) *Attorney, Agent, or Firm* — Volpe and Koenig, P.C.

(57) ABSTRACT

A wireless broadcast system includes receiving a data a stream by a convergence module. The convergence module partitions and encapsulates the transport packets into MAC protocol data units such that a size dimension of the encapsulated transport packets matches a size dimension of the MAC protocol data units. The MAC protocol data units are then provided to a transmitter that is synchronized to a plurality of transmitters in a single frequency network so that each transmitter in the network broadcast an identical signal that includes the MAC protocol data unit.

21 Claims, 39 Drawing Sheets

U.S. PATENT DOCUMENTS

| | | |
|---|---|---|
| 2008/0152018 A1 | 6/2008 | Ma et al. |
| 2008/0170529 A1 | 7/2008 | Connors et al. |
| 2008/0170530 A1 | 7/2008 | Connors et al. |
| 2008/0198785 A1 | 8/2008 | Huang |
| 2008/0205322 A1 | 8/2008 | Cai et al. |
| 2009/0028276 A1 | 1/2009 | Van Rooyen |
| 2009/0252070 A1 | 10/2009 | Connors et al. |

FOREIGN PATENT DOCUMENTS

| | | |
|---|---|---|
| EP | 1237371 | 9/2002 |
| EP | 1 594 330 | 11/2005 |
| EP | 1594330 A | 11/2005 |
| JP | 2006-081171 | 3/2006 |
| JP | 2006081171 A | 3/2006 |
| KR | 10-2004-0000953 | 1/2004 |
| KR | 2004-0000953 | 1/2004 |
| KR | 2005-0017046 | 2/2005 |
| KR | 20050017046 A | 2/2005 |
| WO | 01/50782 | 7/2001 |
| WO | 200150782 | 7/2001 |
| WO | 03/030451 | 4/2003 |
| WO | 03-030451 | 4/2003 |
| WO | 03/081938 | 10/2003 |
| WO | 03/081938 A | 10/2003 |
| WO | 2006/047941 | 5/2006 |
| WO | 2006047941 | 5/2006 |
| WO | 2006/099322 | 9/2006 |
| WO | 2006/105010 | 10/2006 |
| WO | 2006/138556 | 12/2006 |

OTHER PUBLICATIONS

IEEE Standard for Local and metropolitan area networks, Part 16: Interface for Fixed Broadband Wireless Access Systems, IEEE Computer Society and the IEEE Microwave Theory and Techniques Society, IEEE Std 802.16, Oct. 1, 2004.

Qualcomm Incorporation, "MediaFlo Technology Overview", 2007,www.qualcomm.com/mediaflo.

Digital Video Broadcasting (DVB); Transmission System for Handheld Terminals (DVB-H), ETSI EN 302 304 V1.1.1 (Nov. 2004) European Standard (Telecommunications series).

Qualcomm Incorporation, "Flo Technology Brief", 2005, www.qualcomm.com/mediaflo.

Qualcomm Incorporation, "MediaFlo System", 2005, www.qualcomm.com/mediaflo.

International Search Report/Written Opinion issued in PCT/US2008/050719 on Jun. 24, 2008.

Partial International Search issued in in PCT/US2008/050369 on Jun. 26, 2008.

International Search Report/Written Opinion issued in PCT/US2008/050302 on Jul. 9, 2008.

International Search Report/Written Opinion issued in PCT/US08/50500 on May 26, 2008.

International Search Report/Written Opinion issued in PCT/US08/50743 on May 13, 2008.

International Search Report/ Written Opinion issued in PCT/US2008/057883 on Jul. 29, 2008.

International Search Report and Written Opinion for PCT/US2008/060517 mailed Aug. 27, 2008.

International Search Report and Written Opinion for PCT/US2008/050365 mailed Sep. 4, 2008.

International Search Report and Written Opinion for PCT/US2008/057875 mailed Aug. 20, 2008.

International Search Report and Written Opinion for PCT/US2008/060518 issued Sep. 4, 2008.

Digital Video Broadcasting (DVB); Transmission System for Handheld Terminals (DVB-H), ETSI EN 302 304 V1.1.1 (Nov. 2004).

"Mobile WiMAX—Part 1: A Technical Overview and Performance Evaluation," WiMAX Forum, pp. 1-53 (Aug. 2006).

"Mobile WiMAX—Part II: A Comparitive Analysis," WiMAX Forum, pp. 1-47 (May 2006).

Faria et al., "DVB-H: Digital Broadcast Services to Handheld Devices," Proceedings of the IEEE, vol. 94, No. 1, pp. 194-209 (Jan. 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e—2005 and IEEE Std. 802.16—2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).

International Search Report and Written Opinion for PCT/US2008/050365 mailed Sep. 4, 2008.

International Search Report and Written Opinion for PCT/US2008/057875 mailed Aug. 20, 2008.

International Search Report and Written Opinion for PCT/US2008/060518 issued Sep. 4, 2008.

International Search Report and Written Opinion for PCT/US2008/060517 mailed Aug. 27, 2008.

International Search Report/Written Opinion issued in PCT/US08/50500 on May 26, 2008.

International Search Report/Written Opinion issued in PCT/US08/50743 on May 13, 2008.

International Search Report/Written Opinion issued in PCT/US2008/057883 on Jul. 29, 2008.

International Search Report/Written Opinion issued in PCT/US2008/050719 on Jun. 24, 2008.

International Search Report/Written Opinion issued in PCT/US2008/050302 on Jul. 9, 2008.

Partial International Search Report issued in PCT/US2008/050369 on Jun. 26, 2008.

Qualcomm Corporation, "Flo Technology Brief," www.qualcomm.com/mediaflo (2005).

Qualcomm Corporation, "MediaFlo System," www.qualcomm.com/mediaflo (2005).

Qualcomm Corporation, "MediaFlo Technology Overview," www.qualcomm.com/mediaflo (2007).

Wang et al., "System Architecture and Cross-Layer Optimization of Video Broadcast over WiMAX," IEEE Journal on Selected Areas in Communication, vol. 25, No. 4, pp. 712-721 (May 2007).

Digital Video Broadcasting (DVB); Transmission System for Handheld Terminals (DVB-H), ETSI EN 302 304 V1.1.1 (Nov. 2004).

"Mobile WiMAX—Part 1: A Technical Overview and Performance Evaluation," WiMAX Forum, pp. 1-53 (Aug. 2006).

"Mobile WiMAX—Part II: A Comparitive Analysis," WiMAX Forum, pp. 1-47 (May 2006).

Faria et al., "DVB-H: Digital Broadcast Services to Handheld Devices," Proceedings of the IEEE, vol. 94, No. 1, pp. 194-209 (Jan. 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e—2005 and IEEE Std. 802.16—2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).

International Search Report and Written Opinion for PCT/US2008/050365 mailed Sep. 4, 2008.

International Search Report and Written Opinion for PCT/US2008/057875 mailed Aug. 20, 2008.

International Search Report and Written Opinion for PCT/US2008/060518 issued Sep. 4, 2008.

International Search Report and Written Opinion for PCT/US2008/060517 mailed Aug. 27, 2008.

International Search Report/Written Opinion issued in PCT/US08/50500 on May 26, 2008.

International Search Report/Written Opinion issued in PCT/US08/50743 on May 13, 2008.

International Search Report/Written Opinion issued in PCT/US2008/057883 on Jul. 29, 2008.
International Search Report/Written Opinion issued in PCT/US2008/050719 on Jun. 24, 2008.
International Search Report/Written Opinion issued in PCT/US2008/050302 on Jul. 9, 2008.
Partial International Search Report issued in PCT/US2008/050369 on Jun. 26, 2008.
Qualcomm Corporation, "Flo Technology Brief," www.qualcomm.com/mediaflo (2005).
Qualcomm Corporation, "MediaFlo System," www.qualcomm.com/mediaflo (2005).
Qualcomm Corporation, "MediaFlo Technology Overview," www.qualcomm.com/mediaflo (2007).
Wang et al., "System Architecture and Cross-Layer Optimization of Video Broadcast over WiMAX," IEEE Journal on Selected Areas in Communication, vol. 25, No. 4, pp. 712-721 (May 2007).
Digital Video Broadcasting (DVB); Transmission System for Handheld Terminals (DVB-H), ETSI EN 302 304 V1.1.1 (Nov. 2004).
"Mobile WiMAX—Part 1: A Technical Overview and Performance Evaluation," WiMAX Forum, pp. 1-53 (Aug. 2006).
"Mobile WiMAX—Part II: A Comparitive Analysis," WiMAX Forum, pp. 1-47 (May 2006).
Faria et al., "DVB-H: Digital Broadcast Services to Handheld Devices," Proceedings of the IEEE, vol. 94, No. 1, pp. 194-209 (Jan. 2006).
IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e—2005 and IEEE Std. 802.16—2004/Cor1-2005 (Feb. 28, 2006).
IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).
International Search Report and Written Opinion for PCT/US2008/050365 mailed Sep. 4, 2008.
International Search Report and Written Opinion for PCT/US2008/057875 mailed Aug. 20, 2008.
International Search Report and Written Opinion for PCT/US2008/060518 issued Sep. 4, 2008.
International Search Report and Written Opinion for PCT/US2008/060517 mailed Aug. 27, 2008.
International Search Report/Written Opinion issued in PCT/US08/50500 on May 26, 2008.
International Search Report/Written Opinion issued in PCT/US08/50743 on May 13, 2008.
International Search Report/Written Opinion issued in PCT/US2008/057883 on Jul. 29, 2008.
International Search Report/Written Opinion issued in PCT/US2008/050719 on Jun. 24, 2008.
International Search Report/Written Opinion issued in PCT/US2008/050302 on Jul. 9, 2008.
Partial International Search Report issued in PCT/US2008/050369 on Jun. 26, 2008.
QUALCOMM Corporation, "Flo Technology Brief," www.qualcomm.com/mediaflo (2005).
QUALCOMM Corporation, "MediaFlo System," www.qualcomm.com/mediaflo (2005).
QUALCOMM Corporation, "MediaFlo Technology Overview," www.qualcomm.com/mediaflo (2007).
Wang et al., "System Architecture and Cross-Layer Optimization of Video Broadcast over WiMAX," IEEE Journal on Selected Areas in Communication, vol. 25, No. 4, pp. 712-721 (May 2007).

* cited by examiner

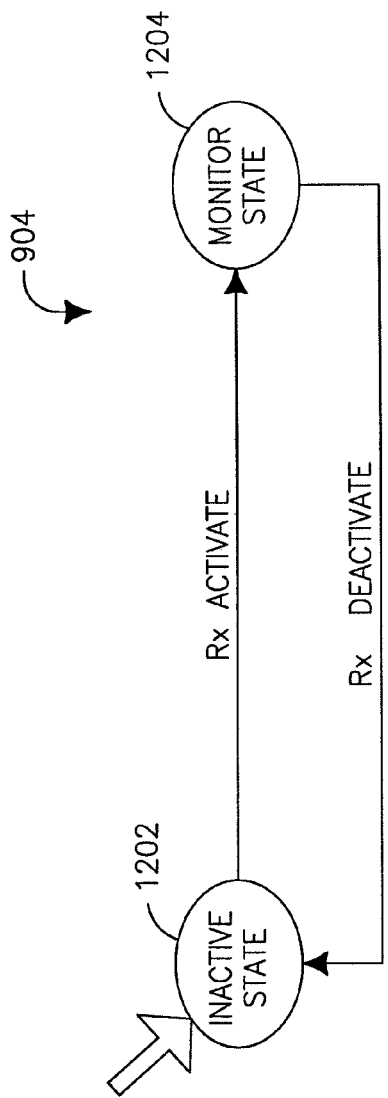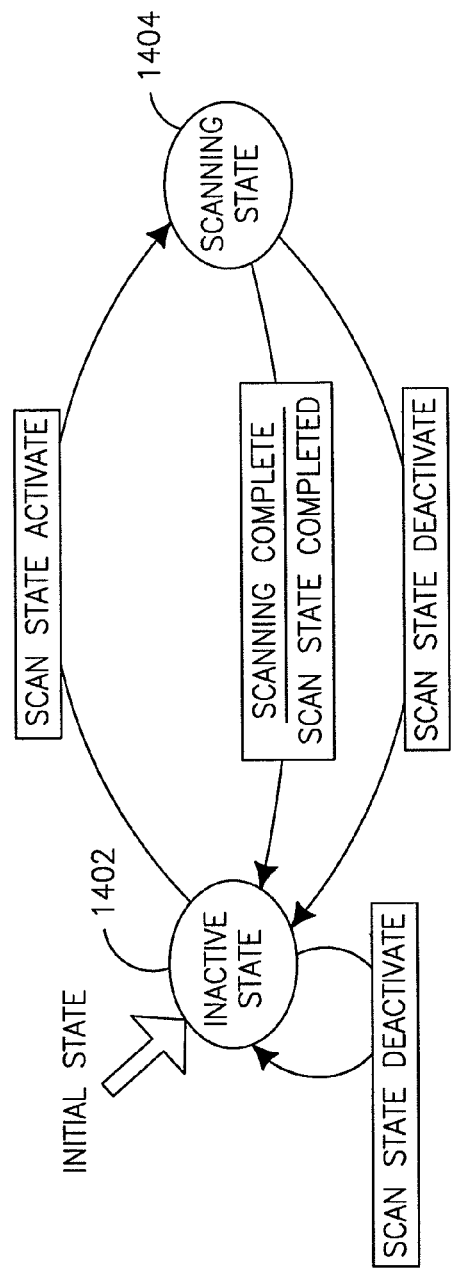

CONVERGENCE SUBLAYER FOR USE IN A WIRELESS BROADCASTING SYSTEM

BACKGROUND

1. Field of the Invention

This invention relates generally to a wireless communication system, and in particular to a wireless broadcast communication system.

2. Background

Broadband wireless communication networks typically have a plurality of servicing base stations which receive and transmit signals to users' devices within the service area of the respective base stations. Communication between a user and their respective base station is maintained as a user moves about the network service area by handing off the user from one base station to another.

Many new services are being offered to customers of wireless communication carriers. One such service is providing customers with multimedia content via the wireless communication network. For example, it is desired to provide audio/video content to customers as they move about the network Providing multimedia content via wireless communication networks presents several challenges. For example, maintaining bi-directional communication with a large group of customers that want to receive the content can utilize large amounts of network resources. In addition, keeping track of the customers as they move about the network and enter and leave the service areas of different base stations, and are "hand-off" to different base stations within the wireless network can consume large amounts of network resources A problem with broadband wireless networks is the lack of a standard air interface (first mile/last mile connection), to allow communication of data packets to and from the different core networks involved. The Institute of Electrical and Electronics Engineers ("IEEE") 802.16 Standard for a wireless air interface (IEEE 802.16 Standard) is one example of a standard protocol for the air interface for a wireless metropolitan area network. To transmit data over a broadband wireless air interface, such as an IEEE 802.16 interface, data conforming to an upper layer application protocol needs to be mapped, or converged, to a protocol of the air interface. While the IEEE 802.16 standard does define several convergence layers, there is a need for new convergence layers. Also, there is a need to reduce the overhead of convergence protocols.

Therefore, there is a need for improved convergence layer systems, apparatus, and techniques for providing content, such as multimedia content, to customers via a wireless communication network.

SUMMARY

The present invention includes methods, apparatuses, and systems as described in the written description and claims. In one example, content is collected for distribution over a wireless communication network. The content can include multimedia data, such as audio/video data, movies, game, audio broadcasts, television network programs, or other types of multimedia content. The content is accumulated and encapsulated into a data stream that is ruggedized for broadcast over a wireless communication channel.

In one embodiment of broadcasting data a stream of content is received by a convergence module. The convergence module partitions and encapsulates the transport packets into MAC Common Part Sublayer, or MAC, protocol data units such that a size dimension of the encapsulated transport packets matches a size dimension of the MAC protocol data units. The MAC protocol data units are then provided to a transmitter that is synchronized to a plurality of transmitters in a single frequency network so that each transmitter in the network broadcasts an identical signal that includes the MAC protocol data unit.

In another embodiment, a convergence sublayer in a transmitter, or base station, receives a stream of transport packets. The convergence sublayer partitions and encapsulates the transport packets into an intermediary packet format to create intermediary packets such that a size dimension of the intermediary packet matches a size dimension of a MAC protocol data unit. A MAC common part sublayer encapsulates the intermediary packets into MAC protocol data packets such that the intermediary packets are mot fragmented. The MAC protocol data units are provided to a transmitter that is synchronized to a plurality of transmitters in a single frequency networks so that each transmitter in the network broadcast an identical signal that includes the MAC protocol data units.

In an embodiment of encapsulating data, a stream of transport data packets are received. The received stream of data packets are formatted in accordance with a first protocol. Information identifying a size dimension of a data packet in a second protocol is received. The stream of data packets are then encapsulated and sized to match the size dimension of the data packets in the second protocol, and to form a stream of data packets formatted in accordance with the second protocol. The stream of data packets formatted in accordance with the second protocol are provided to a transmitter that is synchronized to a plurality of transmitters in a single frequency network so that each transmitter in the network broadcasts an identical signal that includes the stream of data packets formatted in accordance with the second protocol.

An embodiment of a transmitter system includes a first protocol module configured to receive data packets formatted in accordance with a first protocol. The system also includes a second protocol module configured to receive data packets formatted in accordance with a second protocol. The first protocol module receives information about a size dimension of data packet sizes of the second protocol module and partitions the data packets formatted in accordance with the first protocol standard to match the size dimension of the data packets of the second protocol standard.

In the above embodiments, the size dimension of the data packets can be predetermined, or the size dimension can be provided. For example, a lower level MAC module may provide the size dimension to a convergence layer module.

In one embodiment the signal transmitted is an orthogonal frequency division multiplexed (OFDM) signal. The signal transmitted can also include error correction information. For example, when the content is encapsulated, forward error correction information can be included with the content to improve the robustness of the transmitted signal.

In one embodiment, the content is encoded as digital video broadcast for handheld (DVB-H) data. This data is encoded and transmitted as an OFDM signal in a single frequency network using techniques similar to transmission techniques developed by the Institute of Electrical and Electronics Engineers (IEEE) standard 802.16 and the Worldwide Interoperability for Microwave Access (WiMAX) forum. For example, a DVB-H MAC layer output, such as a Multiprotocol Encapsulated (MPE) MPEG-2 TS can by input to WiMAX MAC and PHY layer using OFDM to broadcast Other features and advantages of the present invention should be apparent after reviewing the following detailed description and accompanying drawings which illustrate, by way of example, aspects of the invention.

BRIEF DESCRIPTION OF THE DRAWINGS

These and other aspects, advantages and details of the present invention, both as to its structure and operation, may be gleaned in part by a study of the accompanying exemplary drawings, in which like reference numerals refer to like parts. The drawings are not necessarily to scale, emphasis instead being placed upon illustrating the principles of the invention.

FIG. 12 is a state diagram illustrating operating states for a module operating in accordance with the persistent state protocol of the air link management protocol of FIG. 9.

FIG. 14 is a state diagram illustrating aspects of processing according to the scan state protocol of the air link management protocol of FIG. 9.

DETAILED DESCRIPTION

Figure 1:
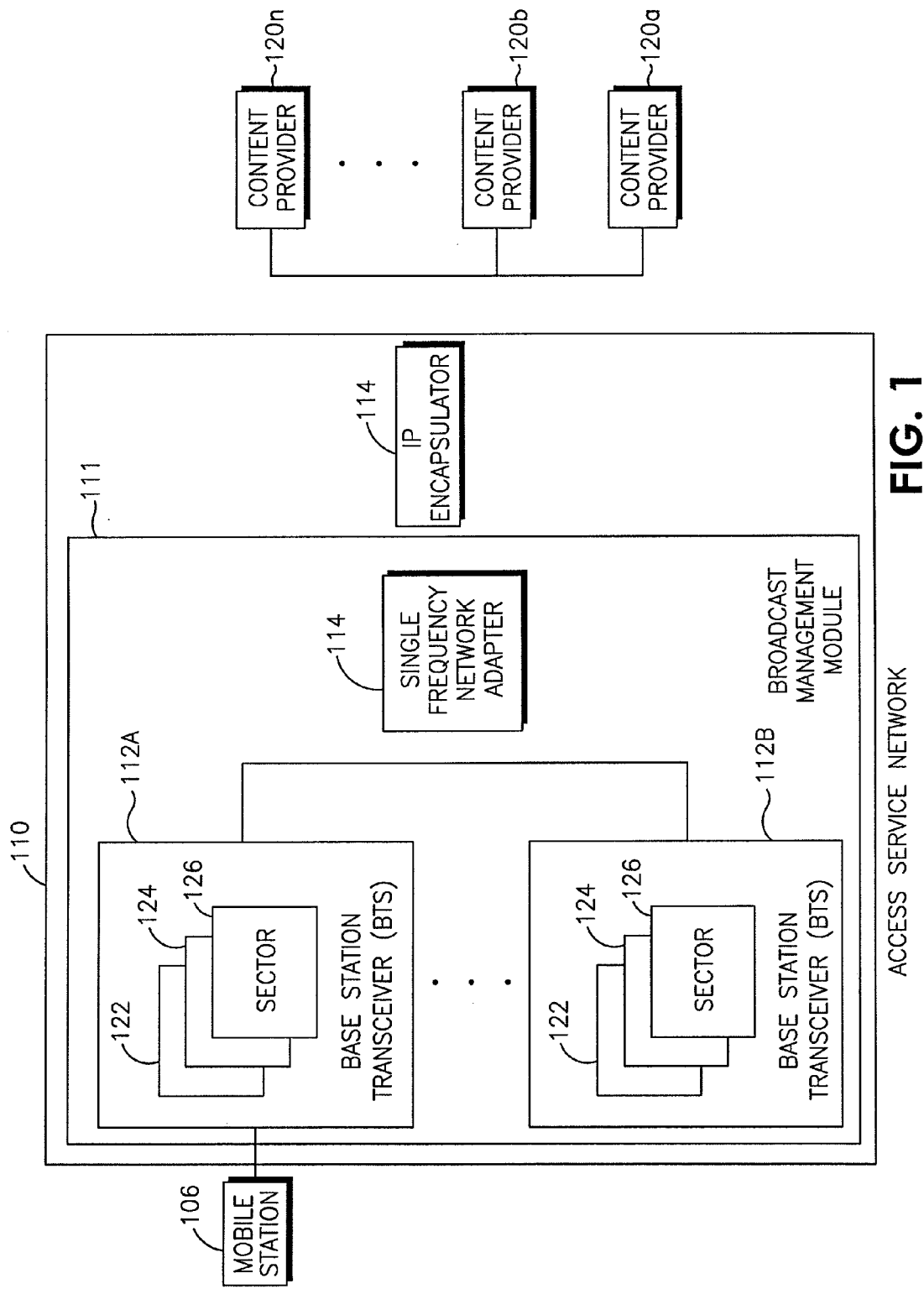
FIG. 1 is a block diagram of a communication network for a broadcast service network according to an exemplary embodiment of the invention.

Certain embodiments as disclosed herein provide for methods and systems for communication over a broadband wireless air interface. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

In one embodiment, the system described is a broadcast only system. In other words, data is unidirectionally transmitted from base stations in a wireless network infrastructure to mobile stations in the network, and there is no communication from the mobile stations back to the base stations. In the description that follows broadcast systems are also referred to as data-casting systems. Because the base stations are broadcast only, there is no limitation on the number of mobile stations receiving the base stations' signal. Also, because there is no communication from the mobile stations back to the base stations, the base stations do not need to communicate to each other to monitor when a mobile station is going to leave one base station's coverage area and enter another base station's coverage area.

In one embodiment, multiple base stations in a single frequency network (SFN) covering a particular geographic region are synchronized and transmit an identical signal at the same time. Because all of the base stations in a single frequency network transmit the same signal and are synchronized, mobile stations within the single frequency network receive the same signal from any base station, or multiple base stations, within the single frequency network and thereby provide a form of macro-diversity. As a mobile station moves about the SFN and leaves the coverage area of one base station and enters the coverage area of another base station, there is no "handoff" the mobile station simply begins receiving the same signal that originated from a different base station. In addition, the mobile station can combine signals it receives that originated from multiple base stations, thereby benefiting from macro-diversity.

All of the base stations within a single frequency network simultaneously transmit the same signal or waveform. In certain types of known wireless communication networks, data is transmitted in "frames" that can use different modulation schemes and different coding rates for data contained within each frame. In addition, frames transmitted by one base station in such a known network will be different than frames transmitted by other base stations in the network, because each base station transmits different data and can be using different modulation schemes and coding rates. Also, in these known networks, different modulation schemes and coding rates can be used, for example, to provide different quality of service (QoS) to different users, and the modulation and coding rates can be changed from frame to frame in response to the changing requirements of users of the communication network. In contrast to such known networks, in the exemplary broadcast system of the present invention described above, all of the base stations in a single frequency network transmit the same data synchronously, with the same modulation scheme and the same coding rate, resulting in the same signal being broadcast from all base stations. In this way, a mobile station can receive transmissions from any of the base stations in the single frequency network and combine them to improve operation of the mobile station as it moves about within the network.

The unidirectional broadcast system described herein offers advantages over conventional two-way communication systems, such as two-way systems based on the IEEE 802.16 standard, for delivering content to multiple receiving devices simultaneously. One such advantage is that the broadcast system of the present invention may be able to make use of certain portions of the RF spectrum that are inefficient for conventional two-way communication systems. For example, the RF spectrum has been divided into various portions that are allocated for different uses, and there are regulations about the level of RF emissions a device may radiate into adjacent portions of the spectrum. Various techniques have been developed to comply with these regulations. One technique is to filter the RF transmission by a device, but filtering can require additional components that increase the size and power consumption of devices. Increased size and power consumption may make it impractical to install sufficient filtering in a mobile device. In the broadcast system of the present invention, the base stations that transmit the broadcast signal can support the filter size and power consumption, and because the mobile devices do not transmit up to the base stations in this broadcast system, they do not require any transmit filtering. In this way, portions of the spectrum that may be practically unusable, or difficult to use, for two-way communication systems can be efficiently used for the unidirectional broadcast system of the present invention.

In one embodiment, content is encoded as digital video broadcast for handheld (DVB-H) data. This data is encoded and transmitted as an OFDM signal in a single frequency network using techniques similar to techniques developed by the Institute of Electrical and Electronics Engineers (IEEE) standard 802.16 and the Worldwide Interoperability for Microwave Access (WiMAX) forum. For example, a DVB-H MAC layer output, such as a Multiprotocol Encapsulated (MPE) MPEG-2 TS can by input to WiMAX MAC and PHY layer using OFDM to broadcast Orthogonal Frequency Division Multiplexed (OFDMA) or Orthogonal Frequency Division Multiple Access (OFDMA), jointly referred to as OFDM. FIG. 1 is a block diagram of a communication network for a broadcast service network, according to one embodiment of the invention. As shown in FIG. 1, the network includes a mobile station (MS) 106 and an access service network 110. In FIG. 1, only one MS 106 is shown, but there would typically be many MSs 106. In the following description the receiving station is referred to as a mobile station, but the receiving station may be mobile or it may be stationary.

The access network 110 includes a broadcast management module 111 and an encapsulator 116. The encapsulator 116 can encapsulate many different data protocols, for example, in one embodiment the encapsulator can be an IP encapsulator. The broadcast management module 111 includes at least one base station transceiver (BTS), or base station (BS), 112a and 112b, and a single frequency network adapter 114. The access network 110 also includes an IP encapsulator 116. In the example of FIG. 1, two BSs 112a and 112b are shown, but any desired number of BSs may be included within the access network 110. The BS's within the access network 110 transmit using a same frequency band and thereby render access network 110 a single frequency network (SFN). In communication with the access service network 110 is at least one content provider 120a. Typically there would be a plurality of content providers 120a-120n in communication with the access service network 110.

The content providers 120a-120n provide content to the access service network 110. The content may include, for example, a digital form of audio, video, graphics, multimedia, movies, or other forms of content. Content from the content providers 12a-120n is received by the IP encapsulator 116 in the access service network 110. The IP encapsulator 116 collects the content, or data, and ruggedize the data for transmission over a wireless communication link. The IP encapsulator 116 may, for example, perform channel coding and time slicing of the content. The IP encapsulator 116 may also add information about the content to the data. The IP encapsulator 116 then provides the ruggedized data to the single frequency network adapter 114 for distribution to the various base stations.

The single frequency network adapter 114 receives the ruggedized data from the IP encapsulator 116 and schedules it for broadcast over the air by the BSs 112 within access network 110. Scheduling of the data for broadcast from multiple BSs 112a and 112b includes synchronizing the broadcasts from the multiple BSs 112. As explained further below, multiple BS 112a and 112b transmit the same data at the same time so that a MS 106 can receive the same signal from multiple BSs 112a and 112b.

Data from the single frequency network adapter 114 is communicated to the BS's 112a and 112b for broadcast over the air. The BSs 112a and 112b may broadcast signals into the coverage area of the base station that has been divided into one or more sectors. For example, in the example of FIG. 1, a first BS 112a includes a broadcast coverage area that is divided into three sectors 122, 124, and 126. Use of sectors can provide improved performance over a non-sectorized BS, including multipath diversity within areas of overlapping sectors, as well as broadcasting more energy into individual sectors that a corresponding omni-directional antenna.

In one embodiment, there is no direct interface or communication between the BS's 112a and 112b within the access service network 110. As described further below, because all of the base stations transmit the same signals at the same time, there is no need for the BS's to have knowledge of which MS 106 are within their respective coverage area. In other words, because the BSs are broadcast only, and they transmit the same signal at the same time, a MS 106 can receive signals from any of the BS without differentiating which BS the signal originated from. In addition, the MS 106 can receive signals from multiple, different BSs and combine those signals as multiple instances of the same signal.

Figure 2:
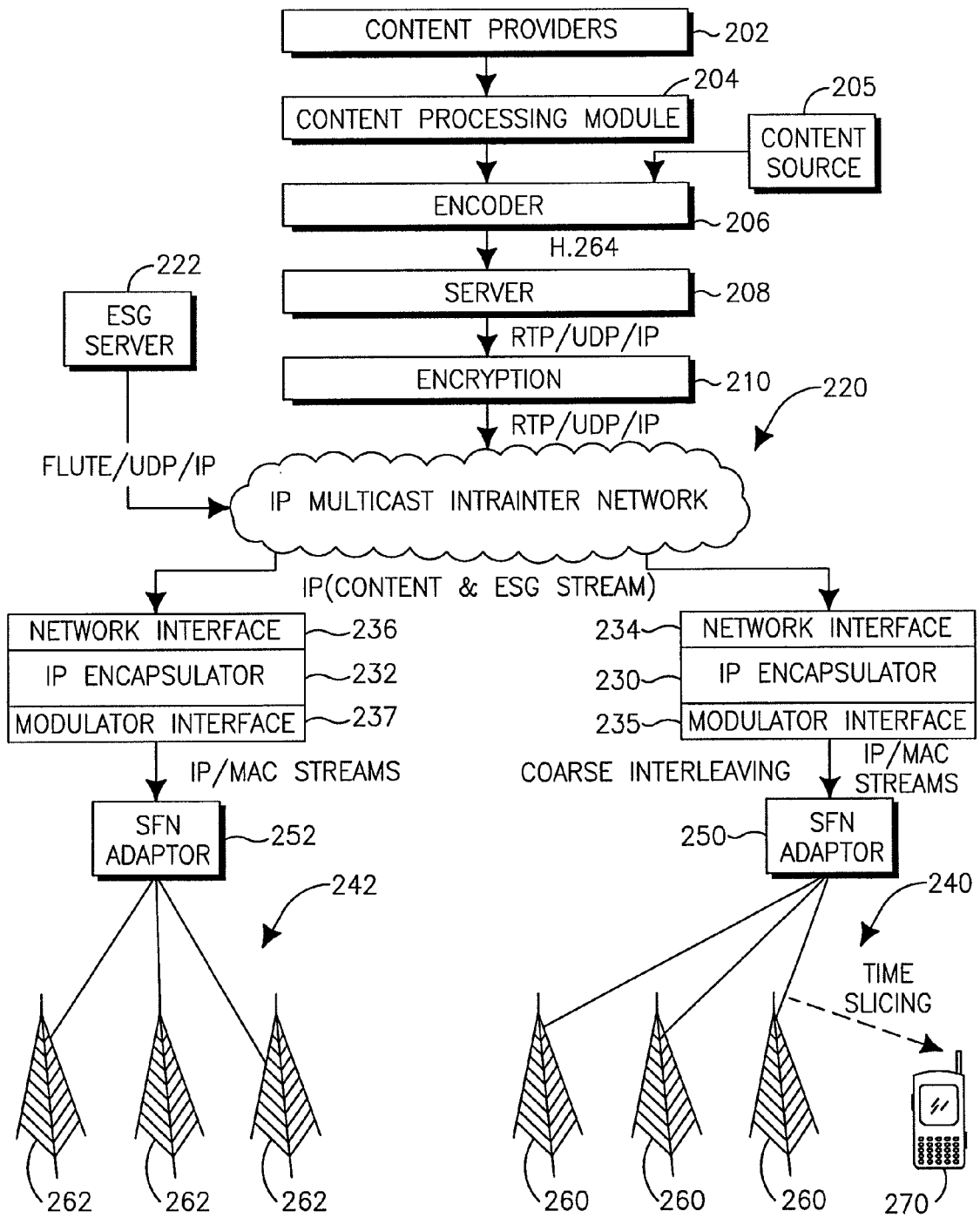
FIG. 2 is a block diagram illustrating further detail of an example broadcast communication network according to an exemplary embodiment of the invention.

FIG. 2 is a block diagram illustrating further detail of an example broadcast communication network. Content providers 202 distribute content to a content processing module 204. The content distributed by the content providers can be various digital forms of audio, video, multimedia, and other forms of content. The content can be, for example, audio/video streams, motion picture expert group-2 (MPEG-2), MPEG-4, windows media video (WMV), stored data files, meta-data, and other formats. The content processing module 204 receives the various content, processes it, and outputs streaming media for each content using, for example, real time streaming protocol, real-time protocol, Internet Protocol (RTSP/RTP/IP).

In one embodiment, the media from the content processing module 206 is communicated to an encoder/transcoder module 206 that encodes the media into an encoding-standard compatible stream, such as the H.264 encoding standard. For example, the media content can be encoded using H.264, also known as MPEG-4, Part 10. The encoded rate for the combined audio and video may be approximately 300 to 400 kb/s. In another embodiment, content can be provided by other sources 295. For example, in one embodiment "raw" media content, such as raw audio/video data is communicated to the encoder/transcoder 206. In this embodiment, the encoder/transcoder 206 acts as a source encoder to encode the media. In still another embodiment, media previously encoded can be communicated to the encoder/transcoder 206 where the media is transcoded into a desired format. For example, media that has already been encoded into one format can be received from a content source 205 and transcoded into a desired different encoding format.

The encoded media can be, for example, further encapsulated using the Real-Time Protocol (RTP), the User Datagram Protocol (UDP), and the Internet Protocol (IP). The payload of the encoder module 206 is communicated to a server 208 where it is transmitted as an RTP/UDP/IP stream. The RTP/UDP/IP stream is communicated to an IP encryption module 210 that encrypts the stream and communicates it to an IP multicast intra/inter network 220. The IP multicast intra/inter network 220 also receives electronic service guide (ESG) information about the various content from an ESG server 222. The IP multicast intra/inter network 220 can be a private network, or a virtual private network, or a public network such as the Internet. In this regard, the IP encryption module 210 can optionally be provided at another location in the system, such as at or just after encoder 206, or at or just before IP Encapsulators 230 and 232, depending on the security level of IP multicast intra/inter network 220, among other factors.

Encrypted content and ESG data is streamed via the IP multicast intra/inter network 220 to IP encapsulator modules 230 and 232. In the example of FIG. 2, two IP encapsulators 230 and 232 are illustrated, but in other embodiments of the broadcast system there could be more than two IP encapsulators in which each IP encapsulator serves a single SFN, or there could be a single IP encapsulator which serves multiple SFNs. Each IP encapsulator is included within a single frequency network, e.g., 240 and 242.

The IP encapsulators 230 and 232 receive the IP stream from the IP multicast intra/inter network 220 at a network interface 234, 236. As described further below, the IP encapsulators 230 and 232 process the IP streams and output IP/MAC (Media Access Control) streams at a modulator interface 235, 237. The IP/MAC streams are communicated to SFN adapter modules 250 and 252 each of which distributes the IP/MAC streams to one or more BS's in a synchronized manner. The output of the SFN adapters 250 and 252 are communicated to a plurality of BS's, 260 and 262 within each respective SFN. Accordingly, an MS 270 can move about within a coverage area of a SFN 240 and receive broadcast signals from any, or multiple, BS's 260 within the SFN. An SFN is a collection of base stations, all operating at the same modulation scheme and coding rate, and all transmitting the same signal synchronously on a same frequency band.

Returning now to the IP encapsulator modules 230 and 232, as described further below, an IP encapsulator receives a finely interleaved IP stream from the multicast intra/inter network 220 on its network interface 234 and 236 and produces coarsely interleaved IP/MAC streams on its modulator interface 235 and 237. In one embodiment, an IP/MAC stream is a stream of MPEG-2 Transport Stream (TS) packets, that have been further encapsulated using Multi-Protocol Encapsulation with Forward Error Correction (MPE-FEC). The encapsulation process using MPE-FEC places IP packets into an interleaving array indexed by the IP source/destination address information (i.e. multiple IP streams arriving from the IP network are demultiplexed into buffers, with these buffers serving as interleaving arrays). In one embodiment, the IP encapsulator will compute a Reed-Solomon parity sequence on the IP packets placed in the interleaving array. Both the IP packets and the Reed-Solomon parity information are encapsulated into MPEG-2 sections. These sections may be further fragmented and encapsulated into MPEG-2 transport streams (TS) of packets. Of course, it can be appreciated that other forms and protocols of encoding, encapsulation and interleaving can be used to form the streams without departing from the scope of the invention.

In one embodiment, the content streams can be coarsely interleaved to allow for a power savings mechanism at the MS, referred to as time-slicing that is described in further detail below. In an embodiment, finely interleaved content, for example IP encoded content, is received and buffered, and then the buffered content is rearranged into coarsely interleaved content. For example, buffering at the IP encapsulator enables seconds worth of IP packets corresponding to a particular content ("program") to be received in a continuous, or nearly continuous, stream via the network interface. This buffered data can then be encapsulated and channel coded using MPE-FEC and sent all at once, creating a coarsely interleaved IP/MAC stream. Using this technique, the TS packets emerging from the modulator interface of the IP encapsulator are coarsely interleaved, with one "program" being the only packets sent for hundreds of milliseconds, followed by a lengthy set of packets for another program. A program can be considered, for example, a collection of IP/MAC streams that are meant to be rendered jointly at the MS (e.g. a television program's audio, video, and teletext) to deliver a particular content. This coarse interleaving allows a mobile station's receiver to power on and receive desired packets for a particular program, and then reduce power by not receiving the packets that are transmitted which belong to programs which are not wanted by that mobile station. This time slicing functionality can result in a significant power savings at the mobile station.

As mentioned above, the IP/MAC streams are forwarded by the IP Encapsulators 230 and 232, via SFN Adapters 250 and 252, to a modulator at each of the base stations 260 and 262 that make up the single frequency networks. Within each SFN, all of the BS modulators are time synchronized. So, when the IP/MAC streams are received at the modulators within a given SFN, the fact that the information to be transmitted is identical, coupled with the modulators being time synchronized, causes the signals emitted from all modulators in the SFN to be the same, or nearly the same.

At the MS, the IP/MAC streams must be received by the mobile station's application layer and interpreted. The application in the MS will interpret service information (SI) that is included in the IP/MAC streams and, along with the electronic service guide (ESG), will determine what content is available in the aggregate IP/MAC stream. This will be presented to the user in the form of an electronic program guide (EPG). This allows the user to select which IP/MAC streams he desires, subsequently allowing his receiver to capture, demodulate and forward only the selected content up to the application layer.

Figure 3:
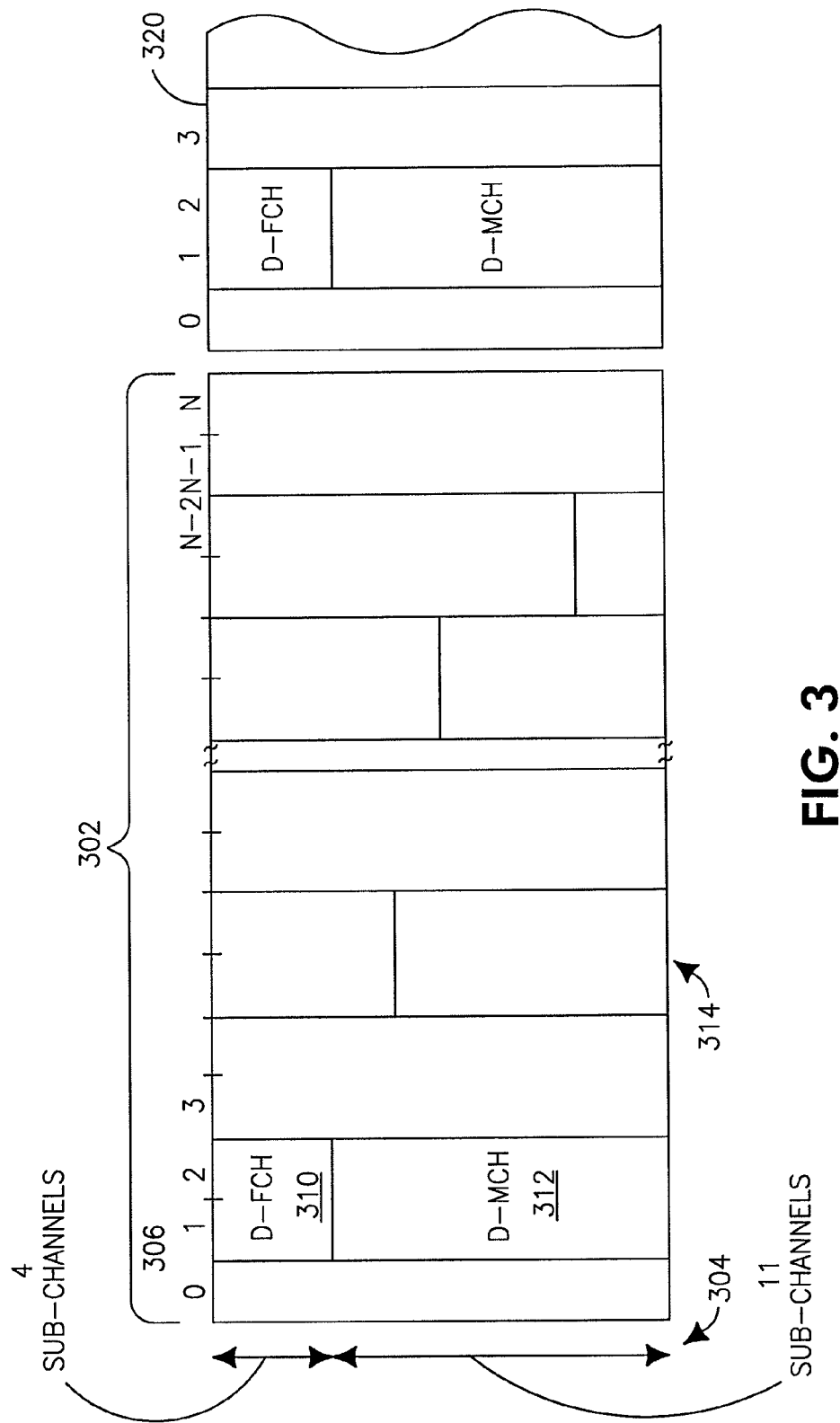
FIG. 3 is a diagram illustrating a frame structure such as can be used in the broadcast system according to an exemplary embodiment of the invention.

FIG. 3 is a diagram illustrating a frame structure such as can be used in the broadcast system according to one embodiment of the present invention. As illustrated in FIG. 3, the frame 302 structure is divided into multiple sub-channels 304 (the vertical axis in FIG. 3), with each sub-channel using a carrier frequency that is orthogonal to carrier frequencies of other sub-channels. The frame 302 is also divided in time into symbol periods 306 (the horizontal axis in FIG. 3). As illustrated in FIG. 3, in a frame 302, data may be carried on each of the sub-channel carrier frequencies 304 simultaneously during individual symbol periods 306. The frame scheme illustrated in FIG. 3 is commonly used in wireless communication systems based on OFDM.

In the present system, the OFDM frame 302 can be optimized for a transmit only system. As shown in FIG. 3, the frame includes a preamble during symbol period 0. During symbol periods 1 and 2, the frame 302 includes a frame control header (FCH) 310 and a downlink map (MAP) 312. Generally, the FCH 310 includes information about the frame 302 configuration, such as coding schemes, message lengths, usable sub-channels, and the like. The MAP includes information about the location of downlink content with the OFDM frame 302. The remaining symbol periods 314, symbol periods 3 to N, will carry the information received in the IP/MAC streams from the IP encapsulator module 230 of FIG. 2. In one embodiment, optimization of the frame 302 can be implemented, for example, at the base station 112 of FIG. 1, or at the single frequency network adapter 250 of FIG. 2. In other embodiments, the optimization can be implemented in other portions of the broadcast system.

It is noted that there is no uplink map provided in the OFDM frame 302. This is because, being a unidirectional broadcast only service, the MS's do not transmit back to the BS's in the SFN. Thus, after the OFDM frame 302 has been transmitted, a second OFDM frame 320, formatted in a similar manner as OFDM frame 302, is transmitted.

Figure 4A:
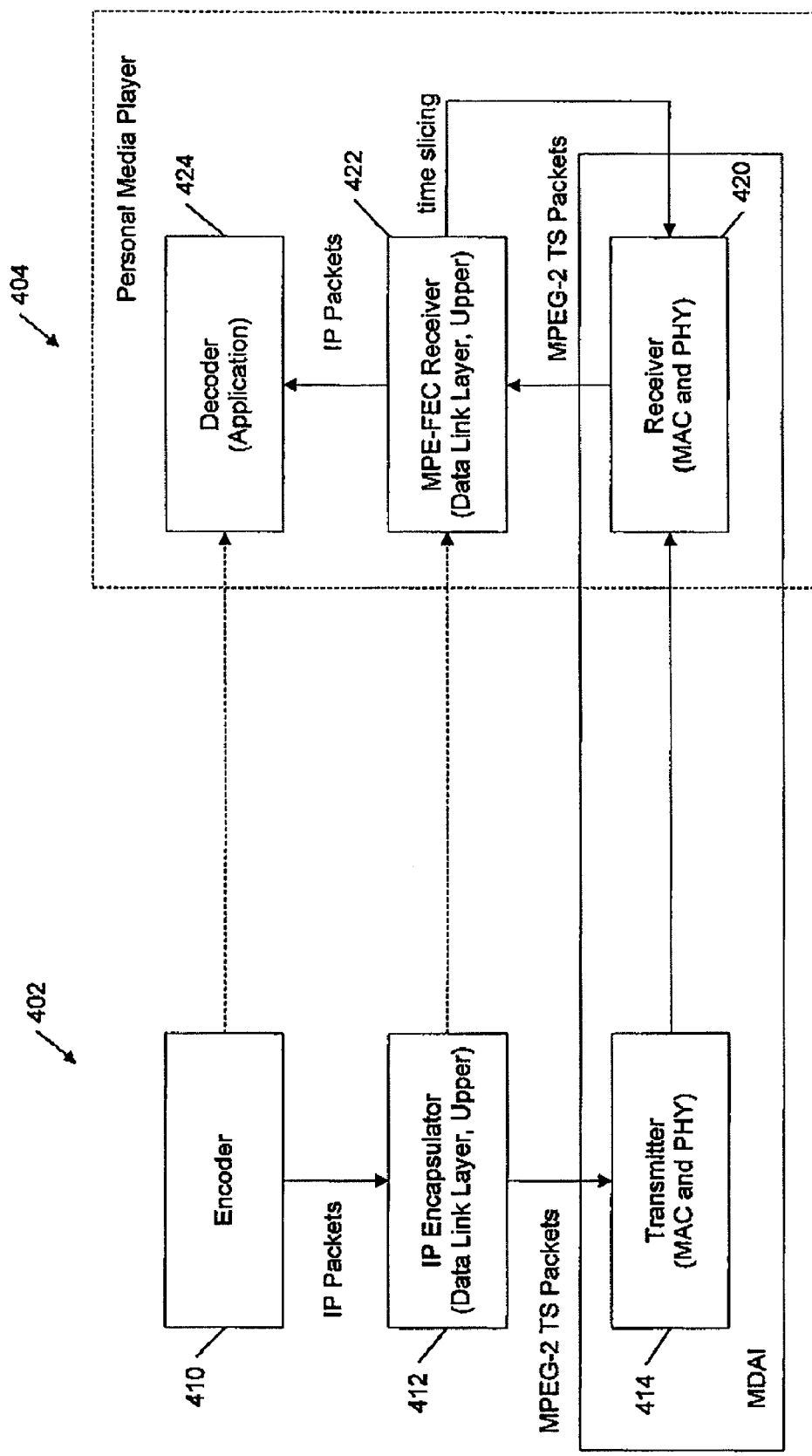
FIG. 4A is a block diagram illustrating application, data-link, and physical layers of the broadcast system according to an exemplary embodiment of the invention.

FIG. 4A is a block diagram illustrating application, datalink, and physical layers of the broadcast system. As shown in FIG. 4A, the layers on the left are implemented on the transmit side 402 of the air interface and the layers on the right are implemented on the receiver side 404 of the air interface in the broadcast system. In one embodiment, the top two layers 410 and 412 on the left can be implemented by modules for a common SFN, or other modules within the broadcast infrastructure, and the bottom layer 414 can be implemented by each base station in the SFN as shown in FIG. 2. In one embodiment, all of the layers on the right can be implemented by the mobile station 106 of FIG. 1, or the mobile station 270 of FIG. 2. In other embodiments, it is possible that the receiver layer 420 can be implemented in the MS, and the application layer 424 and data link layer 422 can be implemented in a device to which the MS is connected.

Returning to FIG. 4A, at the transmit side 402, an encoder module 410 provides IP packets of content to an IP encapsulator module 412. The IP encapsulator 412 is located at the top of a data link layer, encapsulating IP packets with an outer channel code and with time interleaving information and then communicating the resultant MPEG-2 transport stream (TS) packets to a transmitter module 414 located in a base station. An air interface protocol governs the operation of transmitter module 414 and receiver module 420. Data transmitted from the transmitter 414 to the receiver 420 via an air interface can be included in one or more frames, such as the frame described in FIG. 3.

At the receive side 404, the receiver module 420 outputs the data received as MPEG-2 TS packets. An upper data link layer (MPE-FEC receiver) module 422 receives the MPEG-2 TS packets and outputs IP packets to an application decoder module 424. In the upper data link layer (MPE-FEC receiver) module 422, a multiprotocol encapsulation with forward error correction (MPE-FEC) receiver module extracts time interleaving information and provides input based upon this information to the receiver module 420 to accomplish power savings in the receiver. Aspects of the time interleaving and feed back power savings information, referred to as "time slicing" are described further below.

In the broadcast system, a mobile station on receive side 404 typically performs many functions, for example, it searches for and selects a network, receives and de-capsulates PDUs, scans for and performs handover to adjacent broadcast networks (SFNs) if required, and consumes MAC management messages produced by a base station 402.

The mobile station on receive side 404 includes an air link management module that operates in accordance with an air link management protocol (ALMP) to manage the state of the mobile station as it relates to broadcast network attachment. In a typical operation, when a mobile station 404 is powered on, it searches for and selects a suitable broadcast network, also referred to as an IP data-casting network. This may be accomplished by first searching for a predetermined preamble waveform on a set of predetermined orthogonal frequencies. These predetermined frequencies can be based upon a list of possible frequencies, as well as on a cache of previously used frequencies. Once a suitable preamble waveform is detected, the information contained within a downlink DL-MAP (item 312 in FIG. 3) may be captured and used to determine if the network is a broadcasting network, or another type of network, such as a two-way communication system that is also in accordance with the IEEE 802.16 standard. If it is determined that the network is not suitable, it may be possible to use information about the network to improve, or speed up, the frequency searching process. Once a suitable, or preferred, broadcast network is found, the mobile station can synchronize its receiver module to the network and begin receiving MAC data bearing PDUs. If no suitable broadcast network is found, the mobile device can enter into a power conservation mode, similar to an out-of-service-area mode in traditional cellular handset systems.

Once a mobile station on receive side 404 has synchronized its receiver to the broadcast signal, the upper layers 422 and 424 on receive side 404 can synchronize to the arriving MPEG-2 TS packet stream. This may be done using the service information included in the MPEG-2 stream.

Once the application layer 424 on receive side 404 has synchronized to the arriving IP/MAC streams, it can select one or more streams to receive and in so doing, it can direct the receiver to turn "off" during slices of time when the desired packets are not being transmitted. This power savings technique is referred to as time slicing, and is described further below. When a mobile station is time slicing, it will interpret the arriving IP stream and extract from the headers encapsulating the IP packets, information necessary to accomplish time slicing. This information informs the receiver when the current time slice of the desired content will end and when the next time slice of the desired content will begin. Knowing the beginning and end of the desired time slices allows the mobile station to keep its receiver 420 "on" until the current desired time slice completes and then to power down the receiver 420 until the next desired time slice begins.

Figure 4B:
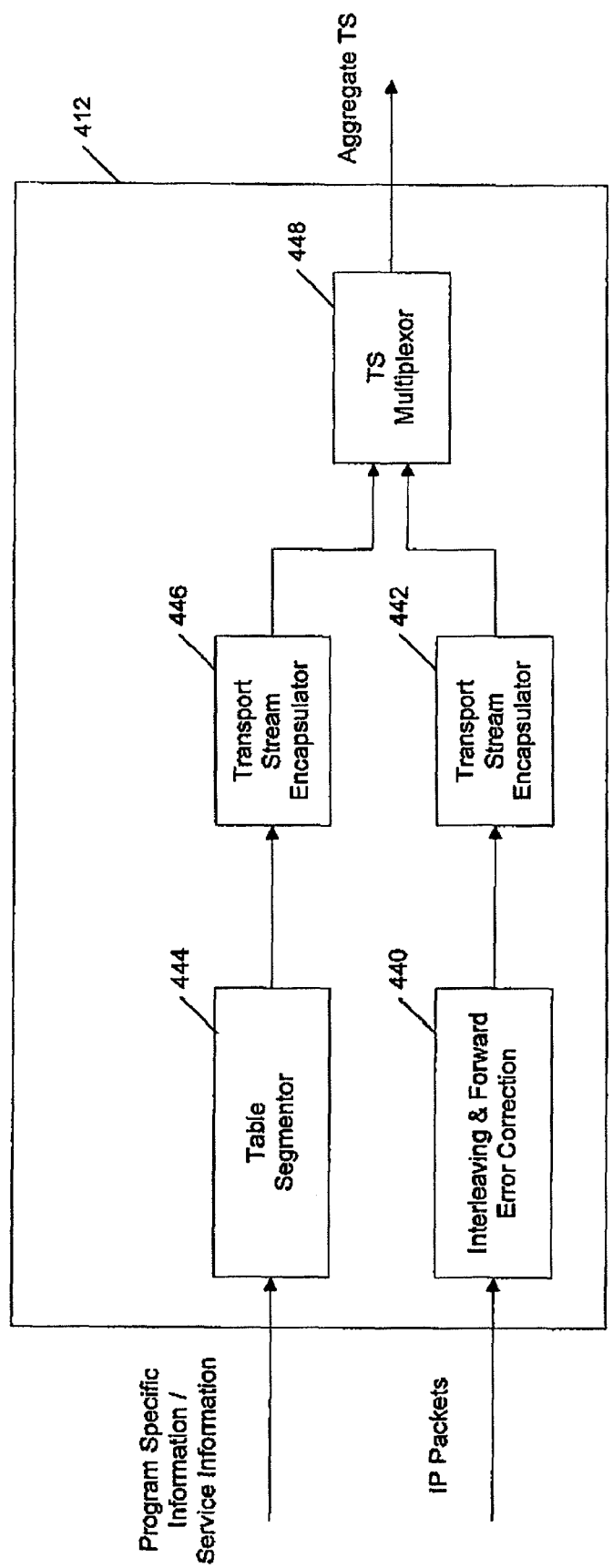
FIG. 4B is a diagram illustrating additional detail of one embodiment of an IP encapsulator 412 according to an exemplary embodiment of the invention.

FIG. 4B is a diagram illustrating additional detail of one embodiment of an IP encapsulator 412 according to an exemplary embodiment of the invention. As shown in FIG. 4B, the IP encapsulator 412 includes an interleaving and forward error correction (FEC) module 440. The interleaving and FEC module 440 receives finely interleaved IP packets, then coarsely interleaves the IP packets, adds forward error correction information, and outputs content sections to a transport stream encapsulator module 442. The transport stream encapsulator module 442 encapsulates the sections into transport stream (TS) packets.

The IP encapsulator 412 also includes a table segmentor module 444 that receives program specific information and service information and formats the information into sections. The program specific information can include a program guide that includes information that identifies the beginning of an event, for example, when a specific program will begin. Another example of program information is a list of the different content that is available. For example, if the content is being streamed real-time, the information can include a list of the different content streams that are currently available. A transport stream encapsulator module 446 receives the sections from the table segmentor module 44 and encapsulates the sections into transport stream (TS) packets. A transport stream multiplexor module 448 receives the outputs of the two transport stream encapsulators 442 and 446 and outputs an aggregate transport stream.

Figure 4C:
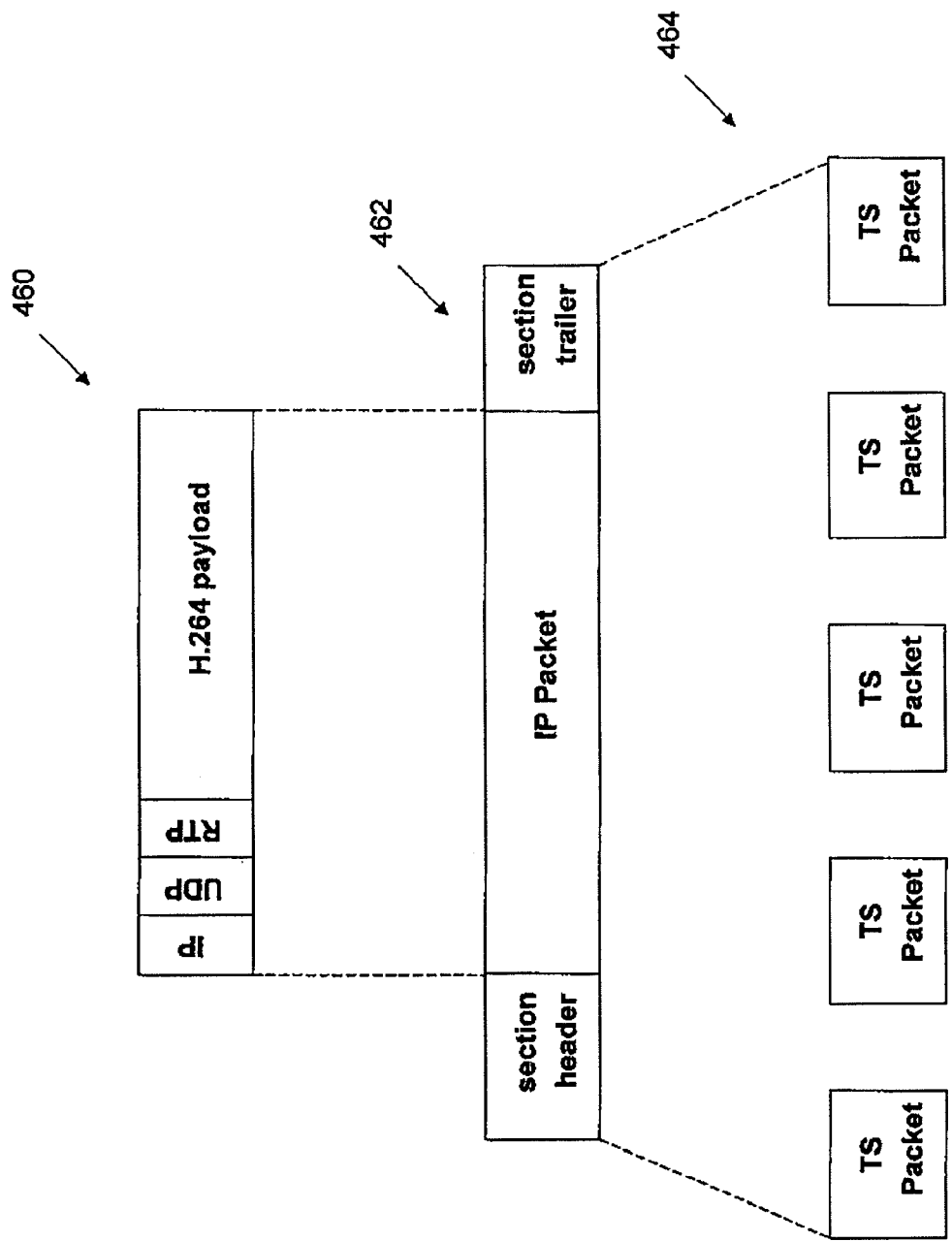
FIG. 4C is a diagram illustrating an example encapsulation of one embodiment of an IP encapsulator 412 according to an exemplary embodiment of the invention

FIG. 4C is a diagram illustrating an example encapsulation of one embodiment of an IP encapsulator 412 according to the invention. In the example of FIG. 4C, an IP packet 460 is received and wrapped with a section header and trailer to form a multi-protocol encapsulated-forward error corrected (MPE-FEC) section 462. In one embodiment, the IP packet 460 shown in FIG. 4C contains H.264 encoded data and has IP, UDP and RTP protocol headers. The MPE-FEC section 462 is then partitioned into transport stream packets 464. In one embodiment, the transport stream packets 464 are MPEG-2 TS packets.

Figure 5A:
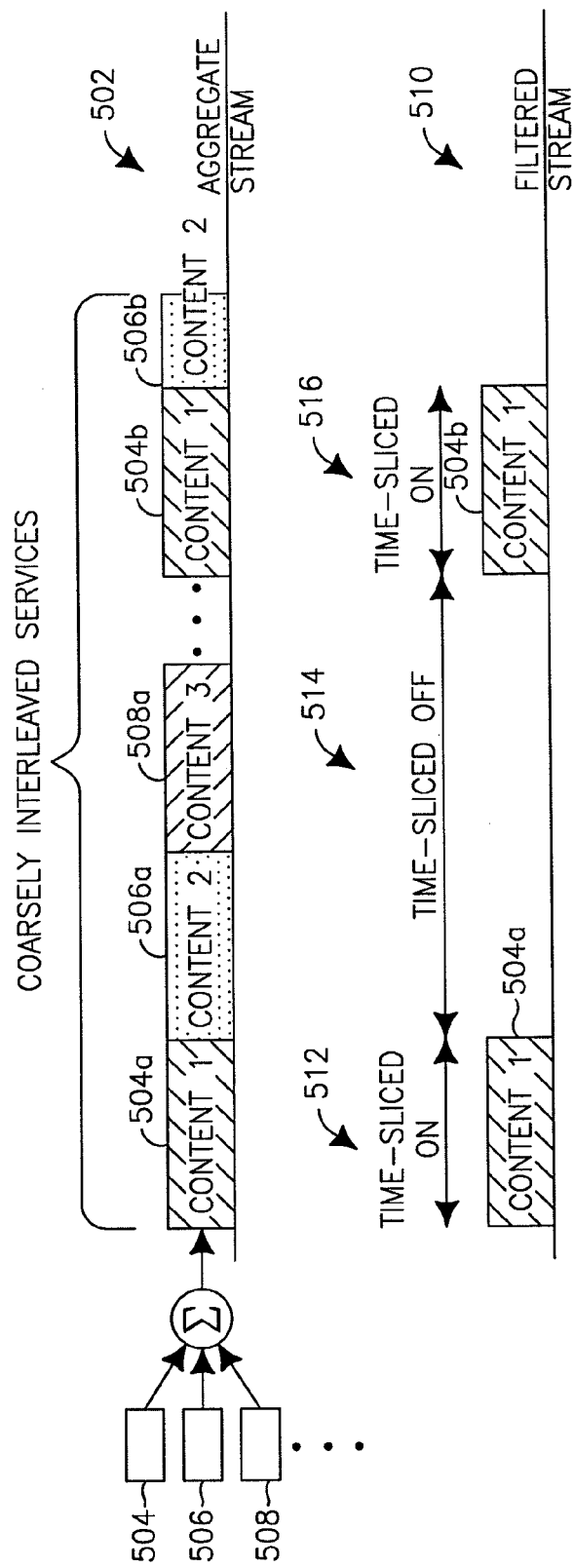
FIG. 5A is a diagram illustrating an example aggregate content stream according to an exemplary embodiment of the invention.

FIG. 5A is a diagram illustrating an example aggregate content stream represented by the MPEG-2 TS packets shown in FIG. 4. As shown in FIG. 5A, content from various sources 504, 506, and 508, are combined into an aggregate content stream 502. The content 504, 506, and 508 is coarsely interleaved (as discussed above) into the aggregate stream 502, where the content is grouped into a "burst" of data for one content stream, followed by a "burst" of data for each of the other content streams. For example, the aggregate stream 502 includes a first content stream 504a, followed by a second content stream 506a, a third content stream 508a, and so on until a desired number of content streams have been aggregated. Then, the next chronological portions for the content streams are transmitted. For example, the next portions of the first content stream 504b, the second content stream 506b, and the third content stream 508b are transmitted. In one embodiment, the aggregation of the content streams can be implemented by the IP encapsulator module 116 of FIG. 1, or by the IP encapsulator 230 of FIG. 2. In other embodiments, the aggregation is implemented in other modules within the system.

In one embodiment, a single connection identification descriptor is assigned to the aggregate content stream. For example, a single connection identification descriptor can be used for all of the individual content streams contained in the aggregate content stream. In another embodiment, a unique connection identifier is assigned to each respective content stream contained in the aggregate stream 502.

When a mobile station desires to receive one, or more, of the content streams in the aggregate stream 502, a burst of the desired content stream is followed by a time period of other, non-desired content streams. A mobile station may improve power savings by using a time slicing technique where portions of the mobile station that receive and channel decode the aggregate stream, referred to as the receiver, can be powered on to capture the desired content streams and then powered down during the non-desired content streams. In one embodiment, program information about the content in the aggregate content stream is included within the aggregate stream. The program information can include a program guide with information identifying, for example, when a particular program is going to begin, its duration, etc. In addition, the program information can identify programs that are currently available, such as, if the content is being streamed real-time.

A filtered stream 510 in FIG. 5A illustrates aspects of time slicing. In one embodiment, a device receiving the content can use program information to identify when desired content is going to be available and deactivate a receiver until the desired content is available. In another embodiment, the device can use program information to identify what content is currently available and use that information to acquire desired content from the content being received. Once a receiving device has identified desired content and has synchronized to the content, additional information in the content stream can be used to activate and deactivate a receiver at desired times to acquire the content at its recurring time slices while conserving power. In the example of FIG. 5A, the first content stream 504 of the aggregate stream 502 is desired. As illustrated in FIG. 5A, the mobile station powers on its receiver during a time 512 corresponding to the first portion of the first content stream 504a. The mobile station can then power down the receiver during the period of time 514 after the end time of 504a and before the start time of the second portion of the first content stream 504b, thereby avoiding having to receive undesired content between the slices of desired content. During the period of time 516, when the second portion of the first content stream 504b is received, the mobile station powers on the receiver. This process continues until either the desired content stream terminates, or a user selects a different content stream as the desired content stream.

In one embodiment, information about the duration of time 512 corresponding to the first portion of the content stream, and the duration of time 514 before the start of the next segment of the desired content 516 can be communicated to the device receiving the content. Similar information for the other portions of the content stream can also communicated to the receiving device. In this way a device receiving the content can use the information to turn on and off portions of the receiver at the appropriate times to thereby reduce power consumption.

Figure 5B:
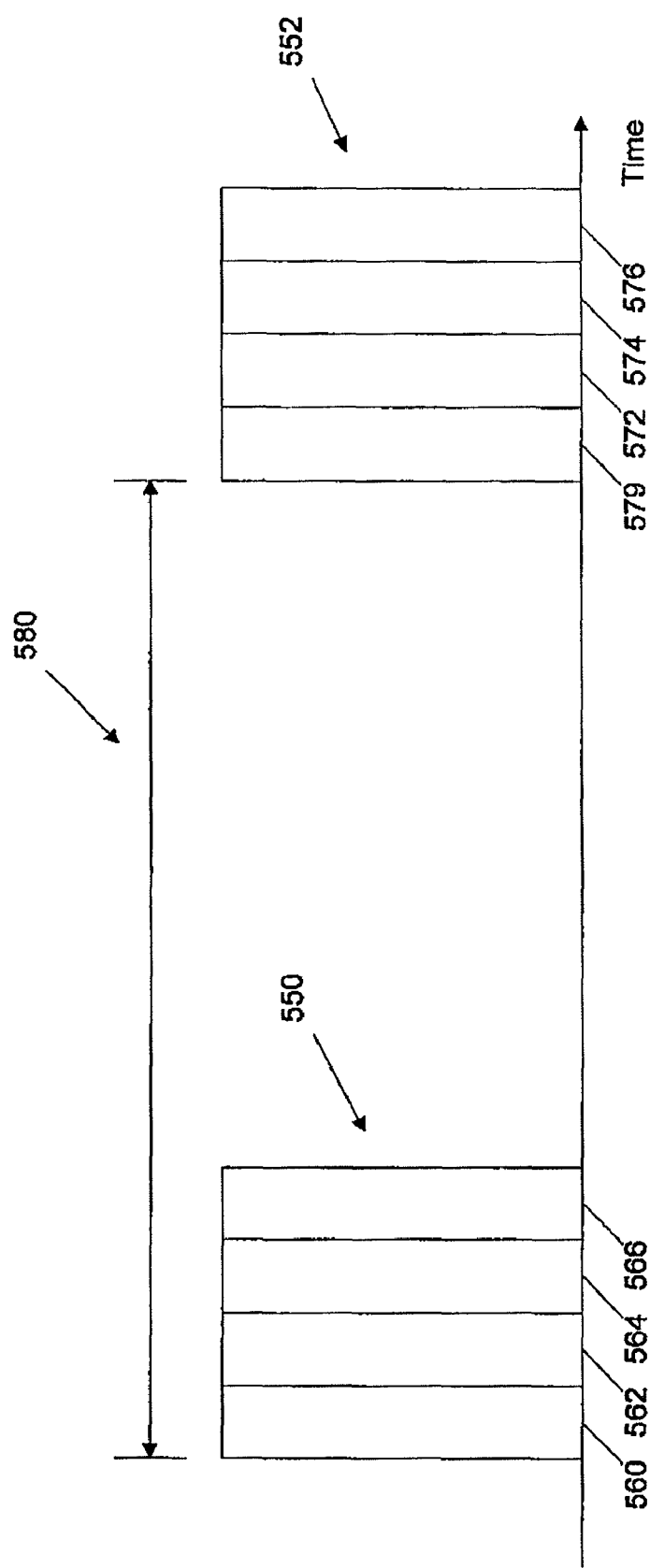
FIG. 5B is a diagram illustrating one embodiment of providing information used by a receiver to reduce power consumption according to an exemplary embodiment of the invention.

FIG. 5B is a diagram illustrating one embodiment of providing information used by a receiver to reduce power consumption according to an exemplary embodiment of the invention. As shown in FIG. 5B, a first burst 550 of desired content is followed by a second burst 552 of the desired content later in time. In the example illustrated in FIG. 5B, the burst of desired content is made up of sections. For example, the first burst 550 of desired content is made up of four sections 560, 562, 564, and 566. Likewise, the second burst 552 of desired content is also made up of four sections 570, 572, 574, and 576. Information can be included in the sections that can identify when the current burst will end and also can include information about when the next burst of content will begin. In one embodiment, information included within the four sections 560, 562, 564, and 566 of the first burst 550 of desired content include information indicating the end time of the first burst 550 and a value indicating the time 580 from the start time of the first burst 550 to the start time of the second burst 552. Similar information can be included within the four sections 570, 572, 574, and 576 of the second burst 552 of desired content about a subsequent burst of desired content that will follow the second burst 552. Other embodiments can include different numbers of sections in a burst, as well as different information about the occurrence of a subsequent burst of desired content.

In one embodiment, the aggregate stream 502 is transmitted by multiple OFDM frames and each frame includes the same connection identifier value. In this way all of the devices receiving the aggregate content stream 502 use the common connection identifier to identify the connection and then use information about the times that desired content is present in the aggregate content stream 502 to turn their receivers on and off at appropriate times. In another embodiment, the OFDM frames do not include a connection identifier.

Returning to FIG. 5A, in another embodiment, the aggregate content stream 502 is transmitted as multiple OFDM frames and each frame includes a connection identifier that identifies the content in the frame. In other words, frames that include the first content stream 504 would have one connection identifier and frames that include content from a second content stream 506 would have a second connection identifier, and so on. A frame could also include data from multiple content streams, and the frame would include one or more connection identifiers that reflect the content of the frame. In this embodiment, all devices receiving the aggregate content stream 502 would power on during the beginning of each frame and determine if the frame includes desired content. If it does, then the device would remain on to receive the content, if not the device would power down until the beginning of the next frame when it would power up to determine if the frame includes desired content.

During the time period 514 between the reception of portions of the desired content stream, or between the beginning of OFDM frames that do not include desired content, the mobile station can use its receiver to perform other functions. For example, the mobile station can scan for adjacent broadcast networks. Information enabling the mobile station to search for adjacent broadcast networks can be programmed into the mobile device at manufacture time and/or it can be announced by the network using system delivery descriptors, such as elements of the MPEG-2 service information. The mobile station can scan these adjacent networks, and if a broadcast signal is found, it can be noted for future use. If the current broadcast network is lost or degrades to an unacceptable level, the mobile station can first search the "found networks" identified during the scanning process for a replacement broadcast signal before engaging in a full frequency scan for another broadcast network.

Overview of Broadcast Layering Model

Figure 6:
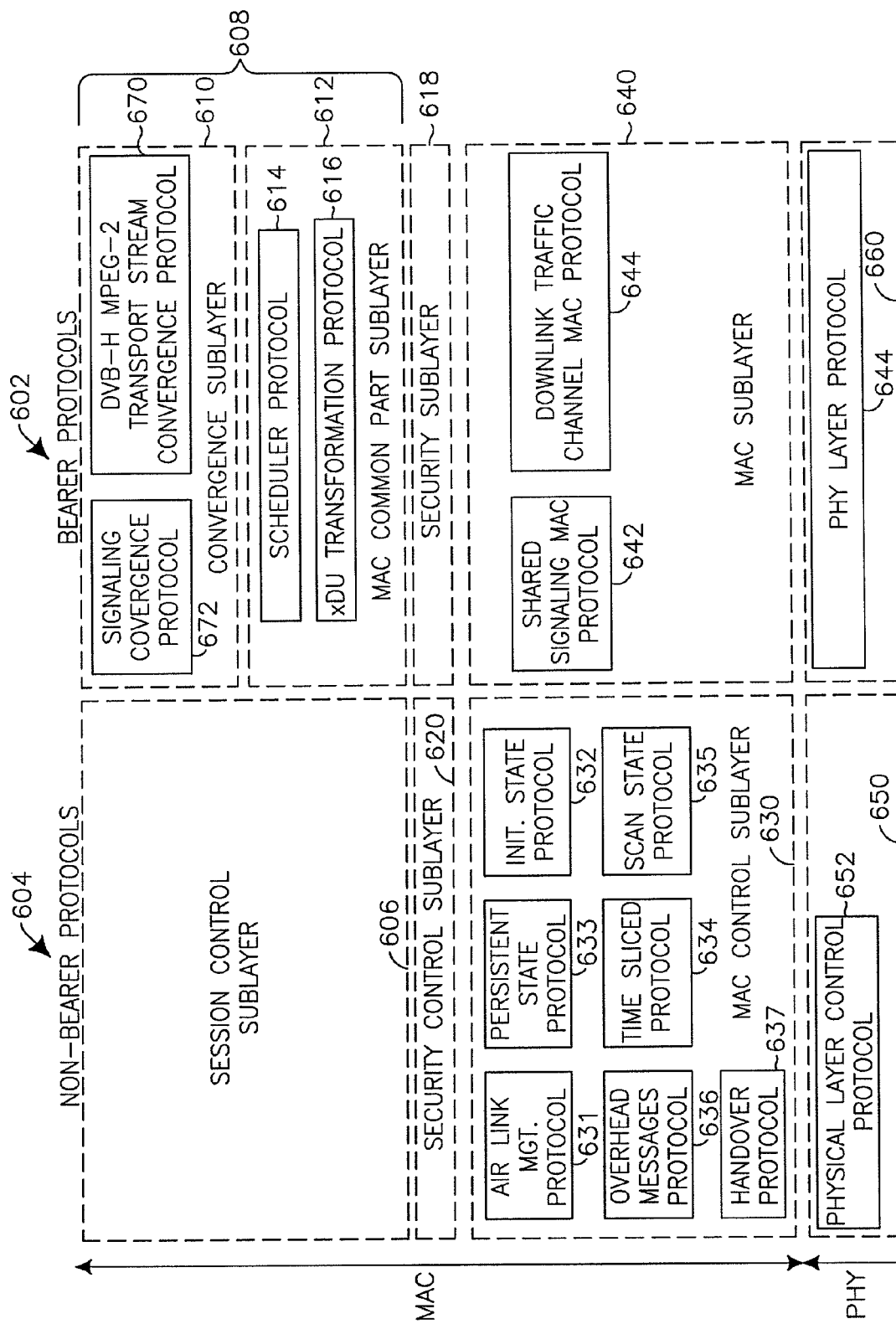
FIG. 6 is a block diagram illustrating a protocol layering model and associated modules that perform processes in accordance with various protocols according to an exemplary embodiment of the invention.

FIG. 6 is a diagram illustrating a layering model and associated modules that perform processes in accordance with various protocols to implement an example embodiment of the present invention. One or more instances of each protocol exist on each side, transmit and receive, of the wireless air interface link. These protocols are grouped into two distinct types: bearer protocols 602 and non-bearer protocols 604. A given layer is generally composed entirely of modules that support either bearer protocols 602 or non-bearer protocols 604. A bearer protocol is a protocol that is involved with the transmission/reception of content (payload) data across the air interface, and a non-bearer protocol is a protocol that is involved with the transmission/reception of control messages across the air interface. The layers are also referred to as bearer and non-bearer layers, depending on the types of modules and protocols associated with the respective layer. Bearer and non-bearer protocols can be implemented by various modules on both the receive side and the transmit side, of the broadcast system. In one embodiment, protocols implemented on the receive side are implemented by modules in the mobile station, such as the mobile station 106 of FIG. 1 or the mobile station 270 of FIG. 2, and protocols implemented on the transmit side are all implemented by modules in a base station, such as base stations 260 of FIG. 2.

As mentioned above, modules that include bearer protocols are involved with the transfer of content (payload) data over the wireless link. Bearer protocols are typically called in a specific order, which can form both a transmit chain and a receive chain. On the transmit side, a module that is processing in accordance with an associated protocol accepts a Service Data Unit (SDU) as input, and produces one or more Protocol Data Units (PDUs) as output. A module transforming an SDU into PDUs may perform several functions. For example, the module processing in accordance with the protocol may perform a transformation on the SDU, such as encryption. The protocol may also add a header, or a trailer to the SDU. In addition, the protocol may combine multiple SDUs into a single PDU, a process referred to as "packing," or split an SDU into multiple PDUs, a process referred to as "fragmentation."

On the receive side, modules processing in accordance with associated protocols accept a PDU as input, and produce an SDU as output. In transforming the PDU into a SDU, the module may perform several functions. For example the module processing in accordance with the protocol may perform a transformation on the remaining PDU, such as decryption. The protocol may also remove a header or a tail from the PDU. In addition, the protocol may extract multiple SDUs from a single PDU, a process referred to as "unpacking," or de-multiplex multiple PDUs to form a single SDU, a process referred to as "reassembly."

Referring again to FIG. 6, a session control sublayer module 606 includes non-bearer protocols, and so does not carry payloads on behalf of other "bearer" protocols. The session control sublayer 606 is generally responsible for system configuration and state maintenance. Because the system described herein is a broadcast system, there is typically no concept of a mutual state held at both the mobile station and the base station. In one embodiment processes and protocols defined in the session control sublayer module 606 can be used for configuration and provisioning information to be disseminated to other layers, or from a base station to mobile stations.

Corresponding to the non-bearer protocol session control sublayer module 606 is a bearer protocol upper MAC sublayer module 608. The bearer protocol upper MAC sublayer module 608 includes a convergence sublayer module 610 that provides a conduit for upper protocols/applications to transport their data over a MAC layer defined in an air interface. The convergence sublayer 610 generally supports the protocols, interfaces, encapsulations and mappings to accommodate the needs of the upper layers.

The bearer protocol upper MAC sublayer module 608 also includes a MAC common part sublayer module 612. Included within the MAC common part sublayer 612 is a scheduler module 614 and an xDU transformation module 616. In the broadcast service of the present invention, the scheduler module 614 exists only on the transmitter, or base station. The scheduler module 614, operating in accordance with a scheduler protocol, arbitrates access to the downlink data channel (DCH) for two different types of bearer protocols, signaling messages and MPEG-2 transport stream. The xDU Transformation module 616, operating in accordance with an xDU transformation protocol, encapsulates SDUs it receives from the convergence sublayer 610 and forms PDUs that are specifically sized to fit predetermined physical (PHY) layer containers, such as allocation regions or Hybrid Automatic Repeat reQuest (HARQ) packets. The xDU transformation module 616 passes a frame's-worth of PDUs and a list of PHY containers, to a security sublayer module 618. There is a corresponding module on the mobile station. In the mobile station the xDU transformation module, in accordance with an xDU transformation protocol, re-forms SDUs from a set of PDUs and delivers the SDU to the convergence sublayer.

A Security Control Sublayer module 620 includes non-bearer protocols that provide a key exchange capability for the Security Sublayer module 618. Because the security control sublayer 620 is a non-bearer layer, its processing in accordance with associated protocols do not carry data on behalf of other protocols. The security sublayer 618 operates in accordance with bearer protocols that provide encryption/decryption capabilities. Because the security sublayer 618 includes bearer protocols, it carries data on behalf of other protocols, in particular the MAC common part sublayer.

Continuing through the layers, there is a MAC control sublayer module 630. The MAC control sublayer 630 provides the ability to acquire the broadcast system, and establish an air link. The MAC control sublayer 630 includes non-bearer protocols, and so does not carry data on behalf of other protocols.

The MAC control sublayer 630 includes an air link management module 631 that operates in accordance with an air link management protocol. The air link management protocol manages the overall state machine which determines the state of the air link. The air link management protocol uses other protocols, described below, to manage the functionality of each state. This protocol is mostly relevant to control of the mobile station regarding initialization, acquisition, time sliced power management, scanning for neighbor Single Frequency Networks (SFNs), and seamless handover between SFNs. The air link management module processing, and its related protocol modules, are described in further detail below.

In support of the air link management module 631, the MAC control sublayer 630 also includes an initialization state module 632, a persistent state protocol module 633, a time sliced protocol module 634, a scan state protocol module 635 and a handover protocol module 637. The initialization state module 632 operates in accordance with an initialization state protocol to manage system acquisition and selection. It is primarily relevant to the mobile stations and enables the mobile stations to find a broadcast system, and to select one for which its subscriptions are valid. Also included in the MAC control sublayer 630 is a persistent state module 633. The persistent sate module 633 operates in accordance with a persistent state protocol, such that after synchronizing to a broadcast signal, but before allowing a user to view an actual broadcast, or datacast, a mobile station will engage the Persistent State module 633. When this module is active, the receiver is passing the aggregate stream to the upper layers and the upper Data-link Layer, Network Layer, and Application Layer are synchronizing to the incoming DVB-H MPEG-2 stream. This represents a second stage of synchronization for the mobile station (the first being synchronization to the broadcast signal at the waveform and frame level). Once these upper layers are synchronized, then the mobile station can enter into the time slicing protocol, which allows for battery savings.

Additional modules are also included in the MAC control sublayer module 630. A time slicing module 634 operates in accordance with a time slicing protocol that is primarily in effect when a mobile station is receiving broadcast data. In accordance with the selected content, or elementary, streams in the downlink, the mobile station will cycle power of some on-board subsystems to conserve battery life. A Scan State module 635, operating in accordance with a scan state protocol, governs how a mobile station scans for alternate broadcast networks. It is activated either when a broadcast signal is lost or during 'off' states governed by the Time Slicing Protocol 634. Base stations broadcasts information about neighbor SFNs so the mobile station can optimize its scan list and conserve battery life while scanning. Another module is the overhead message module 636. This module operates in accordance with an overhead message protocol and receives overhead messages, and publishes the extracted information as Public Data for access by other protocols. Still another module is the handover module 637. The handover module 637 operates in accordance with a handover protocol and manages the handover process in the event the signal from the current SFN is lost or degrading. In addition, this module can manage seamless handover, acting on signal quality and broadcast information about neighbor SFNs.

Corresponding to the MAC control sublayer module 630 and its non-bearer protocols, there is a MAC sublayer module 640 that includes bearer protocols. The MAC sublayer 640 includes modules that operate in accordance with bearer protocols for processing MAC PDUs for use with the physical layer. Because it contains bearer protocols, it does carry data for other protocols.

Included within the MAC sublayer 640 is a shared signaling MAC module 642 that operates in accordance with a shared signaling MAC protocol. This protocol transmits, at a base station, or receives, at a mobile station, shared signaling control PDUs. At the base station, the Shared Signaling module 642 maps shared signaling control PDUs to the downlink MAP channel (MCH) physical layer channel. The control PDUs mapped to this channel is the compressed MAP. At the mobile station, the control PDUs are received by the Shared Signaling module 642 and used by the Downlink Traffic MAC module 644 that operates in accordance with a downlink traffic MAC protocol. The Downlink Traffic Channel MAC protocol places and extracts MAC PDUs to and from the DCH physical layer channel. All MAC PDUs, whether they are MAC management PDUs or PDUs from an application, flow through this protocol.

Below the MAC control sublayer 630 and the MAC sublayer 640 are a physical control layer module 650 and a physical layer module 660 respectively. The physical layer control layer 650 includes a physical layer control module 652 that operates in accordance with a physical layer control protocol. The physical layer control module 652 handles physical layer (PHY) activation, and notifies other protocols of synchronization loss.

The physical layer 660 provides physical layer transport for air link messages. It consists of bearer protocols, and so carries data on behalf of their protocols. Included in the physical layer 660 is a physical layer module 662 that operates in accordance with a physical layer protocol. This protocol describes the basics of the OFDM physical and includes messaging used by the physical layer, and a general introduction into frame structure and timing, as well as OFDM. This protocol defines the details of how data is sent over the physical layer, including coding, subchannel assignment, modulation, etc.

Figure 7:
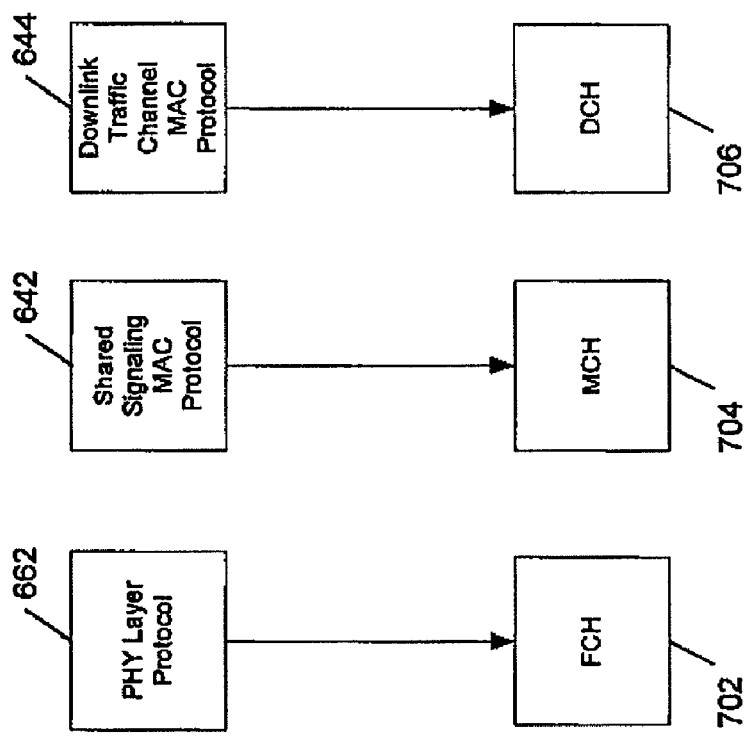
FIG. 7 is a diagram illustrating mapping between bearer protocols and their corresponding physical layer channels according to an exemplary embodiment of the invention.

FIG. 7 is a diagram illustrating mapping between bearer protocols and the physical layer channel. A physical layer channel is a region or regions in time and frequency, of the data frame 302 in FIG. 3, where certain MAC PDUs are transmitted with PHY parameters dictated by the particular physical layer channel. For example, the physical layer protocol 662 maps a frame control header channel (FCH) 702. A channel is a physical layer channel that occurs at the start of a time division duplex TDD frame which carries two instances of the Downlink Frame Prefix (DLFP) PDU. The DLFP PDU maps to the FCH in a particular manner that remains unchanged from frame to frame.

There are three physical layer channels present in one embodiment of an air interface. In this embodiment, the physical layer channels include a Downlink FCH Channel (FCH) 702, a Downlink MAP Channel (MCH) 704, and a Downlink Data Channel (DCH) 706. The physical layer protocol 662 maps to the FCH channel 702. The shared signaling MAC protocol maps to the MCH 704, and the downlink data channel MAC protocol 644 maps to the DCH 706. The MCH 704 carries the downlink MAP PDU from the base station to the mobile station. The DCH carries MAC PDUs from the base station to the mobile station.

Returning to FIG. 6, the MAC control sublayer 630 includes an air link management module. The air link management module 631, operating in accordance with an air link management protocol, is responsible for the general state machine implementation for the MAC Control Sublayer 630. The functionality of each of the different states is implemented in a protocol defined for that state. The air link management protocol manages transitions between states by activating and deactivating the state implementation protocols. There is pseudo air link management module at the base station but it does not keep state.

Convergence Sublayer

Figure 8:
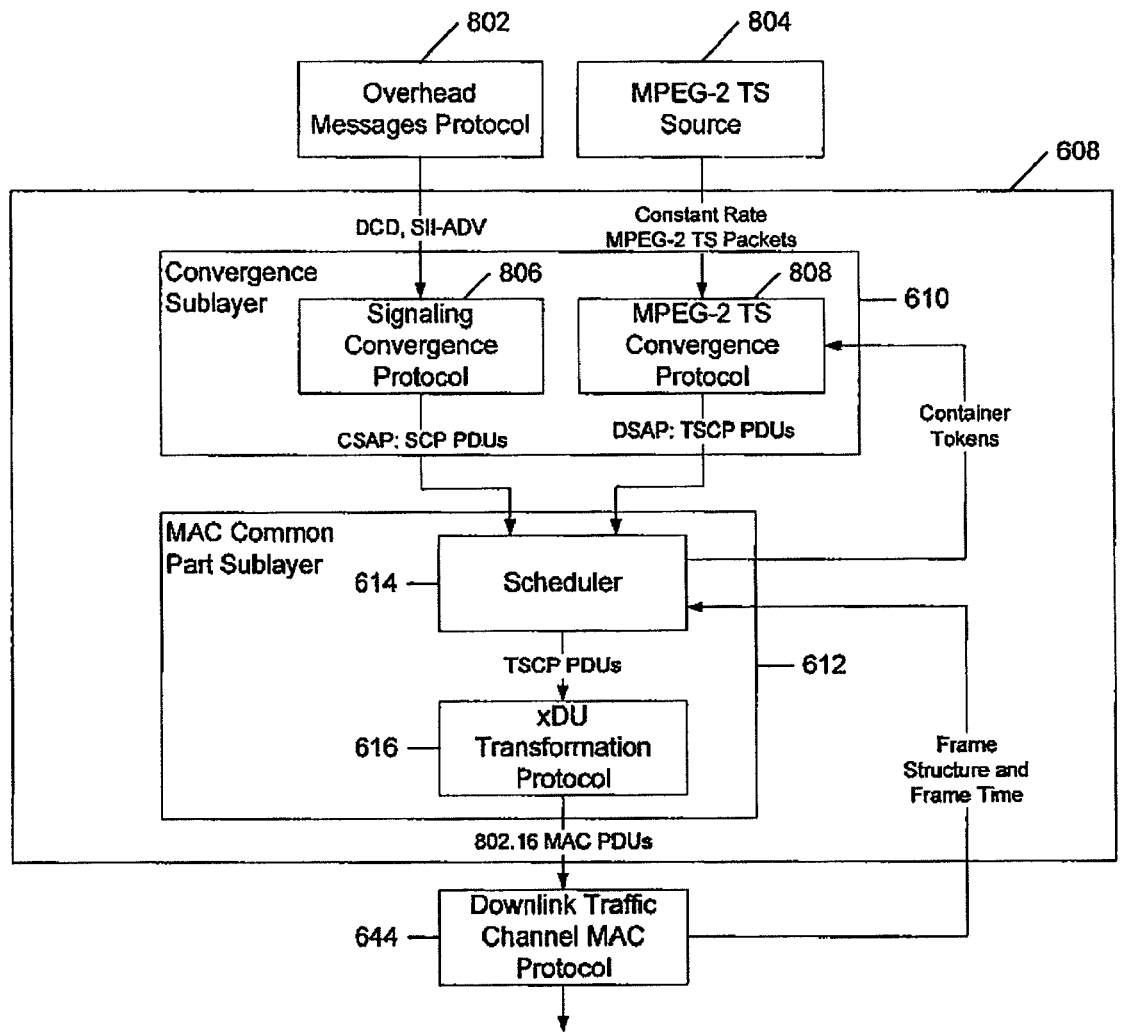
FIG. 8 is a block diagram illustrated data flow from a convergence layer 610 down through a MAC common part sublayer 612 according to an exemplary embodiment of the invention.

As seen in FIG. 8, the convergence sublayer 610 includes a Transport Stream Convergence Protocol (TSCP) module 808 and a Signaling Convergence Protocol (SCP) module 806. In one embodiment, the TSCP module 808 maps higher level packets into MAC SDUs. For example, the TSCP module can map MPEG-2 transport stream packets into MAC SDUs that can be transmitted over a wireless air interface, such as an OFDMA interface similar to the 802.16 standard. The TSCP module 808 can also assign a connection ID to each of the MAC SDUs. In one embodiment, the TSCP module 670 can map the MPEG-2 transport stream that is formed for DVB-H content into MAC SDUs. The SCP module 806 can map higher level packets into MAC SDUs. The SCP module 806 can map signaling messages, that can be used, for example, to announce fundamental characteristics of the system, but not carry data.

Further detail of the convergence sublayer module 610 is described below in connection with FIGS. 30-37.

MAC Common Part Sublayer

Following is further detail of the MAC common part sublayer module, item 608 in FIG. 6. The MAC common part sublayer 608 is responsible for data transport operation. Aspects include synchronizing frame transmission with the PHY layer, filling downlink allocations, or containers, with PDUs and fragmenting as necessary. The MAC common part sublayer 608 schedules SDUs from upper layer bearer protocol modules into OFDM PHY allocations or containers. Aspects of the scheduler include:

1. The scheduler only needs to support two upper bearer protocols:

(a) Constant stream of broadcast data that uses a majority of the downlink bandwidth. This bearer protocol does its own fragmentation to avoid the overhead of MAC layer fragmentation.

(b) A constant, but sparse, stream of SDUs that has highest priority, "steals" bandwidth from the other type of stream, and allows for MAC-layer fragmentation in some cases.

2. The scheduler does not form the transmit data frame structure dynamically. The frame structure is constant. The OFDM layout does not change frame-by-frame, it remains constant for extremely long periods of time, perhaps changing only when upgrades are made to the modulators. This is in contrast to a typical IEEE 802.16 device, where the scheduler is given control over the frame structure and PHY modulation and coding modes.

3. The scheduler does not employ QoS functions. Service flow downlink bandwidth requirements are dictated by a constant stream from the upper layers.

FIG. 8 is a block diagram illustrated data flow through the MAC common part sublayer 608. As shown in FIG. 8, overhead messages 802 and content data, such as an MPEG-2 transport stream 804, are received at the convergence sublayer 610. The overhead messages are processed by a signaling convergence protocol module 806 and the content data is processed by a content convergence protocol module 808. PDUs output from the signaling convergence protocol module 806 and the content convergence protocol module 808 are communicated to the schedule module 614 in the MAC common part sublayer 612. The scheduler module 614 processes the overhead and content PDUs and outputs combined PDUs to the xDU transformation protocol module 616. The output of the xDU transformation module is communicated to the downlink traffic channel MAC module 644.

The xDU transformation protocol module 616 transforms MAC SDUs to PDUs that are compatible with the IEEE 802.16 PDU (with generic MAC header (GMH)). The xDU transformation protocol module 616 includes the following aspects.

1. It does not employ protocol procedures that are bidirectional. For instance, no registration, no basic capabilities negotiation, no DSx, no ARQ, no uplink bandwidth grants, etc.

2. It does not pack multiple SDUs into a single PDU.

3. It supports SDU sizes up to largest PDU payload size, for example, up to 2041 bytes. In other words, an upper layer bearer protocol is not allowed to send an SDU that exceeds a predetermined upper limit, such as 2041 bytes.

4. If necessary, the protocol module fragments SDUs into multiple PDUs to utilize OFDM PHY allocation regions. For example, in a typical case where a PDU "starts" in an allocation region, and its byte count would extend beyond the region, the protocol module fragments the PDU, placing the first fragment in the current allocation and placing the other fragment(s) in later allocations.

5. The protocol module supports static service flow establishment. Static means when another protocol (e.g., upper layer bearer protocol) establishes a service flow with the xDU transformation protocol module, it is immediately active, available and transitioned to a service flow active state.

6. The xDU transformation protocol module does not generate or process MAP.

7. The xDU transformation protocol module on a base station maps SDUs to PDUs and then to allocation regions or HARQ packets such that the mobile station (receiver) can extract PDUs and then SDUs in the same order.

8. The order of allocation regions is clarified so that both the following conditions define allocation order:
   (a) The order of their respective IEs in the MAP.
   (b) The order of each allocation region's lowest symbol number. And if two allocation regions have the lowest symbol number, the allocation region with the lowest subchannel number is first.

9. The xDU transformation protocol module maps PDUs to an allocation region accordingly and defines the mapping and the transmission order of PDUs in an allocation region.

In a base station, a principle responsibility of the xDU transformation protocol module is to take MAC-SDUs, generate MAC-PDUs with the proper GMHs and fragmentation subheaders (if necessary), which are sized to fill OFDM allocation regions, or OFDM containers. In a mobile station receiver, the xDU transformation protocol module strips off the GMHs and performs reassembly if necessary, thus forming SDUs. The xDU transformation protocol module then demultiplexes SDUs (based on a CID) to the next upper layer bearer protocol (e.g., chooses the convergence sublayer).

MAC Control Sublayer

Figure 9:
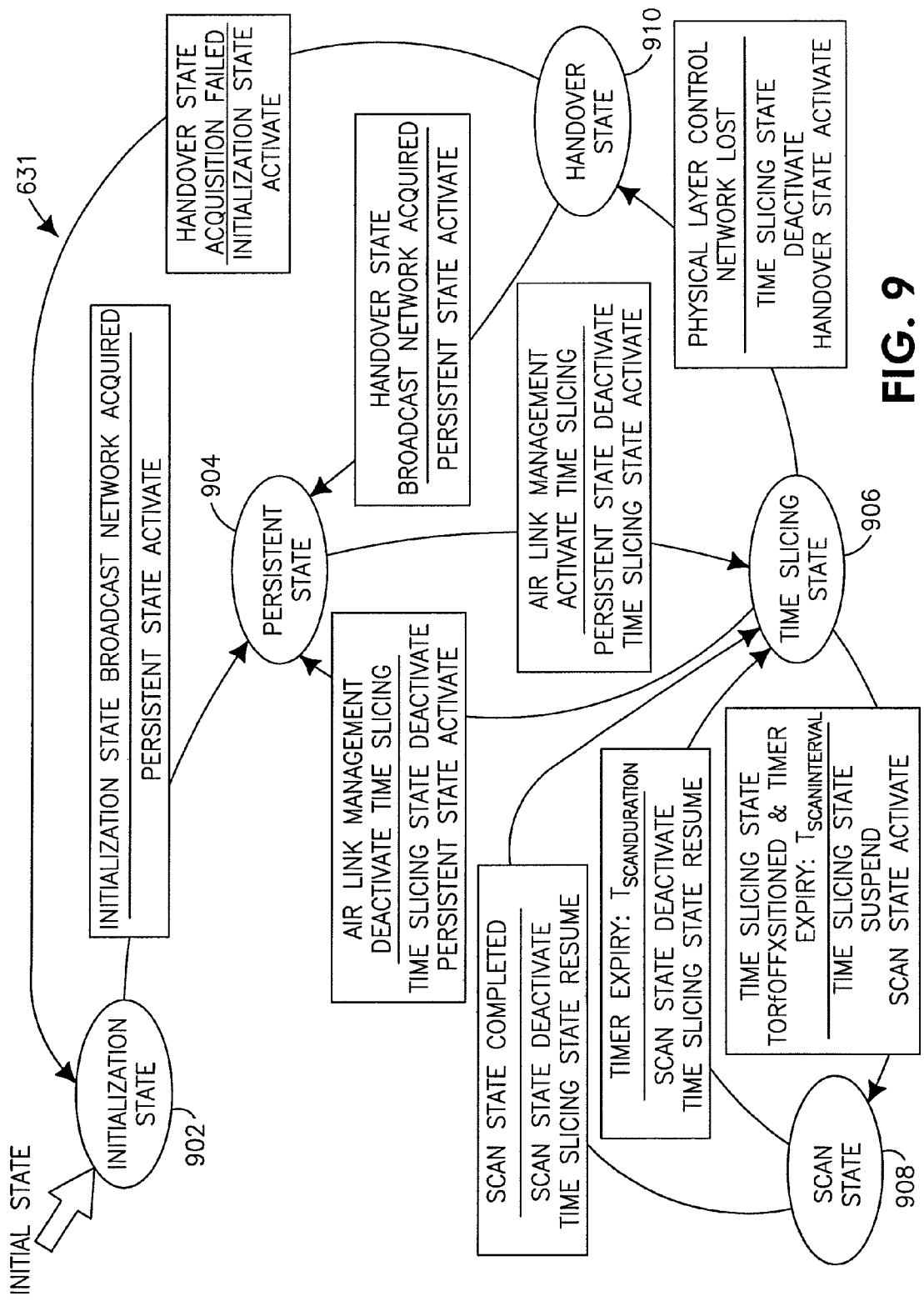
FIG. 9 is a state diagram illustrating aspects of processing according to the air link management protocol implemented by the air link management module 631 of FIG. 6.

Following is further detail of the MAC control sublayer module, item 630 in FIG. 6. The MAC control sublayer module 630 includes an air link management module 631 that operates in accordance with an air link management protocol. FIG. 9 is a state diagram illustrating aspects of processing according to the air link management protocol by the air link management module, item 631 in FIG. 6, at a mobile station. The air link management protocol at the mobile station can be in one of 5 states: an initialization state 902, a persistent state 904, a time slicing state 906, scan state 908, and a handover state 910.

Upon entering the initialization state 902, the mobile station searches a list of frequencies looking for a broadcast system. When a broadcast system is found, the initialization state enables the Shared Signaling MAC protocol (module 642 in FIG. 6) so that the MAP will be parsed into public data. The MAP information can be used to determine the service provider and its own geographic region. The mobile station also uses this information to refine its search list. When it is determined which service provider in the area is most acceptable, the mobile station exits the initialization state 902 and the system enters the Persistent state 904. If no service providers are found, the mobile station periodically repeats its frequency search until a satisfactory service provided is found.

In the Persistent State 904, the mobile station is not time slicing on the received signal. When the mobile station is not time slicing, all PDUs received by the Physical Layer Protocol will be passed to the MAC sublayer. It is noted that in this state, because there is no time slicing, the mobile station will be consuming considerably more power than in the Time-Slicing State 904, because the receiver is on to extract all PDUs. The persistent state 904 is needed for the upper layers (the upper Data-Link Layer and Network Layer) to determine what multicast IP stream the application wishes to receive by examining the aggregate received stream (502 in FIG. 5). Once a desired IP stream, or streams, are selected, then the Time Slicing State 904 can be entered to conserve power.

In the Time Slicing State 906, portions of the mobile station needed to receive the broadcast data, referred to as the receiver, are switched on and off at appropriate times so as to receive and extract the desired content streams from the aggregate stream, and to conserve power during undesired content steams. The information needed to accomplish time slicing is provided to this state via primitives from upper layers and from public data.

The Scan State 908 is entered from the Time Slicing State 906 under the control of the Air-Link Management Protocol 631. The scan state 908 is entered into while the desired streams selected by upper layers are not being transmitted by the base station modulator, so as to not miss application level data. In this state, the mobile station will scan for adjacent networks based upon information that is pre-programmed into the mobile station and information that is received by the broadcast access network to which it is currently synchronized. In the scan state 908 adjacent networks are evaluated as possible substitutes for the current broadcast system in the situation where signals from the current broadcast system are lost or deteriorate.

The Handover State 910 is entered into from the Time Slicing State 906 when the signal of the current broadcast access network is either poor or non-existent. While in this state, broadcast access networks that were detected in the Scan state 908 (during "off" times of the Time Slicing State 906) are examined for their suitability as a replacement for the current network. If a suitable network is found, then the Persistent state 904 is re-entered, otherwise the Initialization state 902 is re-entered. The Handover state 910 exists for the purpose of rapidly acquiring a new network, rather than simply invoking the Initialization state 902, which typically will be slower in finding broadcast access networks. If the Handover state 910 cannot rapidly acquire a new network, then it invokes the Initialization state 902.

Initialization State 902

Figure 10:
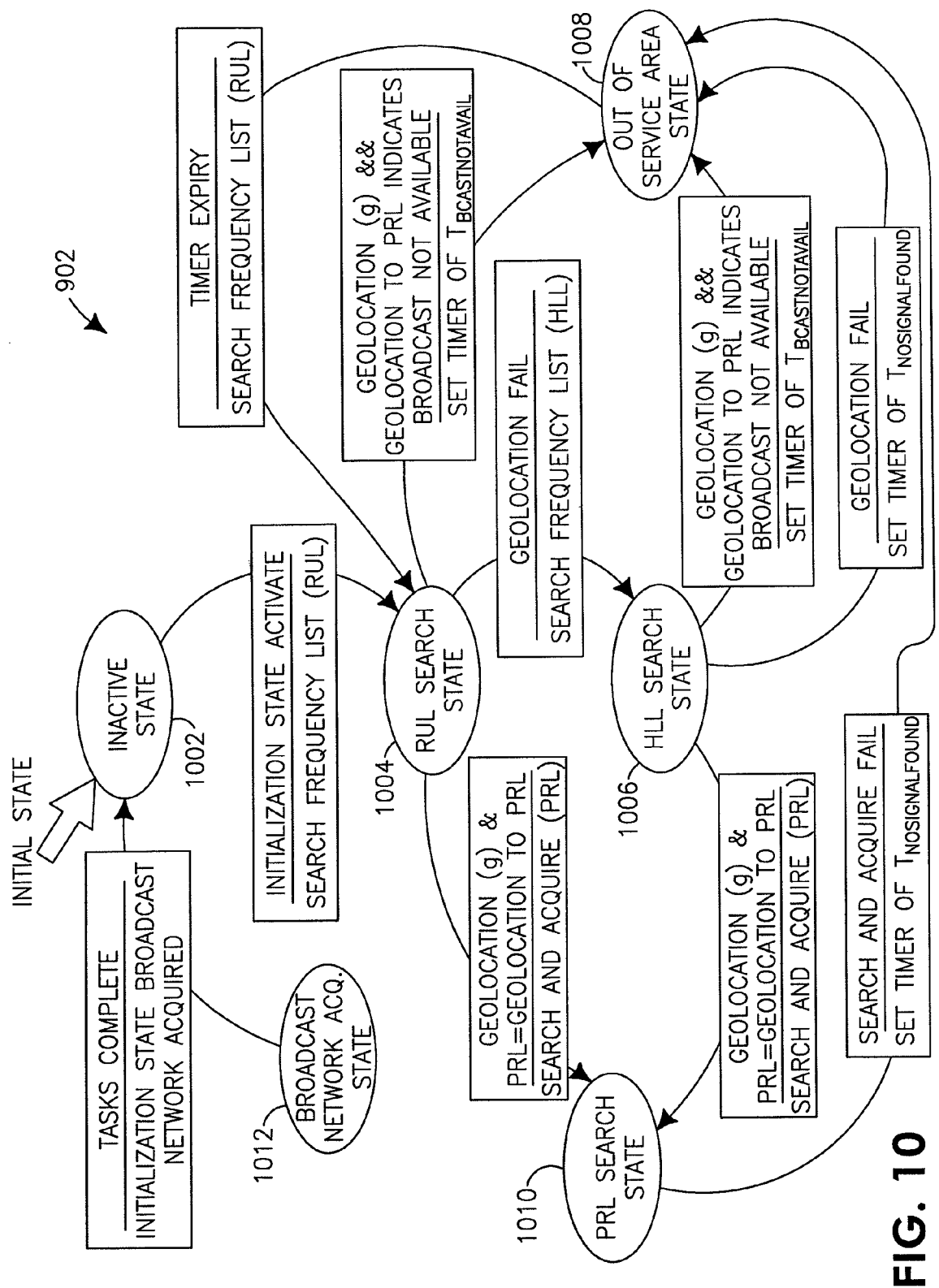
FIG. 10 is a state diagram illustrating aspects of processing according to the initialization state of the air link management protocol of FIG. 9.

The air link management module 631, while in the initialization state 902, operates an initialization state protocol at the mobile station to acquire a broadcast access service. FIG. 10 is a state diagram illustrating aspects of processing according to the initialization state 902 of the air link management protocol.

The initialization state 902 implements a control protocol used at a mobile station to acquire a signal from a broadcast access service network. Selection of a broadcast access network can be based on several factors. For example, in one embodiment, selection can be base on a recently used list (RUL) which is a cache table, or list, of recently used frequencies that the mobile station can use to search for a broadcast network. Selection can also be based on a full list of all possible frequencies, and a preferred roaming list (PRL) this is based on geo-location information. Using geo-location information can increase the speed of the network selection process. For example, a table can be used to map a base station ID/network ID to a geo-location. Then, using information in the broadcast signal, such as the base station ID or network ID, a tailored preferred roaming list can be created.

The initialization state 902 protocol begins in an Inactive State 1002. This is the initial state of the protocol, where the protocol waits for an activate command. Upon receiving an activate command there is a transition to a recently used list (RUL) search state 1004. In the RUL search state 1004, the protocol will attempt to acquire and synchronize to a broadcast access service network by using a cached list, for example a Recently Used List (RUL) of possible frequencies. The protocol will leave this state under two conditions: a successful acquisition on one of the frequencies contained in the RUL; or none of the frequencies in the RUL lead to acquisition.

In the HLL search state 1006, the protocol will use a highest likelihood list (HLL) to search for a broadcast access service network. Like the RUL Search State, the protocol can leave this state under a condition where a network was found and under the condition that no broadcast access service network was found.

In an Out of Service Area State 1008, the protocol will sojourn for a time, waiting for another attempt at acquiring a broadcast network. In this state the Mobile Station need not operate its receiver, and therefore should minimize its power consumption. The amount of time spent in this state will be a function of how the protocol transitioned into this state. This Out of Service Area State 1008 should not be confused with any other power save states that make up the sub-protocols of the Default Air Link Management Protocol.

There is also a preferred roaming list (PRL) search state 1010. In this state, the protocol uses geo-location information obtained during the RUL or HLL, or both, to search a database for a preferred broadcast network among a list of frequencies, thereby creating a preferred roaming list (PRL). The PRL can also be ordered in preference based upon various parameters such as cost, or other user preferences. Upon successfully acquiring and synchronizing to a suitable broadcast access service network a transition from the PRL search state 1010 to a Broadcast Network Acquired State 1012 occurs. The database used for the PRL search can be included within a device by the manufacture, or it can be downloaded to the device. In addition, the database can be maintained, and updated during the life of the device.

Transition between the various states of the initialization state 902 are now described. In the Inactive State 1002, the mobile station waits to receive a command to activate it. Upon receipt of the command, the protocol engages the Search Frequency List process using the RUL in the RUL Search State 1004. In the RUL Search State 1004, the protocol waits for the results of the Search Frequency List process. This process can conclude with one of two possible results. The process can return with a geo-location, indicating where the mobile is located geographically. This geo-location is used to index into the Preferred Roaming List (PRL) database. If there is an entry in the PRL database, the protocol transitions to the PRL Search State 1010. If there is no entry in the PRL database for this geo-location, the protocol transitions to the Initialization Power Save State 1008. If the geo-location could not be determined using the RUL, then the protocol will again engage the Search Frequency List process, this time with the Highest Likelihood List (HLL) as the argument. After this process is engaged, the protocol will transition to the HLL Search State 1006.

The protocol sojourns in the HLL Search state 1006 awaiting the results of the Search Frequency List process. As in the RUL Search state 1004, the results of the Search Frequency List can indicate geo-location or no geo-location. If geo-location is determined, the protocol seeks a PRL in the PRL database. If one is found, the protocol engages the Search and Acquire process with the PRL as its argument in the PRL Search State 1010. If no signal is found from within the frequencies contained in the HLL, the protocol transitions into the Initialization Power Save State 1008.

The protocol sojourns in the PRL state 1010 while the Search and Acquire process is executing. If this process is successful, it returns with a signal indicating that a broadcast network was found within the PRL. The protocol state machine then transitions to the Broadcast Network Acquired State 1012. If no broadcast system was found within the PRL, this implies that a non-broadcast OFDM signal is present, which aided in determining geo-location, however a broadcast system is not present. Under this condition the protocol transitions to the Out of Service Area State 1008. In the Out of Service Area State 1008, the protocol will sit idle for a timed period (time period provided to this state from the "sending state") then leave this state at the end of timed period. The duration of the idle time period for this state is determined by the state the protocol was in prior to entering the Out of Service Area State 1008.

The protocol enters the Broadcast Network Acquired state 1012 once a broadcast signal is found within the PRL. The protocol will sojourn in this state while certain tasks are executed. Tasks executed include entering the center frequency, bandwidth, NAP ID, NSP ID, and NSP Identifier Flag on which the mobile subscriber has found broadcast service into the RUL, if it is not already present. Once the tasks are complete, the protocol will transition to the Inactive state.

The Recently Used List can be periodically purged of stale entries. An entry becomes stale upon its expiry. The entry for the mobile subscriber's home network has an expiry of infinity, and therefore will never be purged.

The Search and Acquire process takes a frequency list and attempts preamble acquisition and synchronization. A frequency list is provided to the process. Typically this frequency list is the PRL, however the process is not PRL specific. A frequency is chosen from the list, preamble is searched for and if found, a MAP detection is attempted. Ideally, when searching for a signal on a frequency that is known to carry a broadcast signal, there should only be one preamble sequence detected.

Figure 11:
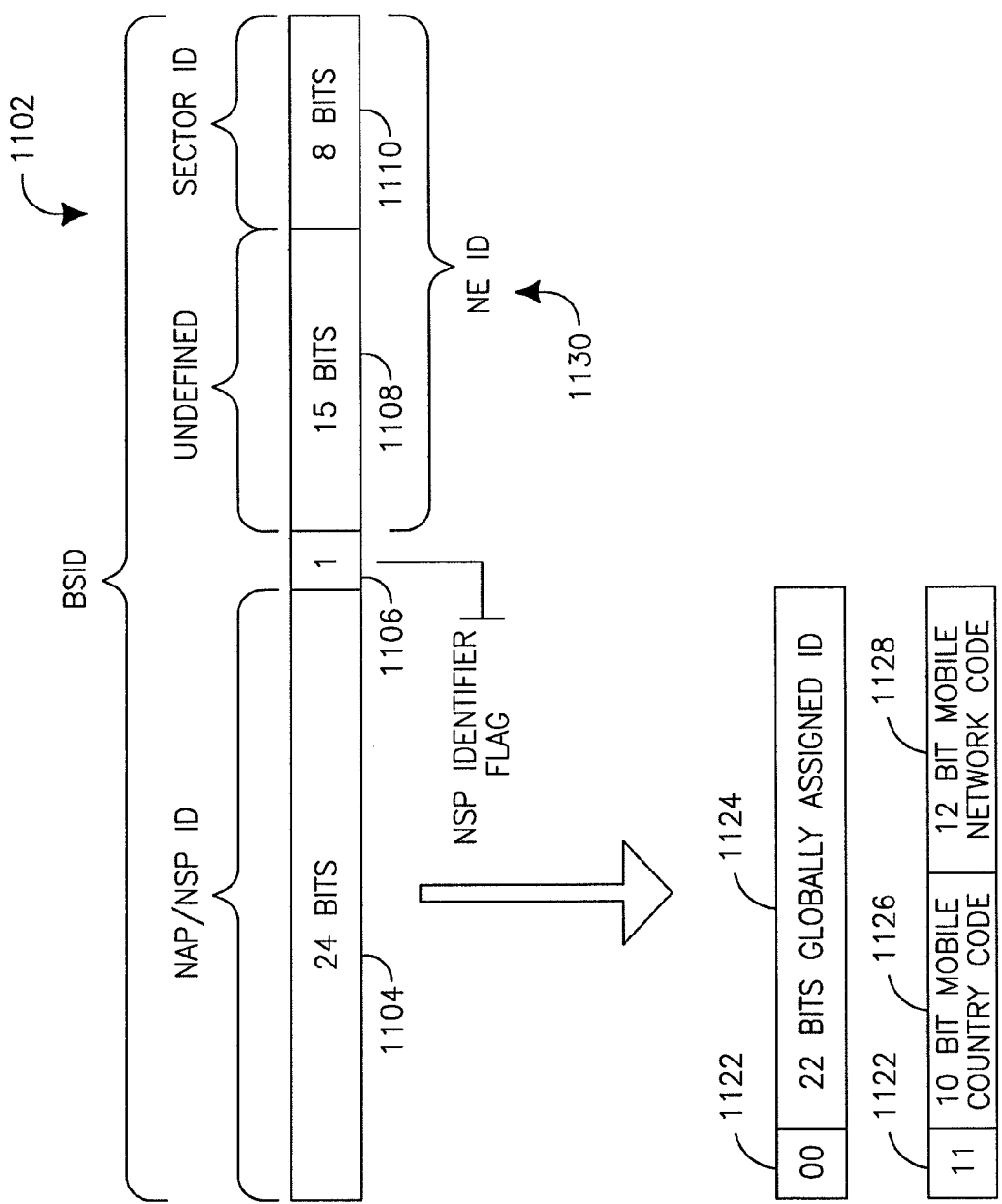
FIG. 11 is a block diagram illustrating an example base station identification (BSID) according to an exemplary embodiment of the invention.

FIG. 11 is a block diagram illustrating an example of a base station identification (BSID) 1102. In this embodiment, the BSID 1102 includes a Network Access Provider/Network Service Provider (NAP/NSP) ID 1104, a NSP identifier flag 1106, an undefined region 1108, and a sector ID 1110. The NAP ID 1104, the upper 24 bits of the BSID 1102, is compared to the NAP ID of the frequency list entry. If the NAP ID 1104 matches the entry in the list, then the network is accepted. If the NAP ID 1104 does not match the entry in the list, then the network is rejected. Another preamble index or another frequency is then chosen and the preamble/MAP detection process is repeated.

In the event that the network access provider is different from the network service provider, then the NSP ID 1104 is received and compared. Having a service provider(s) different from the network access provider is indicated by the most significant bit of the 24 least significant bits of the BSID. The NSP ID 1104 can be periodically broadcast in an overhead message. If a mobile station requires NSP ID 1104 information to match the information contained in the frequency list, and it does not, a new frequency is chosen. If no suitable network is found using the frequencies provided in the search list, the process will return to the calling process.

Returning to FIG. 11, the upper 24 bits of the 48 bit BSID 1102 are defined as a Network Access Provider(NAP) ID 1104. The NAP ID serves to identify the owner and operator of the access network, that is who is operating the access service network. The Network Service Provider (NSP) can be one or more providers of end-to-end service and such other things as accounting, authentication, security, etc. In some deployment cases, the network access provider can be the same as the network service provider. This case is indicated in the BSID 1102 by the NSP identifier flag 1106 (the most significant bit of the 24 least significant bits of the BSID) being set to 0 (zero). Because of this case (called NAP+NSP), the format for the NAP ID 1004 and the NSP ID are identical. For the broadcast system described herein, it is common for the NAP to be the same as the NSP.

One of two possible formats, based upon the value of the 2 most significant bits of the NSP ID 1104, are described. In one example, if the first two bits of the NSP ID 1122 read "00" then the remaining 22 bits are simply a globally assigned identifier 1124, meaning that no bits are set aside specifically for geo-location. Geo-location would have to be determined by a flat lookup table. If the first 2 bits of the NAP/ID read "11", then the remaining 22 bits are divided according to ITU-T Recommendation E.212 [ITU-T E.212], with the first 10 bits denoting the Mobile Country Code (MCC) 1126 and the final 12 bits denoting the Mobile Network Code (MNC) 1128. Coarse, country specific, geo-location can be arrived at by interpreting MCC 1126. The MNC 1128 is then used to determine the access network operator.

The 23 least significant bits of the BSID are referred to as the Network Element Identifier (NE ID) 1130. These bits in combination with the NAP/NSP ID allow a mobile station to determine its geo-location once it receives the BSID.

Persistent State 904

Returning to FIG. 9, the air link management module 631 transitions from the initialization state 902 to the persistent state 904. A module operating in accordance with a persistent state protocol provides the capability to a mobile station for monitoring the air link when no specific traffic stream/program is yet selected to be received. The persistent state protocol allows a full unfiltered aggregate stream to arrive to layers above the convergence sublayer. This allows for upper data link and network layer synchronization to the arriving packet stream without any receiver time slicing.

There is no module operating a persistent state protocol at a broadcast base station. FIG. 12 is a state diagram illustrating operating states for a module operating in accordance with the persistent state protocol. As shown in FIG. 12, an inactive state 1202 is the initial state of the protocol, where the protocol waits for the activate command. Upon receiving an activate command, there is a transition to a monitor state 1204. In the monitor state 1204 the mobile station monitors the downlink channels continually utilizing the DL Traffic MAC protocol. In this state the mobile station RF receiver circuitry is powered on continually. Upon receiving a deactivate command there is a transition back to the inactive state 1202.

Time Slicing State 906

The air link management module 631 transitions from the persistent state 904 to the time slicing state 906, as seen in FIG. 9. This protocol is applicable only to a module in the mobile station and provides procedures and messages used by the mobile station when it wishes to received a content traffic stream in a power efficient manner.

Figure 13B:
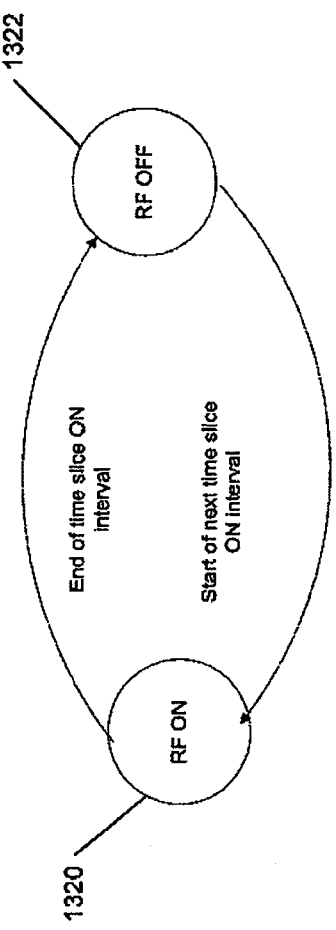
FIG. 13B is a state diagram illustrating sub-states within the active time slicing state of FIG. 13A.
Figure 13A:
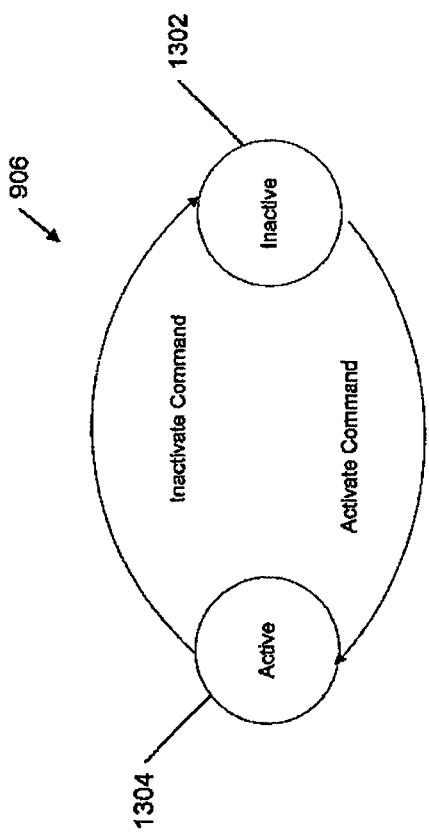
FIG. 13A is a state diagram illustrating aspects of processing according to the time slicing state protocol of the air link management protocol of FIG. 9.

FIG. 13A is a state diagram illustrating aspects of processing according to the time slicing state 906. Beginning in an inactive state 1302, the module operating in accordance with a time slicing protocol waits for an activate command. Upon receiving an activate command there is a transition to an active state 1304. In the active state 1304 the mobile station can receive traffic on the downlink data channel.

FIG. 13B is a state diagram illustrating sub-states within the active state 1304. A first sub-state is the RF ON sub-state 1320. In the RF ON sub-state 1320, RF portions of the mobile station are activated while demodulation of received signals is ongoing. This corresponds to the ON time of a time sliced burst of a particular service, such as item 512 in FIG. 5. At the end of the time slice ON interval, there is a transition to an RF OFF state 1322. In the RF OFF state 1322, RF portions of the mobile station are deactivated by, for example, removing or reducing power to them. This corresponds to the OFF time of a time sliced burst or a particular service, such as item 514 in FIG. 5. When the start of the next time slice ON period is about to arrive, there is a transition back to the RF ON state 1320.

While in the RF ON state 1320, a mobile station will activate modules operating with bearer protocols. In this state, the MS shall have the RF receiver turned on and shall be capable of receiving the downlink data traffic from the BS. The mobile station shall continue to receive the downlink data traffic and send it on to the upper layers until the end of the time slice period is reached and the mobile station transitions to the RF OFF state 1322.

In the RF OFF state 1322, the mobile station will deactivate modules operating bearer protocols and deactivate, or turn off, portions of its RF to conserve battery power. While in this state, the mobile station continues to process (send to the upper layers) the data that has been received up to this point. The MS shall remain in this state until the next time slice on period occurs, at which time there will be a transition to the RF ON state 1320. Based on a receiver implementation, the mobile station may need to turn on its receiver some amount of time before the beginning of the time slice on period in order to perform any synchronization procedures that are required for the mobile station to synchronize to the base station.

Scan State 908

Returning to FIG. 9, the air link management module 631 transitions from the time slicing state 906 to the scan state 908. A scan state module 635 can implement a scan state protocol that seeks to exploit the time when the receiver's radio frequency (RF) components are otherwise off, during time slicing, to scan for adjacent broadcast networks. A receiver's RF components are typically off during one of the sub-states of the Time Slicing State protocol.

The scan state module implementing the scan state protocol will scan for broadcast networks based upon information that is embedded in the mobile station, such as, the preferred roaming list, and based upon information that is provided by the current broadcast access network, such as a Network Announced List (NAL).

This protocol will be activated and deactivated by the Default Air Link Management protocol implemented by air link management module 631 in such a manner as to not interfere with the operation of the Time Slicing State module 634. As networks are found, the information relevant to describing the found network is compiled in the Found Networks List (FNL). Maintenance of the FNL is the responsibility of this protocol. A scan state module does not typically exist at the base station.

FIG. 14 is a state diagram illustrating aspects of processing according to the scan state 908. As shown in FIG. 14, the scan state module starts in an inactive state 1402 of the protocol where it waits for the activate command. The scan state module then transitions to a scanning state 1404 where the module will scan for adjacent networks.

Upon entering the scanning state 1404, the protocol will engage a Scan Search Frequency List process. If a state exists from the previous activation of this protocol, then the Scan Search Frequency List process will engage using this state. Otherwise the Scan Search Frequency List process will engage with the network announced list as its argument.

Once the NAL has been scanned, the Scan Search Frequency List process is re-engaged with the PRL as its argument. When both lists have been scanned, the process is complete and the module transitions to the Inactive state.

Figure 15:
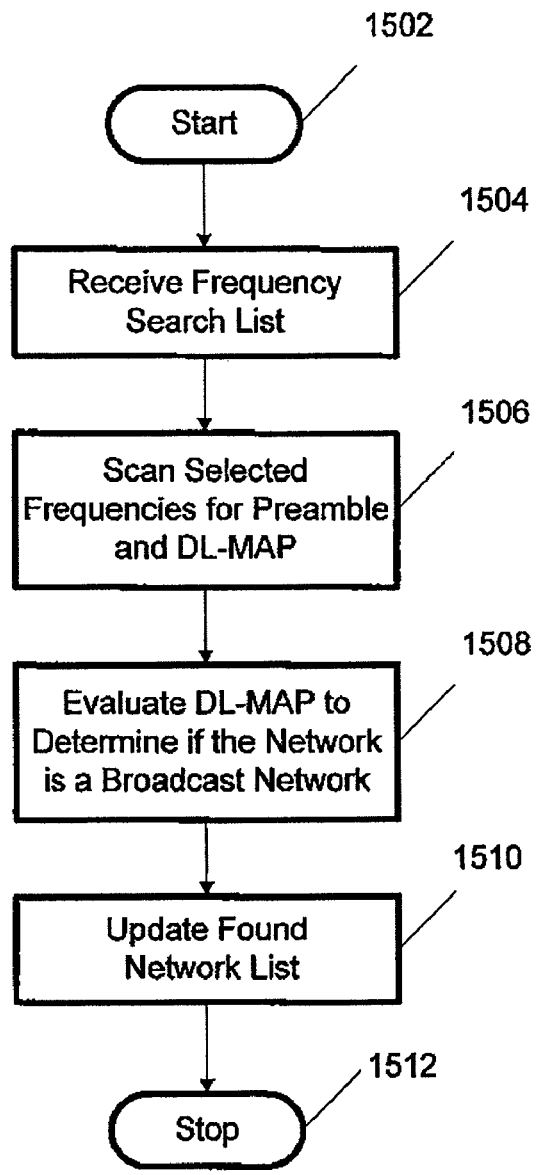
FIG. 15 is a flow diagram illustrating aspects of the scanning process according to the scan state protocol of FIG. 14.

FIG. 15 is a flow diagram illustrating aspects of the scanning process. Flow begins in block 1502. In block 1504, a frequency is selected from a list of possible frequencies that may include a broadcast network. Flow continues to block 1506 and the selected frequency is scanned. Typically, the scanning process determines if a predefined preamble signal is detected at the selected frequency, and if it is then a MAP is received.

Flow continues to block 1508 where the MAP is evaluated to determine if the found network is a broadcast network. Flow continues to block 1510 and a found networks list is updated with broadcast networks that are found. Flow then continues to block 1512 and stops.

Handover State 910

The air link management module 631 in FIG. 9 transitions from the time slicing state 906 to the handover state 908. A handover state module 637 can implement a handover state protocol that is entered into by the mobile station upon losing connection with the current broadcast access network or the connection with the current broadcast network degrades below some acceptable measure of quality. This handover state protocol seeks to scan the frequencies contained in a Found Networks List (FNL) in an attempt to acquire an alternative broadcast access network. The FNL is created and maintained by the scan state module 635.

This protocol is labeled as "Handover" however the events leading up to the activation of this protocol and the actions taken by this protocol do not accomplish handover in the classical cellular sense. The protocol exists for the purposes of rapidly acquiring a broadcast access network. The event that triggers this protocol is the loss of the current broadcast network, or the network connection degrades. This form of handover could be referred to as "hard hand-off."

Figure 16:
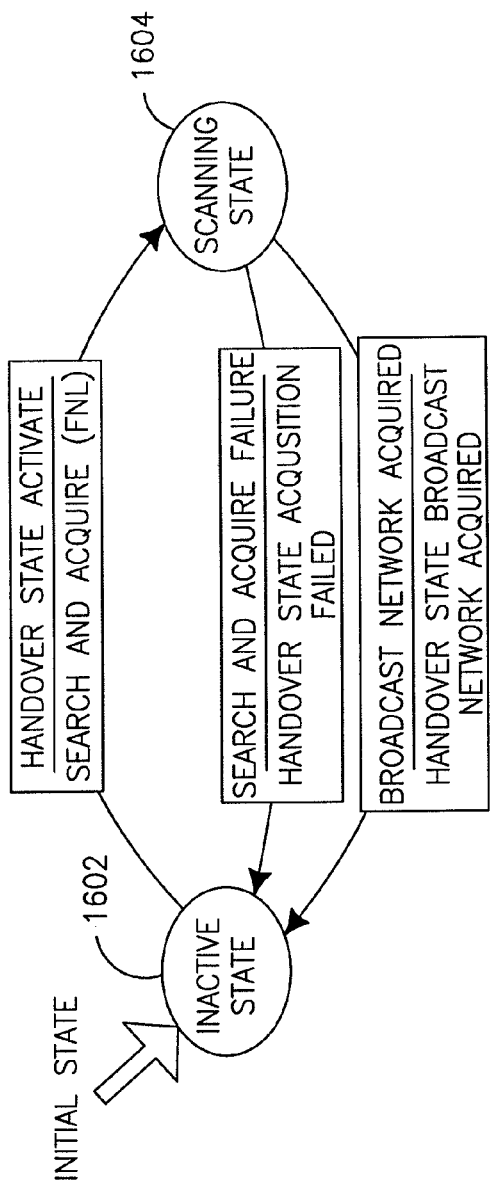
FIG. 16 is a state diagram illustrating aspects of processing according to the handover state protocol of the air link management protocol of FIG. 9.

The handover module 647 at a mobile station can implement a handover protocol. FIG. 16 is a state diagram illustrating states of the handover protocol implemented by handover module 647. The handover module 647 begins in an inactive state 1602 wherein the module waits for an activate command. Upon receiving the activate command, the module transitions to a searching state 1604 where the module, in a mobile station, will use entries of the found network list (FNL) identified during previous scan states 635 to search for a suitable preamble. If a suitable preamble is found, indicating that a suitable broadcast network is found, the new network is acquired and the module transitions back to the inactive state 1602. If a suitable preamble is not found, indicating that a suitable broadcast network is not found, a handover acquisition failure is indicated and the module transitions back to the inactive state 1602.

Overhead Message Module 636

The lower MAC control sublayer also includes an overhead message module 636 that implements an overhead message protocol. The overhead message module 636 can be implemented at the base station 112 of FIG. 1 or the single frequency network adapter 250 or base station 260 of FIG. 2.

In one embodiment, at a base station, the overhead message module implements an overhead message protocol sending overhead messages to a signaling convergence protocol. In an embodiment, at a mobile station, the overhead message module implements an overhead message protocol to receive overhead messages from a signaling convergence protocol. The overhead message modules also perform supervision on the overhead messages necessary to keep the MAC Layer functioning. This module publishes the extracted information as Public Data for access by other protocols.

Examples of overhead messages include a Downlink Channel Descriptor (DCD) message and a System Identity Information-Advanced (SII-ADV) message.

These messages are unique, in that they pertain to multiple protocols and are, therefore, specified separately. The overhead messages module implements procedures related to transmission, reception and supervision of these messages. This is a control protocol and the transmission unit of this protocol is a message. It does not carry payload on behalf of other layers or protocols. This protocol uses the signaling convergence protocol to transmit and receive messages.

Figure 17:
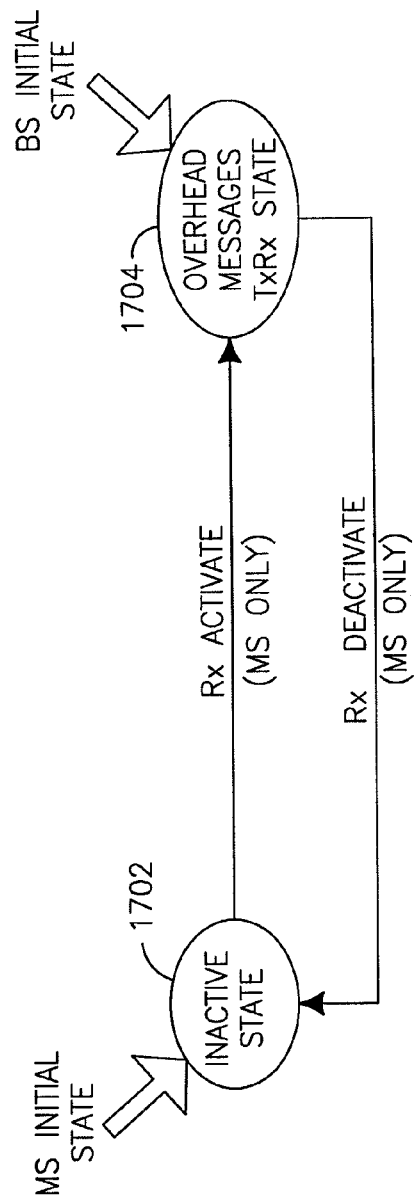
FIG. 17 is a state diagram illustrating the states of the overhead message module 636 of FIG. 6.

FIG. 17 is a state diagram illustrating the states of the overhead message protocol implemented by the overhead message module 636. In a mobile station the overhead message module 636 begins in an inactive state 1702. This is the initial state of the protocol, where the protocol waits for the activate command. This state is only applicable to mobile station and occurs when mobile station has not acquired the base station or is not required to receive the overhead messages.

In one embodiment, the Mobile Station overhead message module 636 will start this protocol in the inactive state 1702, and the Base Station overhead message module 636 will start this protocol in the overhead messages transmit/receive state 1704.

In one embodiment, the base station overhead message module 636 may add new overhead messages. The mobile station overhead module 636 may discard overhead messages with a message ID field that it does not recognize. In other embodiment, the base station overhead message module 636 may add new fields to existing overhead messages. These fields can be added to the end of the message.

When the mobile station overhead message module 636 is in the overhead messages transmit/receive state 1704, it can start receiving overhead messages and provide the contents of overhead messages as public data so as to make it available to the other MAC modules. When the base station overhead message module 636 is in the overhead message transmit/receive state 1704, it can act as a transmitting conduit for overhead messages from the associated lower MAC protocol.

MAC Sublayer

Following is further detail of one embodiment of the MAC sublayer module 640 of FIG. 6. In this embodiment, the MAC sublayer 640 performs processes that can be implemented at various components in the system, such as, at the base station 112 and mobile station 106 of FIG. 1, or the IP encapsulator 230, single frequency network adapter 230 base station 260 or mobile station 270 of FIG. 2.

The MAC sublayer 640 includes a shared signaling MAC protocol module 642 that implements a shared signaling MAC protocol. The shared signaling module is responsible for production (at the base station) and consumption (at the mobile station) of the MAP PDU. This protocol is the only protocol that directs the Physical Layer Protocol to send to (at the base station) and receive from (at the mobile station) the MCH. At the mobile station, this protocol is responsible for supervision of the MAP PDU.

The MAC sublayer 640 also includes a downlink traffic channel MAC module 644 that implements a downlink traffic channel MAC protocol. The downlink traffic channel MAC module 644 is responsible for directing the Physical Layer Protocol to transmit (at the base station) and receive (at the mobile station) the DCH. At the base station, this protocol takes a PDU train received from the xDU Transformation protocol and formulates a mega-PDU that exactly fits into the payload of the DCH. At the mobile station, this protocol will take this mega-PDU received via the DCH and produce a train of PDUs for the xDU Transformation protocol that is free of any Physical Layer padding.

Shared Signaling MAC Module 642

In one embodiment, the shared signaling MAC module 642 performs many functions, including:

Defining the MAP PDU;

Mapping the MAP PDU to the MCH Physical Layer channel at the base station; and

Controlling the Physical Layer at the mobile station so it will receive the MCH and pass the MAP PDU to this protocol.

In one embodiment, the MAP PDU contains information necessary for the Downlink Traffic MAC protocol at the mobile station to control the Physical Layer protocol. This information is received by this protocol at the mobile station and shared with the Downlink Traffic MAC protocol. The MAP PDU is mapped to the MCH. The MCH occupies the same location in the broadcast physical layer frame. The MAP PDU originates at the base station, and is received and interpreted by the mobile station.

Figure 18:
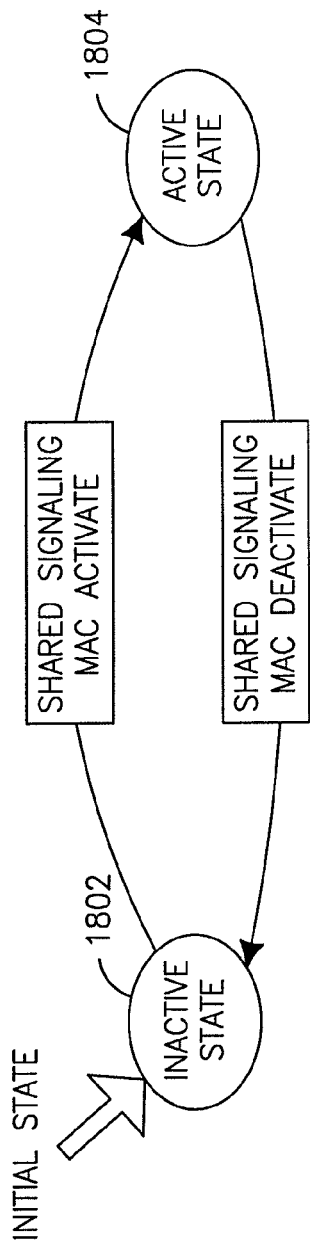
FIG. 18 is a state diagram illustrating the states of the shared signaling MAC module 636 of FIG. 6 at the mobile station.

At the base station, the composition of the MAP is governed by limits placed upon the size of the MCH and upon a scheduling entity which is not defined by this air interface. This scheduling entity has network wide scope, insuring that all base stations within a single frequency network, will be generating exactly the same MAP FIG. 18 is a state diagram illustrating the states of one embodiment of the shared signaling MAC module at the mobile station. At the base station, this protocol is implemented with a single state, called the Active state. As shown in FIG. 18, the mobile station starts in an inactive state 1802. When the module receives an activate command it transitions to an active state 1804, where it remains until receiving a deactivate command. In the active state 1804, the base station instance of the shared signaling MAC module transmits and the instance of the module at the mobile station receives the MAP PDU via the MCH physical layer channel.

At the base station, the MAP PDU is mapped to the MCH. In one embodiment, the MCH is transmitted using QPSK modulation, with a rate ½ convolutional turbo coding. These requirements on the MCH imply that for this channel, there are 6 data bytes per slot.

In one embodiment, the MCH can be transmitted in the first symbol group of the Physical Layer Frame, which is a PUSC zone. The MCH will only occupy the remainder of the first symbol group and will not spill over into the second symbol group. This requirement places a restriction on the size, in sub-channels, of the MCH. This restricted size will depend upon the size of the FFT. There is an optional zone switch after the first symbol group.

In one embodiment, the Physical Layer channel described by the MAP can be the DCH. The DCH can employ either convolutional coding or convolutional Turbo coding. The DCH can use convolutional Turbo coding with incremental redundancy (IR). The DCH can commence on the first slot of the second symbol group and encompass the remainder of the Physical Layer Frame. The zone type of the DCH can be either PUSC or PUSC with ⅔ antenna space time coding (STC). If the zone type is ⅔ antenna STC, this implies a zone switch after the first symbol group.

In one embodiment, the fundamental parameters of the Physical Layer waveform and the resulting symbol durations with cyclic prefix, G, being both ¼ and ⅛. Using appropriate symbol times, the number of symbols per frame and the receive-receive gap (TRrg) can be computed, using the following rules for determining TRrg.

1. TRrg is what remains after the maximum integral number of symbols that would fit into TTddFrame have been subtracted from TTddFrame
2. If TRrg is less that 45 microseconds, then TRrg is incremented by one symbol duration, and the number of symbols per TTddFrame is decremented by one.

In an embodiment, a receive-receive gap can be added to the broadcast to allow for frame synchronization techniques that rely on a gap between cyclic prefix detections exceeding a symbol duration. In one example, the receive-receive gap may be no less than 45 microseconds because this represents roughly 50% of a symbol duration, and therefore could produce a strong enough signature in a cyclic prefix gap detection algorithm.

In one embodiment, a H-ARQ is employed at the Physical Layer where there may be a single H-ARQ region within the DCH encompassing the entire DCH. Within this H-ARQ region, there may exist multiple sub-bursts. The number of slots occupied by each sub-burst can vary. The total size of the H-ARQ region, and hence the DCH, will depend upon the size of the FFT. The DCH begins on the first symbol following the first symbol group (the first symbol group contains the FCH and the MCH). In one example, the DCH begins on symbol number 3, with the preamble occupying symbol number 0, and the FCH and the MCH occupying symbols 1 and 2.

Typically, each H-ARQ sub-burst carries one H-ARQ packet. In one embodiment, the size of this packet can vary according to the set: {48, 96, 144, 192, 288, 384, 480, 960, 1920, 2880, 3840, 4800, 9600, 14400, 19200, 24000}. If the H-ARQ packet size is chosen to be large, then fewer sub-bursts are required to fill the entire DCH. If the H-ARQ packet size is chosen to be small, then more sub-bursts are required to fill the entire DCH.

Downlink Traffic Channel MAC Module

The downlink traffic channel MAC module 644 maps downlink MAC PDUs received from the xDU Transformation module 616 to the physical layer channel (F-DCH) at the Base Station. At the mobile station the xDU transformation module 616s protocol provides capability to extract downlink MAC PDUs from the physical layer channel (F-DCH), and processes them for reception. The module processes all the MAC PDUs including MAC management PDUs as well as applications PDUs.

Figure 19:
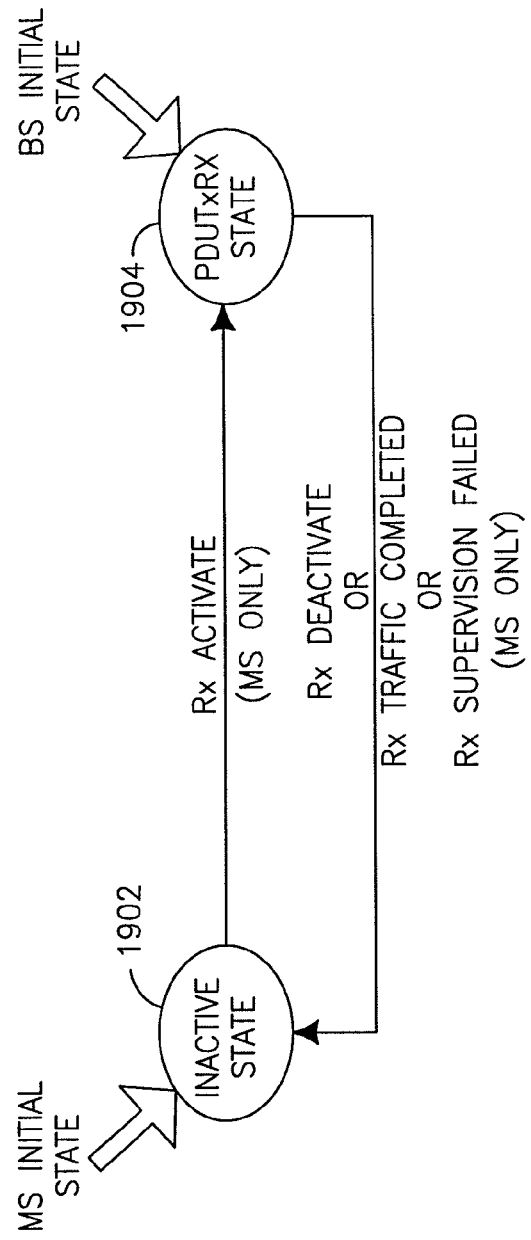
FIG. 19 is a state diagram illustrating states of the downlink traffic channel MAC protocol module 644 of FIG. 6.

FIG. 19 is a state diagram illustrating states of the downlink traffic channel MAC module 644. The module in the mobile station begins in an inactive state 1902, where the module waits for an activate command. This state is only applicable to mobile station and occurs when mobile station is not required to receive the downlink traffic. Upon receiving an activate command, the module transitions to a PDU transmit/receive state 1904. In the PDU transmit/receive state 1904 the base station transmits the PDU with fixed/variable length. In this state the mobile station receives the PDU with fixed/variable length.

The mobile station enters the PDU transmit/receive state 1904 upon receiving the activate command. When the Mobile Station is in the PDU transmit/receive state 1904, it can start receiving PDUs from the Physical Layer Protocol from F-DCH and can start passing the PDU to the xDU transformation module 616 in the mobile station. When in the PDU transmit/receive state 1904, the mobile station can monitor the PDUs received from the physical layer protocol 662 and indicate a failure if no PDU is received for a significant interval. The mobile station can exit the PDU transmit/receive state 1904 upon receiving a deactivate command, when it will transition to the inactive state 1902.

When the Base Station is in the PDU transmit/receive state 1904 it can start receiving PDUs from the xDU transformation module 616 and start passing the PDUs to the F-DCH of Physical Layer Protocol.

Physical Layer Control Sublayer

Following is further detail of the physical layer control sublayer module 650 of FIG. 6. The physical layer control sublayer includes a physical layer control module 652 that implements a physical layer control protocol. In one embodiment, the physical layer control module 652 can be implemented on the transmit side in the base station 112 of FIG. 1 or the single frequency network adapter 520 or base station 620 of FIG. 2. In an embodiment, the physical layer control module 652 may be implemented in a receiver in the mobile station 106 of FIG. 1 or the mobile station 270 of FIG. 2.

Figure 20:
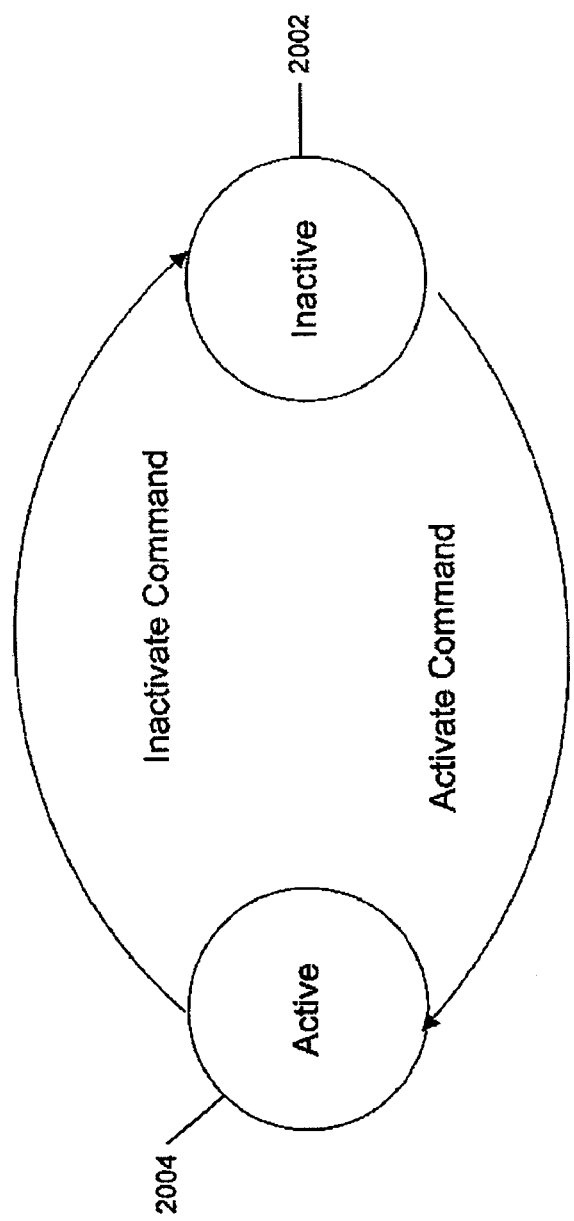
FIG. 20 is a state diagram illustrating the states of the physical layer control protocol module 652.

The physical layer control module 652 provides the physical layer control procedures for the base station and the mobile station. FIG. 20 is a state diagram illustrating the states of the physical layer control module. The module begins in an inactive state 2002. In the inactive state, the module waits for an activate command. Upon receiving an activate command the module transitions to an active state 2004. In the active state 2004 the base station transmits the FCH on the downlink and the mobile station receives and decodes the FCH. When the MS receives an inactivate command, while in the Active state, it transitions to the inactive state 2002.

In the active state 2004, the base station can transmit the FCH at the beginning (right after the downlink) of each downlink frame. The FCH carries the DL frame prefix, which is a data structure containing information regarding the current frame. The DL frame prefix includes a subchannel bitmap indicating which groups of subchannel are used on the first PUSC zone and on PUSC zones in which use all subchannels indicator is set to '0,' meaning not used by this segment.

In one embodiment, the DL frame prefix also includes a repetition coding indication that indicates the repetition code used for the MAP. Repetition code may be 0 (no additional repetition), 1 (one additional repetition), 2 (three additional repetition) or 3 (five additional repetitions). The DL frame prefix also includes a coding indication that indicates the FEC encoding used for the MAP. The MAP shall be transmitted with QPSK modulation at FEC rate ½. The BS shall ensure that MAP is sent with the mandatory coding scheme often enough to ensure uninterrupted operation of a subscriber station (SS) supporting only the mandatory coding scheme. In addition, the DL frame prefix includes a Map length value that defines the length, in slots, of the MAP message that follows immediately after the DL frame prefix after repetition coding is applied. In one embodiment, before being mapped to the FCH, the 24-bit DL frame prefix shall be duplicated to form a 48-bit block which is the minimal FEC block size.

In an embodiment, in a PUSC, any segment can be allocated at least the same amount of subchannels as in a subchannel group #0. For FFT sizes other than 128, the first 4 slots in the downlink part of the segment contain the FCH. These slots contain 48 bits modulated by QPSK with coding rate ½ and repetition coding of 4. For FFT size 128, the first slot in the downlink part of the segment is dedicated to FCH and repetition is not applied. The basic allocated subchannel sets for Segments 0, 1, and 2 are Subchannel group #0, #2 and #4 respectively.

In one embodiment, the mobile station can be capable of receiving and decoding the FCH that is sent by the base station at the beginning of each frame. If the two DL frame prefix messages received in the FCH do not match, then the mobile station can generate a FCH DL Frame Prefix FCH DL Frame Prefix indication and can wait for the next downlink frame. After successful decoding of the DL Frame Prefix message in the FCH (there is no mismatch between the two DL Frame Prefix received in the FCH), the MS can have the knowledge of how many and which subchannels are allocated to the PUSC segment.

In one embodiment, to observe the allocation of the subchannels in the downlink as a contiguous allocation block, the subchannel can be renumbered. The renumbering for the first PUSC zone can start form the FCH subchannels (renumbered to values 0 . . . 11), then continue numbering the subchannels in a cyclic manner to the last allocated subchannel and from the first allocated subchannel to the FCH subchannels.

In another embodiment, for PUSC zones in which the "use all SC" indicator is set to '1' or which are defined by AAS_DL_IE( ), renumbering can be performed starting from subchannel (Nsubchannels/3)*PRBS_ID,. where PRBS_ID is specified in the STC_DL_Zone_IE or AAS_DL_IE( ). For other PUSC zones, in which the "use all SC" indicator is set to '0', the renumbering shall be the same as in the first PUSC zone.

In one embodiment, the mobile station can be capable of determining that the System Time has to be corrected because of the drift in timing experienced at the receiver. Once it has been determined that a timing correction has to be applied to the SystemTime, the mobile station can update the global public parameter System Time Correction and generate the System Time Correction Parameter Updated Indication.

In an embodiment, once the mobile station has achieved downlink synchronization, it can continue to be in sync until one of the following events occurs:

No valid MAP message has been received for Lost_MAP_Interval, or

T1 interval has elapsed without a valid DCD.

When one of the above events occurs, the MS can declare a loss of synchronization and generate a DL Synchronization-Lost Indication.

Physical Layer Sublayer

Following is further detail of the physical layer sublayer module 660 of FIG. 6. The physical layer sublayer includes a physical layer module 662 that implements a physical layer protocol. In one embodiment, the physical layer control module 652 can be implemented on the transmit side in the base station 112 of FIG. 1 or the single frequency network adapter 520 or base station 620 of FIG. 2. In an embodiment, the physical layer module may be implemented in a receiver in the mobile station 106 of FIG. 1 or the mobile station 270 of FIG. 2.

The physical layer is a broadcast only layer. Implementation of the physical layer is fundamentally simpler because it is downlink only and does not need to support any uplink transmissions. In one embodiment, the layer uses fixed modulation and coding chosen to maximize coverage without ARQ mechanisms. Multiple access aspects of OFDM are not employed, as all mobile stations potentially receive the same broadcast signal or programming. Without an uplink there is no duplexing, so the OFDM TDD frame structure reduces to an OFDM TD frame structure that does not schedule reverse link transmissions.

In one embodiment, the frame of the physical layer will be either 5, 10, or 20 milliseconds in length. The permutation type is PUSC. The first symbol of the frame will be a preamble, selected from among the 114 available preamble sequences. This preamble sequence will not change and will be common to all modulators. The next two symbols (first symbol group) will contain the FCH and MAP. At the conclusion of the first symbol group, an optional zone switch will occur. This zone switch will allow for optional STC PUSC. The remainder of the frame consists of one large allocation. This allocation will contain MAC PDUs channel coded with either CTC or CTC IR H-ARQ with no acknowledgement.

Figure 21:
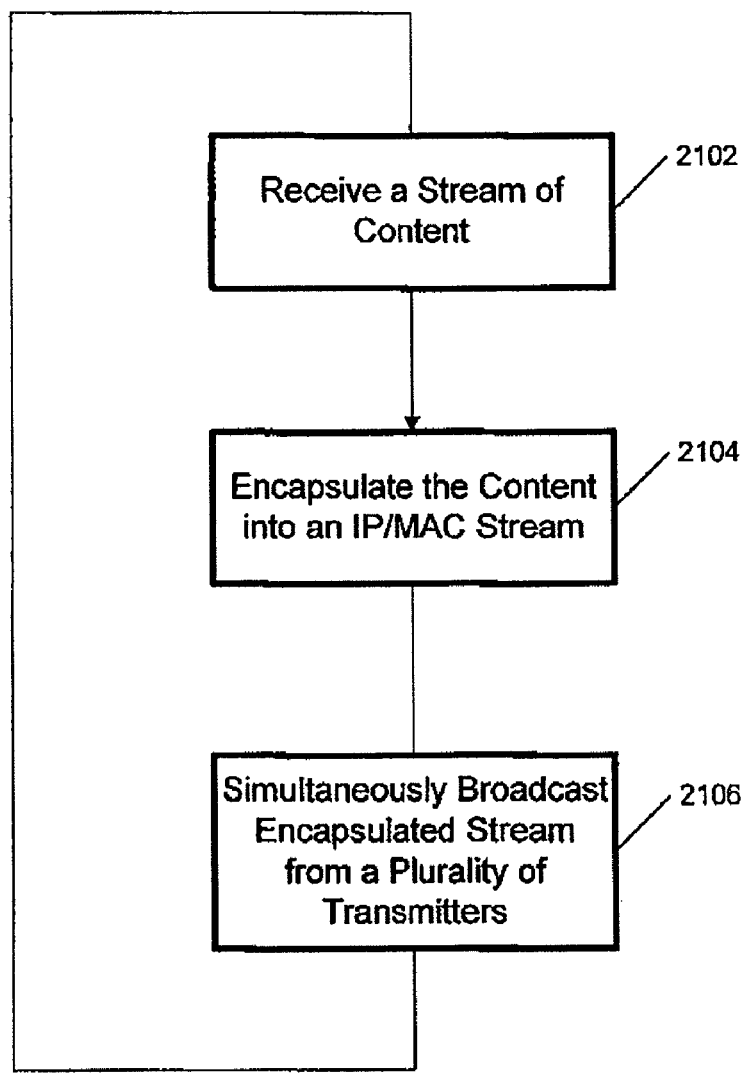
FIG. 21 is a flow diagram of one exemplary embodiment of a method of broadcasting data according to the invention.

FIG. 21 is a flow diagram of one embodiment of a method of broadcasting data. Flow begins in block 2102 where a stream of content is received. In one embodiment, multiple streams of content are received. The content can be, for example, movies, games, audio broadcast, broadcast television programs, or other multimedia data. Flow continues to block 2104 where the received content is encapsulated into an IP/MAC content stream.

Flow continues to block 2106 where the encapsulated content stream is broadcast from a plurality of transmitters. The transmitters are synchronized, and are configured to transmit the same signal from the plurality of transmitters. Flow continues to block 2102 and the process of receiving, encapsulating, and broadcasting continues.

Figure 22:
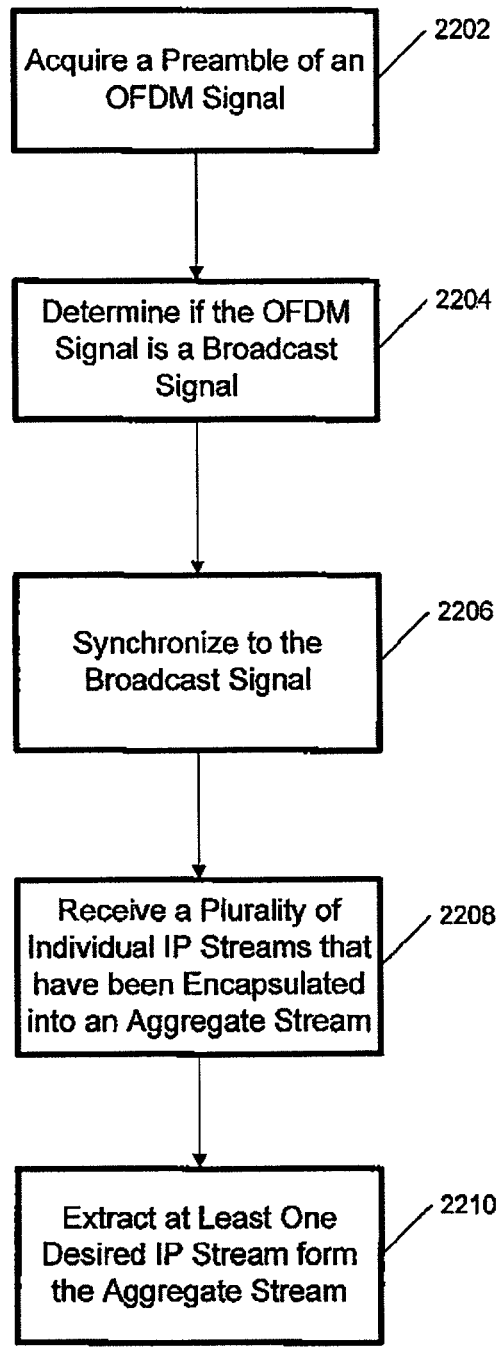
FIG. 22 is a flow diagram of an exemplary embodiment for receiving broadcast data in a single frequency network having a plurality of transmitters according to the invention.

FIG. 22 is a flow diagram of an embodiment for receiving broadcast data in a single frequency network having a plurality of transmitters. Flow begins in block 2202 where a receiver scans pre-selected frequencies searching for and acquiring preambles from OFDM signals. When a preamble has been acquired flow continues to block 2204 where it is determined if the OFDM signal is a broadcast signal. For example, a MAP in the OFDM signal can be examined to determine if the signal is a broadcast signal.

If the signal is a broadcast signal, flow continues to block 2206 and the receiver synchronizes to the broadcast signal. Once synchronized, flow continues to block 2208 and an aggregate content stream is received. The aggregate content stream includes a plurality of individual IP streams that have been encapsulated. Flow continues to block 2210 where at least one of the individual IP streams is extracted from the aggregate stream.

Figure 23:
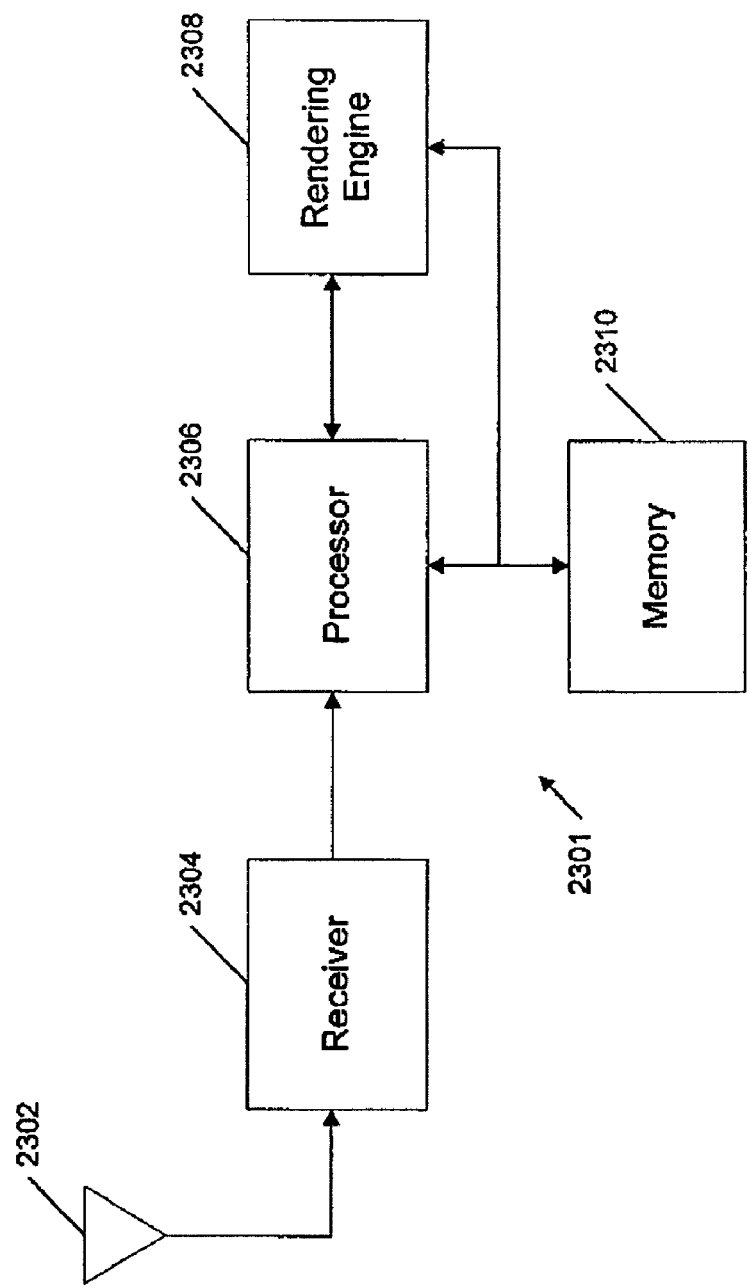
FIG. 23 is a block diagram of an exemplary embodiment of a receiver in a broadcast system according to the invention.

FIG. 23 is a block diagram of an embodiment of a receiver 2301 in a broadcast system according to the invention. The receiver includes an antenna 2302 that communicates RF signals to a receiver 2304. The receiver 2304 is configured to receive an RF broadcast signal, demodulate it and provide a baseband signal to a processor 2306.

The processor 2306 receives the baseband data that includes a composite stream of content and the processor 2306 extracts a desired IP stream from the composite stream. In one embodiment, the processor 2306 processes the extracted IP stream and presents it to a user. In another embodiment, the processor 2306 communicates the extracted IP stream to an optional rendering engine 2308 and the rendering engine 2308 processes the IP stream and presents it to the user. The receiver 2301 also includes a memory 2310. The memory 2310 can be used by the processor 2306 and the rendering engine 2308 (if included) for storage of data during operation. In addition, the memory 2310 may include instructions used by the processor 2306 and rendering engine 2308 during operation.

It is noted that modules, or components, of the receiver 2301 can be separated. For example, the antenna 2302 can be located separately from the receiver 2304 and the processor 2306. Likewise, the rendering engine 2308 can be located separately from the processor 2306. Other combinations are also possible.

Figure 24:
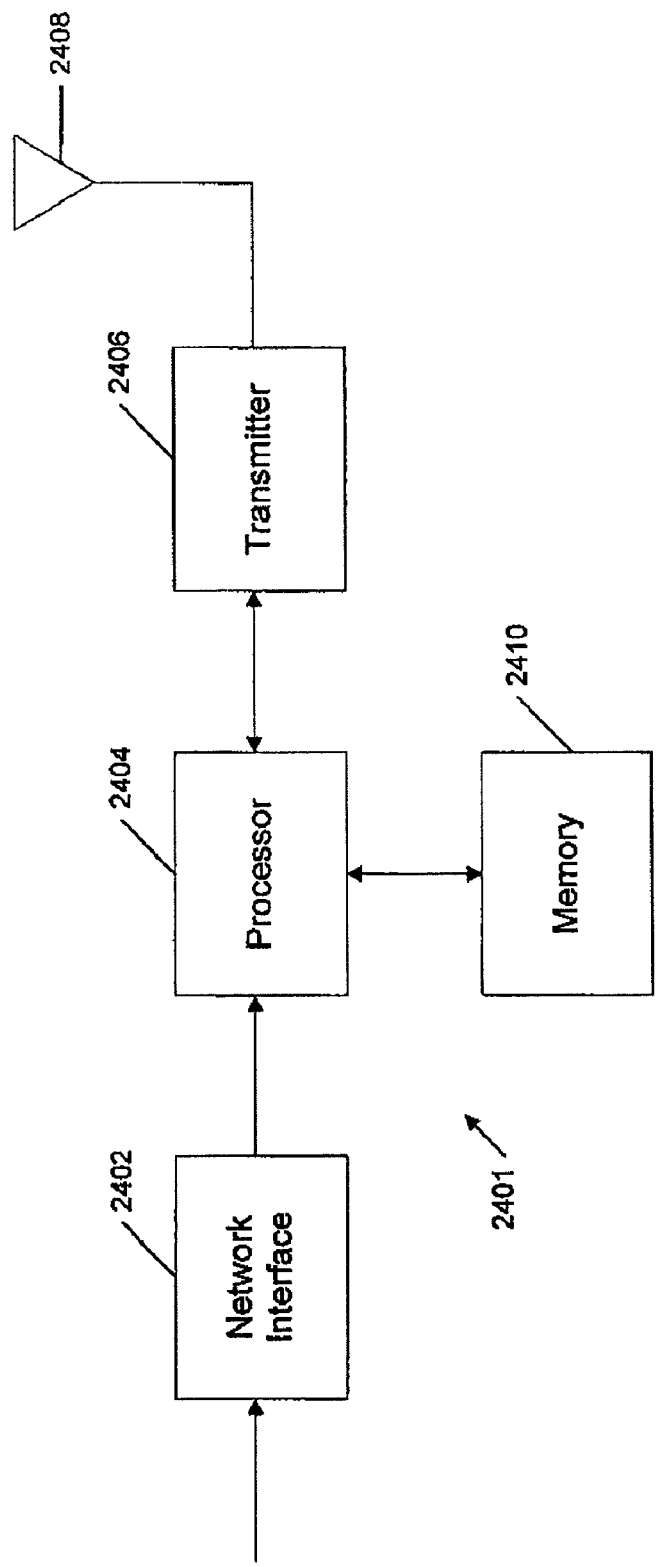
FIG. 24 is a block diagram of an exemplary embodiment of a transmitter in a broadcast system according to the invention.

FIG. 24 is a block diagram of an embodiment of a transmitter 2401 in a broadcast system. The transmitter 2401 includes a network interface 2402 adapted to receive content from an IP network. In one embodiment there is a single content stream received at the network interface 2402, in other embodiments there are a plurality of content streams received at the network interface 2402. The network interface 2402 communicates the received content to a processor 2404. The processor 2404 encapsulates the content into an IP/MAC content stream.

The processor 2404 communicates the encapsulated content to a transmitter 2406. The transmitter 2406 is configured to transmit the content as an OFDM signal via antenna 2408. In one embodiment, the transmission of the content by the transmitter 2401 is synchronized with the transmission of the same content by other transmitters within a single frequency network.

The transmitter 2401 also includes a memory 2410. The memory 2410 can be used by the processor 2404 for storage of data during operation. In addition, the memory 2410 may include instructions used by the processor 2404 during operation.

The various modules and components of the transmitter 2401 can be separated. For example, the antenna 2408 can be separated from the transmitter 2406. In another example, the antenna 2408 and transmitter 2406 are located separately from the processor 2404, memory 2410, and network interface 2402. Other combinations are also possible.

Figure 25:
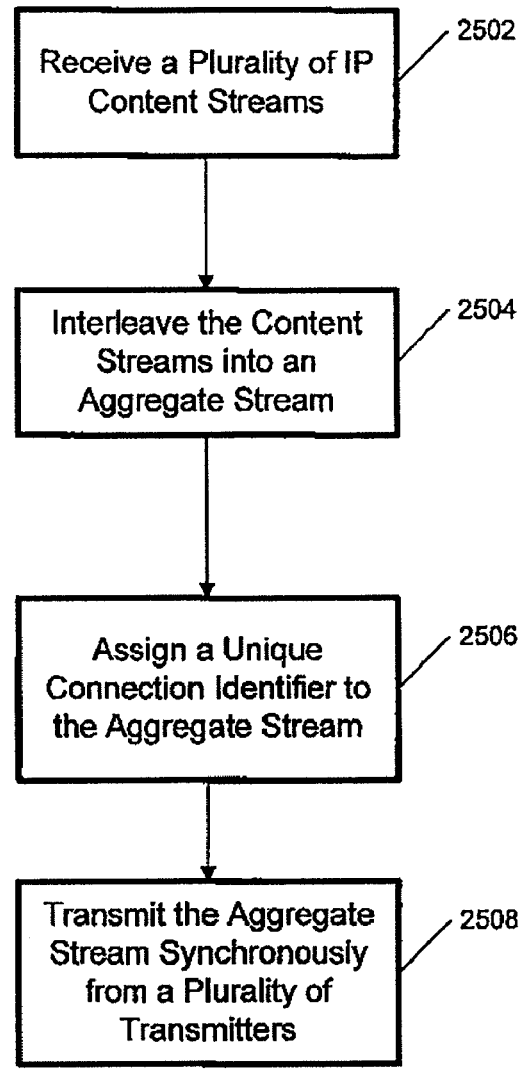
FIG. 25 is a flow diagram of an exemplary embodiment of a method for assigning a connection identifier to a plurality of IP content streams in a broadcast system according to the invention.

FIG. 25 is a flow diagram of an embodiment of a method for assigning a connection identifier to a plurality of IP content streams in a broadcast system of the present invention. Flow begins in block 2502 where a plurality of IP content streams are received. Flow continues to block 2504 where the plurality of IP content streams are interleaved into an aggregate content stream.

Flow continues to block 2506 where a unique connection identifier is assigned to the aggregate content stream. Then, in block 2508, the aggregate content stream is transmitted synchronously from a plurality of transmitters within a single frequency network.

Figure 26:
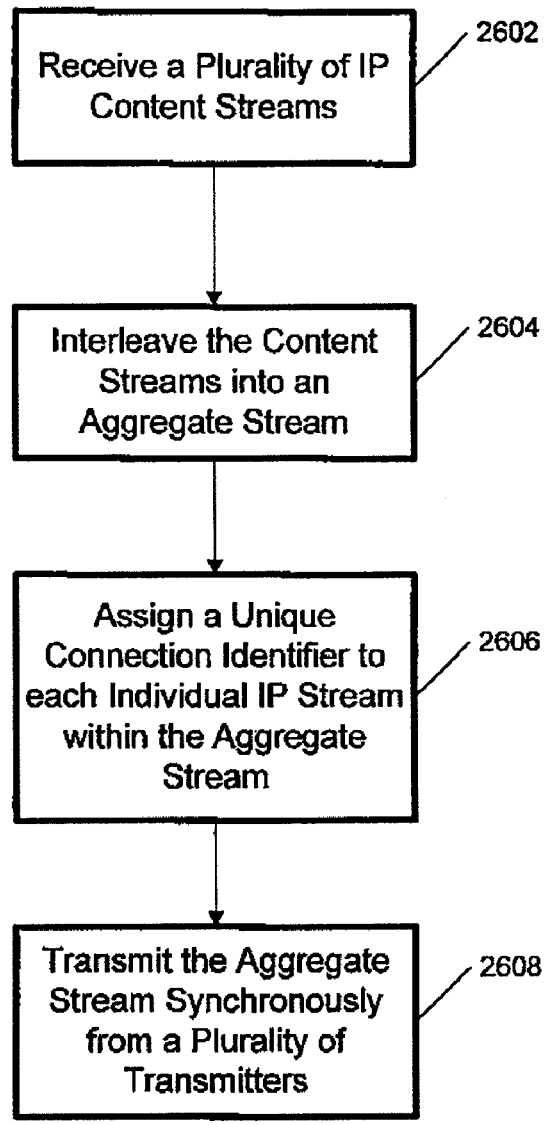
FIG. 26 is a flow diagram of another exemplary embodiment of a method for assigning a connection identifier to a plurality of IP content streams in a broadcast system according to the invention.

FIG. 26 is a flow diagram of another embodiment of a method for assigning a connection identifier to a plurality of IP content streams in a broadcast system of the present invention. Flow begins in block 2602 where a plurality of IP content streams are received. Flow continues to block 2604 where the plurality of IP content streams are interleaved into an aggregate content stream.

Flow continues to block 2608 where a unique connection identifier is assigned to each individual IP stream within the aggregate content stream. Then, in block 2608, the aggregate content stream is transmitted synchronously from a plurality of transmitters within a single frequency network.

Figure 27:
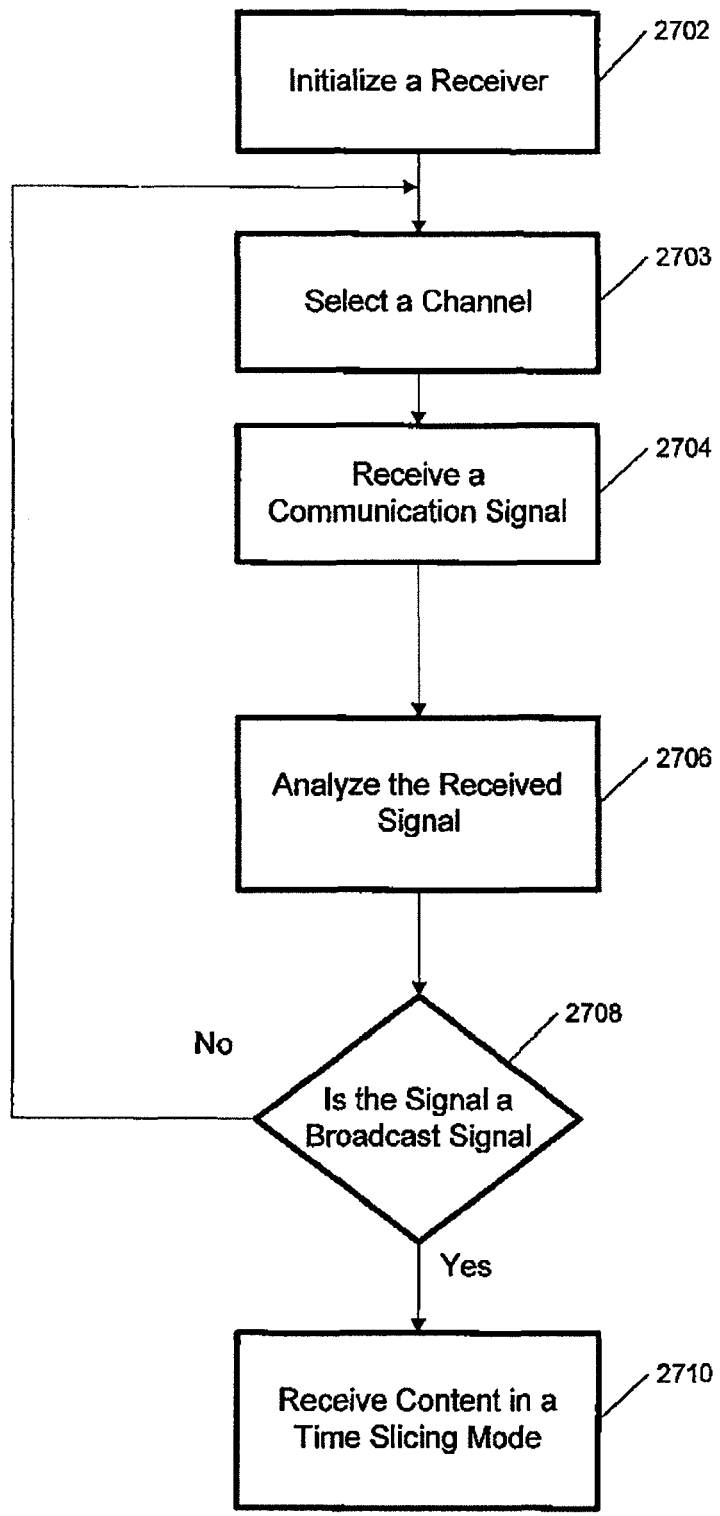
FIG. 27 is a flow diagram of an exemplary embodiment of a method of managing a wireless communication link in a broadcast system according to the invention.

FIG. 27 is a flow diagram of an embodiment of a method of managing a wireless communication link in a broadcast system of the present invention. Flow begins in block 2702 where a receiver in the broadcast system is initialized. Flow continues to block 2703 where a channel of the communication link is selected. Then in block 2704 the receiver acquires a communication signal. In one embodiment, the received signal is an OFDM signal and receiving the signal includes acquiring a preamble, and detecting a downlink map in the OFDM signal. Flow continues to block 2706 where the signal received is analyzed to determine if it is a broadcast signal. In one embodiment, the downlink map of the signal is analyzed. Flow continues to block 2708 in which it is determined if the received signal is a broadcast signal.

If the received signal is not a broadcast signal flow continues to block 2703 and another channel is selected and communication signals are acquired. If, in block 2708, it is determined that the received signal is a broadcast signal, then flow continues to block 2710 and the receiver begins receiving content from the broadcast system. In one embodiment, the receiver receives content from the broadcast system with the receiver operating in a time slicing mode.

Figure 28:
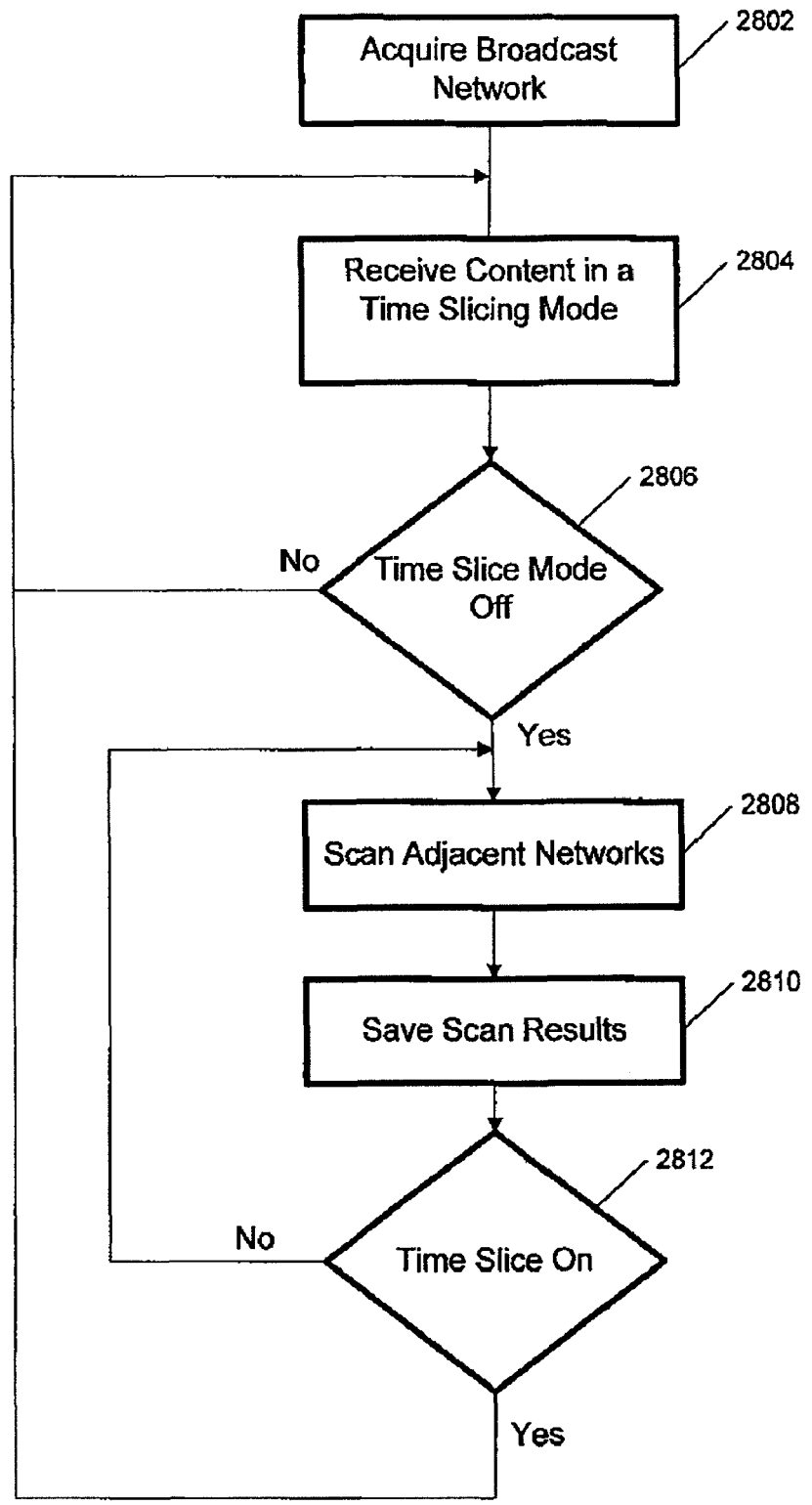
FIG. 28 is a flow diagram of another exemplary embodiment of a method of managing a wireless communication link in a broadcast system according to the invention.

FIG. 28 is a flow diagram of another embodiment of a method of managing a wireless communication link in a broadcast system of the present invention. Flow begins in block 2802 where a receiver acquires a signal from a broadcast network. Flow continues to block 2804 where the receiver receives content from the broadcast network. In block 2804 the receiver is operating in a time slice mode where the receiver acquires the broadcast signal when desired content is being broadcast by the system (time slice on) and does not acquire the broadcast signal when desired content is not being broadcast (time slice off).

Flow continues to block 2806 where it is determined if the receiver is operating in a time slice off period. If the receiver is not in a time slice off period, meaning that it is in a time slice on period, flow returns to block 2804 and the receiver continues to receive content. Returning to block 2806, if the receiver is in a time slice off period flow continues to block 2808 where adjacent networks are scanned to determine if they are broadcast networks, and to determine the quality of the signal received from adjacent broadcast networks. In block 2810 the scan results are saved.

Flow continues to block 2812 where it is determined if the receiver is entering a time slice on period. If the receiver is not entering a time slice on period, flow returns to block 2808 and the receiver can scan for additional networks or perform other operations, or enter a sleep state. If the receiver is entering a time slice on period flow returns to block 2804 and the receiver receives content.

Figure 29:
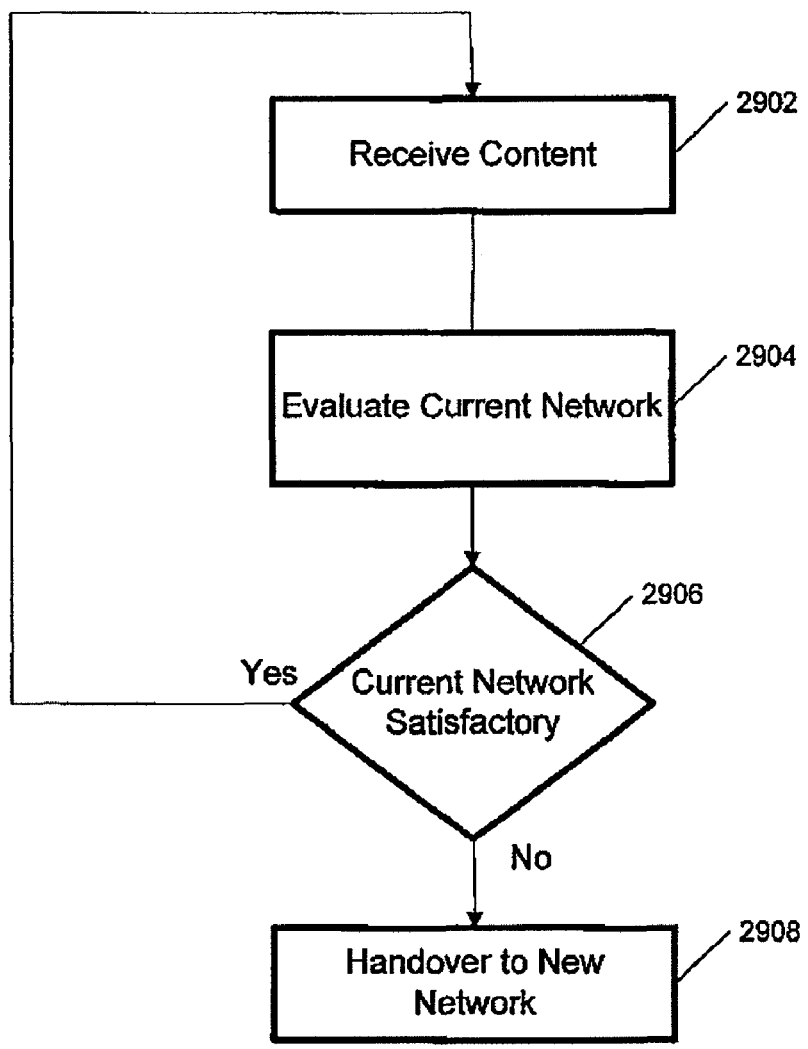
FIG. 29 is a flow diagram of another exemplary embodiment of a method of managing a wireless communication link in a broadcast system according to the invention.

FIG. 29 is a flow diagram of another embodiment of a method of managing a wireless communication link in a broadcast system of the present invention. In block 2902 content is received. Flow continues to block 2904 and the current network is evaluated. In one embodiment, the evaluation of the current network is to determine if the operation of the current network is satisfactory, for example, if the network has sufficient signal to noise ratio, or bit error rate, or other network performance metric.

Flow continues to block 2906 where it is determined if the current network is satisfactory. If the current network is satisfactory, flow returns to block 2902 and additional content is received. If, in block 2906, it is determined that the current network is not satisfactory then flow continues to block 2908 and a handover to a new network is performed. In one embodiment, the new network is selected from a list of satisfactory networks identified during a scan of adjacent networks.

Convergence Sublayer

Following is further detail of the Convergence Sublayer module 610 shown in FIG. 6. The convergence sublayer module 610 includes a Transport Stream Convergence Protocol (TSCP) module 670 and a Signaling Convergence Protocol (SCP) module 672. Portions of the operations of the TSCP and SCP modules can be implemented in the receiver 2301 of FIG. 23, and the transmitter 2401 of FIG. 24. Likewise, various operations of the TSCP and SCP modules can be implemented in the mobile station 106 of the access service network of FIG. 1. In one embodiment of a transmitter, some of the functions of the TSCP and SCP modules can be performed in an IP encapsulator module.

Transport Stream Convergence Protocol Module

As noted above, in one embodiment, the TSCP module 670 maps higher level packets into MAC Common Part Sublayer, or MAC, SDUs. For example, the TSCP module can map MPEG-2 transport stream packets into MAC SDUs that can be transmitted over a wireless air interface, such as an OFDMA interface similar to the IEEE 802.16 standard. The TSCP module can also assign a connection ID to each of the MAC SDUs. In one embodiment, the TSCP module can map an MPEG-2 transport stream that is formed for DVB-H content into MAC SDUs.

In one embodiment, a convergence sublayer is included in each transmitter in a SFN and in each receiver configured to receive the broadcast signal. As explained further below. The convergence sublayer in each transmitter, or base station, receives a stream of transport packets. The convergence sublayer partitions and encapsulates the transport packets into an intermediary packet format to create intermediary packets such that a size dimension of the intermediary packet matches a size dimension of a MAC protocol data unit. A MAC common part sublayer encapsulates the intermediary packets into MAC protocol data packets such that the intermediary packets are not fragmented. The MAC protocol data units are provided to a transmitter that is synchronized to a plurality of transmitters in a single frequency networks so that each transmitter in the network broadcasts an identical signal that includes the MAC protocol data units.

Figure 30:
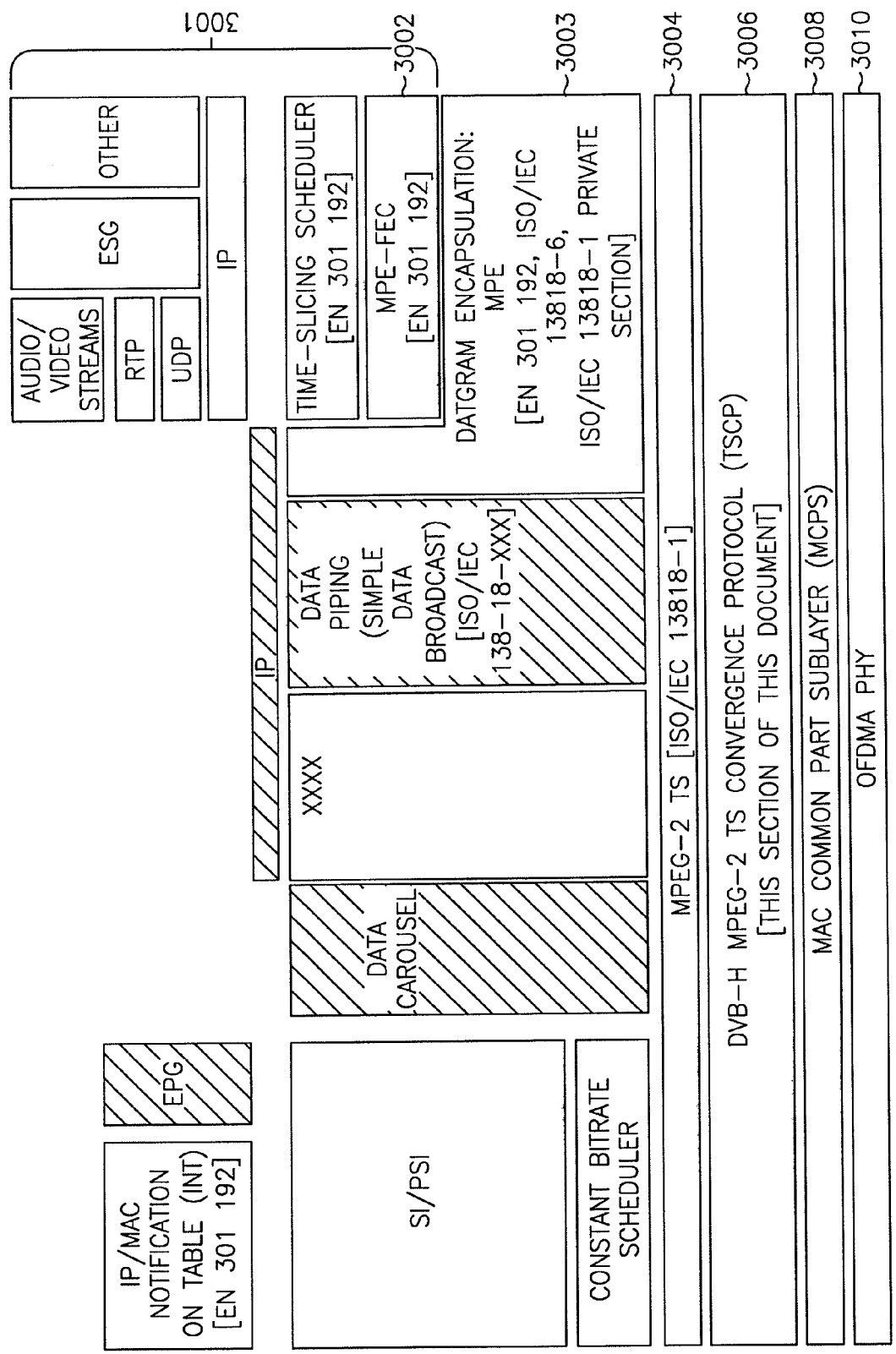
FIG. 30 is a block diagram illustrating an exemplary protocol layering model and associated modules that perform processes in accordance with an embodiment of a transport stream convergence protocol stack.

FIG. 30 is a block diagram illustrating an exemplary protocol layering model and associated modules that perform processes in accordance with an embodiment of a transport stream convergence protocol stack. As shown in FIG. 30, an encoder/encapsulator module 3002 receives content, for example, audio/video data, or streams, multimedia data, movies, games, audio broadcast, television network programs, electronic program guide and electronic service guide, or other types of multimedia content and encodes or transcodes the content if needed. The encoded content is then encapsulated. In one embodiment, as described above, the encoded content is encapsulated into MPE-FEC frames 3002 then encapsulated into datagrams 3003 as MPE and MPE-FEC.

The encapsulated content is communicated to a transport stream module 3004 where it is formatted into transport stream packets. In one embodiment, the encapsulated content is formatted into MPEG-2 transport stream packets. The transport stream packets are then communicated to the Transport Stream Convergence Protocol (TSCP) module 3006. The TSCP module 3006 maps the transport stream packets into TSCP PDUs which are sent as MAC SDUs that can be sent to the MAC and transmitted over a wireless air interface, such as an OFDMA interface similar to the 802.16 standard. The TSCP module 3006 can also assign a connection ID to each of the MAC SDUs. In one embodiment, the TSCP module 3006 can map an MPEG-2 transport stream that is formed for DVB-H content into MAC SDUs. The TSCP module 3006 communicates the TSCP PDUs as MAC SDUs to the MAC Common Part Sublayer 3008. The MAC Common Part Sublayer 3008, performs aspects of the data transport operation, such as synchronizing frame transmission with the PHY layer, filling downlink allocations, or containers, with PDUs, and scheduling. The MAC common part sublayer 3008 communicates MAC PDUs to the physical layer 3010 which provides the physical layer transport for air link messages.

A TSCP module 3006 exists in both the transmit side and the receive side of the broadcast system. On the transmit side, the TSCP module 3006 receives upper layer packets, such as MPEG-2 TS packets and forms a TSCP PDU which is sent to the MAC Common Part Sublayer 3008 as a MAC SDU. In one embodiment, a TSCP PDU has a header followed by sequential bytes from MPEG-2 transport stream (TS) packets. After a TSCP module 3306 in a receiver receives and concatenates the TSCP PDUs, it extracts TS packets in the exact same sequence.

Aspects of TSCP TS encapsulation include:
1. Introduction of a small amount of overhead (header).
2. Enabling a receiver to efficiently, in terms of logic complexity, CPU time, and buffer management, reconstruct the stream of TS packets.
3. No buffering in the transmitter. Buffering may introduce jitter which could cause a receiver to loose time-slicing accuracy.
4. Enable a receiver to identify missing or errant blocks of data so as to enable MPE-FEC processing.

The data passed to a TSCP module 3006 peer via the lower layer bearer protocol is a concatenation of TSCP PDUs sized to fit in a list of containers, or allocations, provided by the lower layer bearer protocol. See for example, FIG. 8, where the scheduler module 614 in the MAC common part sublayer 612 provides a list of containers, or container tokens, to convergence protocol module 808.

A conventional convergence sublayer has no knowledge of frame time or frame boundaries. Thus, a conventional convergence sublayer has no knowledge about lower layer containers, sometimes called allocations or allocation regions. A container is a sequence of bytes that the TSCP module can use to fill a lower layer (MAC) PDU. In the system described herein, the TSCP module has knowledge of the lower layer containers which permits the TSCP module 3006 to "pre-fragment" a MPEG-2 TS packet stream. Pre-fragmenting by the TSCP module 3006 can result in more efficient convergence, such as less overhead, to the lower layer MAC PDU. As illustrated in FIG. 8, the scheduler module 614 publishes a list of containers, and their respective sizes, for each downlink PHY frame. The TSCP module 3006 uses knowledge of the container sizes to appropriately size the TSCP PDU in accordance with the container size. In other words, the TSCP module 3006 receives a stream of container sizes, or container tokens, that correspond to a sequence of actual allocations in current and future PHY frames.

The container tokens filled by the TSCP module 3006 are typically not shared by other protocol modules such as the signaling convergence protocol (SCP) module. It is generally the responsibility of another protocol module to schedule containers for each bearer protocol that accesses the MAC layer.

In one embodiment, fields in a TSCP header are designed to assist a receiver with TS packet reconstruction. Indicators in the header can include:
   Whether the first TS packet in the TSCP PDU is a fragment of a TS packet, and the previous part of a TS packet was sent in the previous TSCP PDU.
   The number of bytes in the first TS packet if it is a fragment.
   The number of TS packets 'started' in the TSCP PDU.
   A header check sequence (HCS). The HCS is a three-bit CRC computed over the other bits in the TSCP header.

In one embodiment, DVB-H layers above the TSCP module 3006 encode an MPE-FEC frame into a "burst." The technique by which the DVB-H layers above TSCP module encode the MPE-FEC bursts can affect operation, but the TSCP module treats all of the transport stream packets the same. For example, MPE sections can be transmitted in a series of MPEG-2 TS packets that all have a Packet Identification (PID) value. Directly following that, the MPE-FEC sections are transmitted in more MPEG-2 TS packets that have another PID. The MPE and MPE-FEC sequence of MPEG-2 TS packets can be thought of as a "burst." It is noted that DVB-H does not allow TS packets with other PIDs to be transmitted in the burst. Other non-MPE-FEC MPEG-2 TS PIDs can arrive between bursts, such as Service Information/Program Specific Information (SI/PSI) tables, and use reserved PIDs. The FEC sections that carry Reed-Solomon FEC data also have the same PID (a different PID than the MPE sections). The SI/PSI tables follow the same TSCP encapsulation rules as MPE or MPE-FEC sections.

As mentioned above with respect to FIG. 8, in one embodiment, to avoid fragmentation in the lower layers (e.g., 802.16-style MAC PDU fragmentation), the lower layer exports a list of containers to the TSCP module, for example, as public data. In this embodiment, the TSCP module has fore-knowledge of the allocation regions and/or DCH packets of an OFDMA frame. Typically, a list of containers changes on a per-frame basis for the TSCP module to fill. However, in an embodiment of the broadcast system described herein, it is typical that the containers do not change often.

TSCP Aspects Common to Both Transmit and Receive Side

Some aspects of the TSCP module are common to both the transmit, or base station, side and the receive, or mobile station, side of the broadcast system. For example, aspects of the TSCP PDU which is an encapsulation of the TS packets. Following is a description of an embodiment of a TSCP PDU which is an encapsulation of MPEG-2 TS packets. The TSCP PDUs can have fragments of TS packets at both the beginning and the end of the PDU. The fragment length at the beginning of the PDU is signaled in a TSCP PDU header. The fragment length at the end is implied by the length of the PDU minus the other contents of the PDU.

Figure 31:
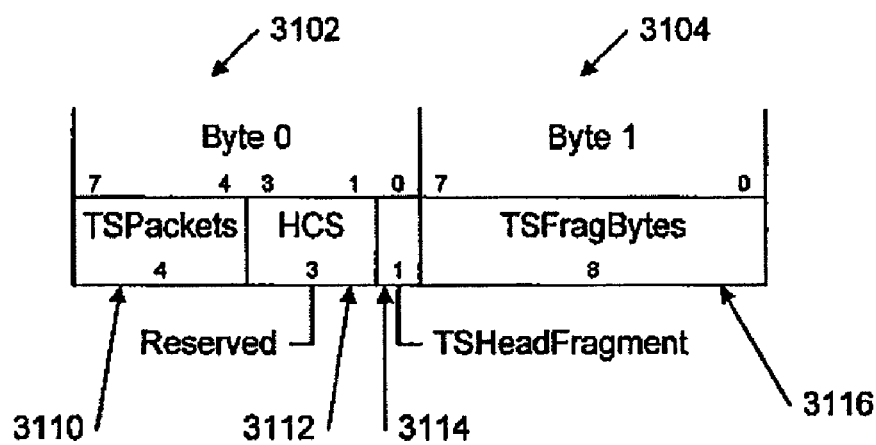
FIG. 31 is a block diagram illustrating an exemplary embodiment of a TSCP header.

FIG. 31 is a block diagram illustrating an exemplary embodiment of a TSCP header. As shown in FIG. 31, the TSCP header in this example includes two bytes 3102 and 3104 which are added to the TSCP PDU. The first byte 3102 includes a four bit TS Packets field 3110, a three bit Header Check Sequence (HCS) field 3112, and a one byte TS Head Fragment field 3114. The TS packets 3110 indicate the number of TS packets started in the TSCP PDU. In one embodiment, if the first byte of the TSCP PDU is not the first byte of a TS packet, it is not included in a TS Packets count. If the last byte(s) of the TSCP PDU are a fragment, it is included in the TS Packets count. In one embodiment, the count can be used in the case where another protocol invokes a TSCP flush, which can cause a TSCP PDU to be sent that does not fill a container provided by the lower layer. A receiver then uses the TS packets 3110 to determine how many TS packets to process, and to ignore the rest of the TSCP PDU.

The Header Check Sequence (HCS) 3112 is used to indicate the validity of the header. In one embodiment the HCS is a 3-bit CRC, using the polynomial x0+x1+x3. The HCS is computed over the 2-byte TSCP header with the HCS field set to 0. The TS Head Fragment field 3114 indicates whether the first byte of payload in a TSCP PDU is the first byte of a TS packet. In one embodiment, if the TS Head Fragment bit is set to 0, the first byte of payload in the TSCP PDU is the first byte of a TS packet, and if the bit is set to 1, then the TSCP PDU payload starts with a fragment of a TS packet.

The second byte 3104 of the TSCP header includes a TS fragmentation bytes field 3116. The TS fragment bytes field 3116 indicates the number of bytes occurring at the beginning of the payload that are a fragment of a TS packet.

Figure 32:
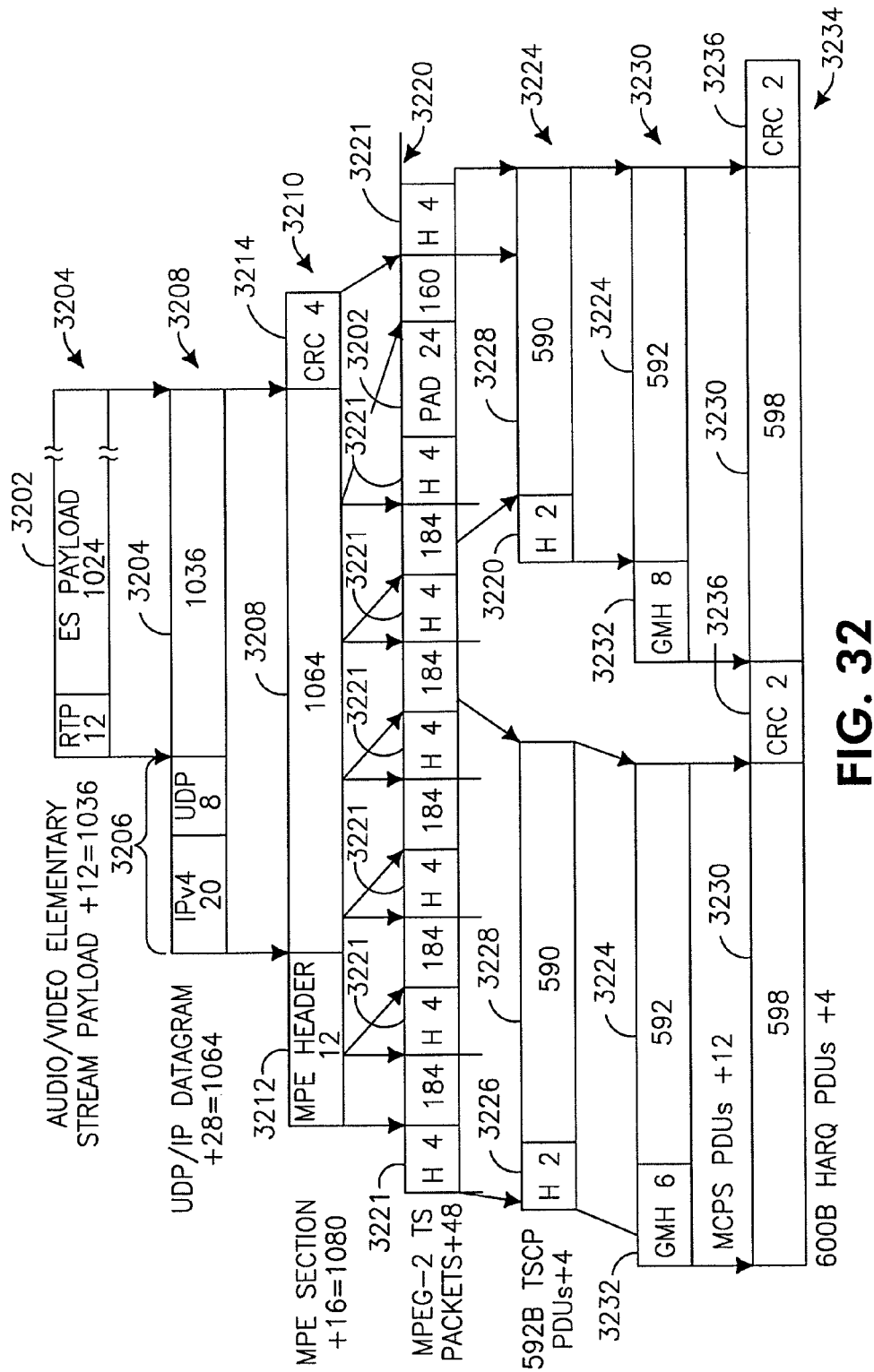
FIG. 32 is a block diagram illustrating an exemplary embodiment of PDU encapsulation and header insertion associated with an elementary stream (ES) payload, such as a multimedia payload, at different layers of the protocol stack illustrated in FIG. 30.

FIG. 32 is a block diagram illustrating PDU encapsulation and header insertion associated with an elementary stream (ES) payload, such as a multimedia payload, at different layers of the protocol stack illustrated in FIG. 30. Using the techniques illustrated by FIG. 30 can reduce the amount of overhead associated with broadcasting an ES payload. Beginning at the top of FIG. 32, a data source formats a block of bytes of an elementary stream 3202, or other type of payload. The payload can be various sizes. In one embodiment, a typical DVB-H payload size is 1 KB. The payload is encapsulated in RTP, forming an RTP PDU 3204, for the purpose of specifying the playback time-relevance of the payload. A typical RTP header is 8 bytes, and, on average, 4 bytes of optional header are also used, bringing the RTP header size to 12 bytes.

The RTP PDU 3204 is then encapsulated in UDP and IP 3206 forming an IP datagram 3208. In the example of FIG. 32, IPv4 is illustrated which employs a 28 byte header, but IPv6 which employs a 40 byte header could also be used. The IP datagram 3208 is then wrapped in an MPE section 3210. An MPE section 3210 includes a 12 byte section header 3212 and a 4 byte CRC 3214 for a total of 16 additional bytes of overhead. In one embodiment, the CRC 3214 is optional The MPE section 3210 is then fragementded and encapsulated as a stream of MPEG-2 TS packets 3220. Each of the TS packets includes a 4 byte header 3221.

One aspect of the process described is the assignment of a PID. A receiver uses the PID to identify the type of payload (e.g., SI/PSI table data or MPE sections), and elementary stream (ES). Some PIDs are reserved for SI/PSI and ES PIDs and are assigned dynamically and communicated to the receiver by way of SI/PSI tables. So, a transmitter, or base station, inserts the correct PID for the section, which is typically either elementary stream data, ESG or FEC data. When a section does not exactly fit in an integral number of TS packets, the last TS packet is padded. In the example of FIG. 32, there are 24 bytes of padding 3222 added in the TS packetization process.

The stream of MPEG-2 TS packets 3220 are then encapsulated as TSCP PDUs 3224. The TSCP layer adds a 2 byte header 3226 per lower layer container 3228. In one embodiment, the container can be a 600 byte data packet. In other embodiments, the container can be other sizes, for example a larger downlink allocation region, or container, filled with TSCP PDUs that are sized to be 2041 bytes each. The TSCP PDUs 3224 are then encapsulated into MAC common part sublayer (MCPS) PDUs 3230. The MCPS encapsulation adds a generic MAC header (GMH) 3232. In one embodiment, an IEEE 802.16-compatible 6-byte GMH is added to form the 802.16-compatible maximally sized 2047 byte MAC PDU. The MCPS PDUs 3232 are then encapsulated into data channel (DCH) PDUs 3234. In one embodiment, the DCH PDUs add a 2-byte CRC-16, item 3236. In another embodiment, an alternative container may be used, for example, a larger PDU in a "regular" PHY allocation region can be used and not have a CRC.

TSCP Transmit Side

On the transmit side, a list of containers, where a container is a descriptor that describes a contiguous sequence of bytes that can hold a TSCP PDU, is provided to the TSCP module. Not all containers in the list need to be the same size. The TSCP module consumes containers, which are really more like tokens, and issues one TSCP PDU per container. The TSCP module structures each TSCP PDU such that it fits exactly in a container and does not require lower layers to fragment the PDU. As noted, an aspect of this technique is that the TSCP module can partition data in an efficient manner to reduce overhead. In other words, there is always a one-to-one correspondence between a TSCP PDU and a container. Each entry in the container list is a field indicating the number of bytes in a container. In one embodiment, the order of containers in the list can define the transmission order. For example, the first entry in the list is transmitted first. In this way, a receiver will process the containers, and therefore TSCP PDUs, in the same order.

In one embodiment, given an OFDMA PHY frame structure, a scheduling protocol module, such as item 614 of FIG. 6, exports containers that will not be further fragmented. In one example, a container could be a 600 byte DCH packet which, after a 2 byte CRC is inserted by the PHY and a 6-byte Generic MAC Header (GMH) is inserted by the MAC, leaves a 592 byte container for the TSCP PDU. In other embodiments, containers for larger DCH allocation regions can be exported, each container leaving up to the maximum number of bytes for a MAC layer PDU, for example, 2047 bytes less the 6 byte MAC header, or 2041 bytes per container.

In one embodiment, a container can be no larger than 3010 bytes because the TSCP header (see FIG. 31) signals a maximum of 4 bits for a maximum of 16 TS packets (item 3110 in FIG. 31) per TSCP PDU and the TSCP header (item 3226 in FIG. 32) is 2 bytes. In another embodiment, a MAC layer may limit the container size maximum to 2041 bytes, which is 2047 less the 6 byte MAC GMH. In other embodiments, different container sizes can be used.

Figure 33:
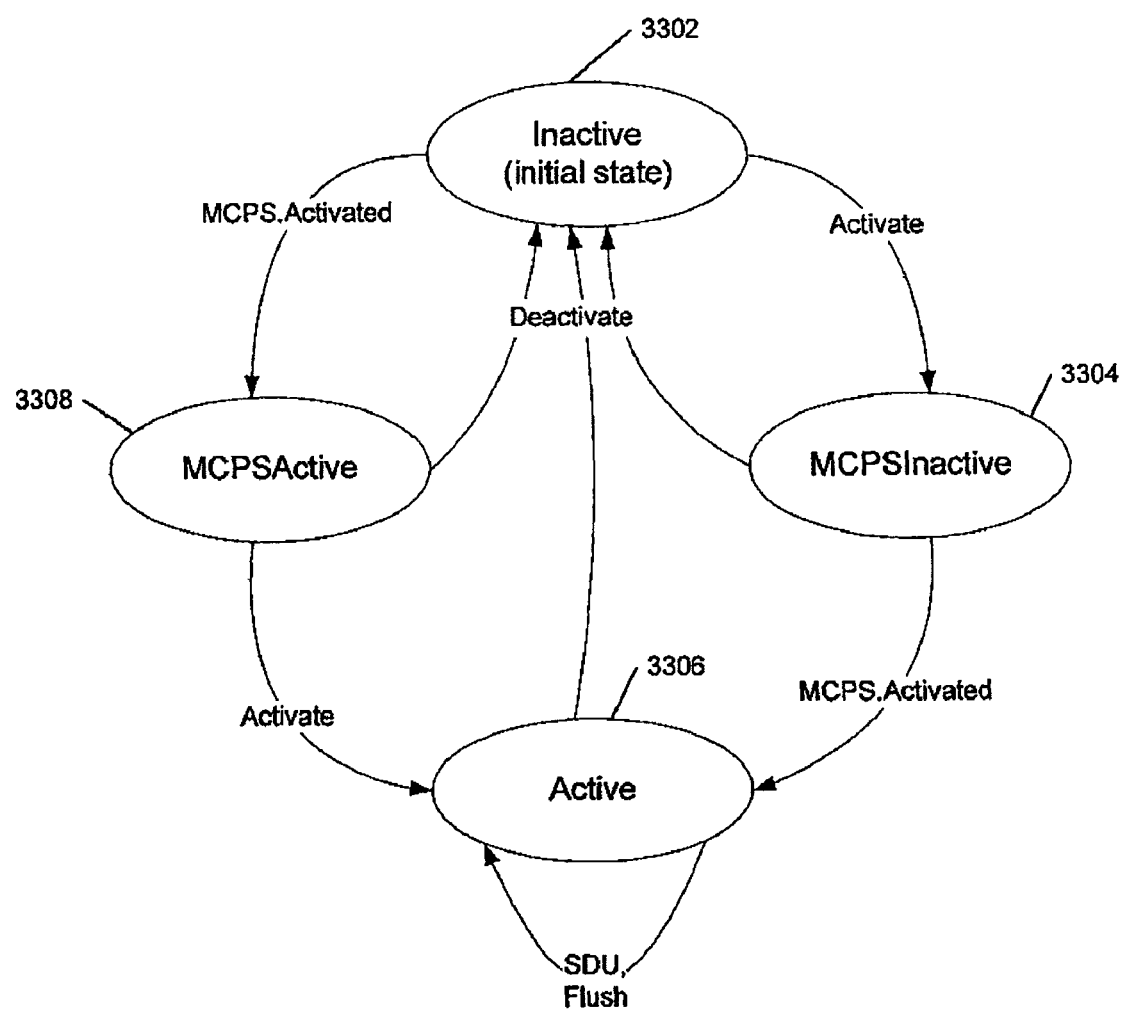
FIG. 33 is a state diagram illustrating an exemplary embodiment of a state machine of TSCP for the transmit, or base station, side or the broadcast system.

Following is a description of TSCP module states, command processing, and state transitions. FIG. 33 is a state diagram illustrating an exemplary embodiment of a state machine of TSCP for the transmit, or base station, side or the broadcast system. The state machine illustrates management of activation and synchronize with the MCPS protocol.

The TSCP module is initially in an inactive state 3302. If the TSCP module receives an activate command before the MCPS module is active, it transitions to an MCPS inactive state 3304. The TSCP module will remain in the MCPS inactive state 3304 until it receives a deactivate command and returns to the inactive state 3302, or it receives an indication that the MCPS has activated upon which it will transition to an active state 3306.

Returning to the inactive state 3302. If the TSCP module, while in the inactive state 3302 receives an indication that the MCPS is active the TSCP module will transition to the MCPS active state 3308. The TSCP module will remain in the MCPS active state 3308 until it receives a deactivate command and returns to the inactive state 3302, or it receives an activate command and it will transition to an active state 3306.

The TSCP module, upon entering the active state 3306, will remain in the active state 3306 servicing SDUs and transmitting PDUs until receiving a deactivate command when it transitions to the inactive state 3302. In the active state 3306, the TSCP module can perform a "flush" operation. A flush operation can be used by a transmitter to close a transport stream, or pause the flow of data. This will cause a container to be transmitted that isn't completely full. Using the packet count in the TSCP header, the receiver can detect how many TSCP PDUs are present in each container.

The state machine assumes that the TSCP and MCPS protocols are not deactivated independently. An implementation may consider state machine alternatives to deactivation and reactivation of MCPS and TSCP independently.

TSCP Receive Side

On the receive side, the TSCP module receives a TSCP PDU from the lower layer and extracts MPEG-2 TS packets. This process handles fragments of MPEG-2 TS packets, which can occur at the beginning of a TSCP PDU or at the end. An aspect of the process is to perform validation checks on the received TSCP PDU because the lower layer may not have validated the data, for example there was corrupted data and a CRC fails or a CRC check was not performed. In other words, in one interface, an air interface protocol stack can be defined so that it is allowed that lower layer protocols perform no CRC check.

Figure 34:
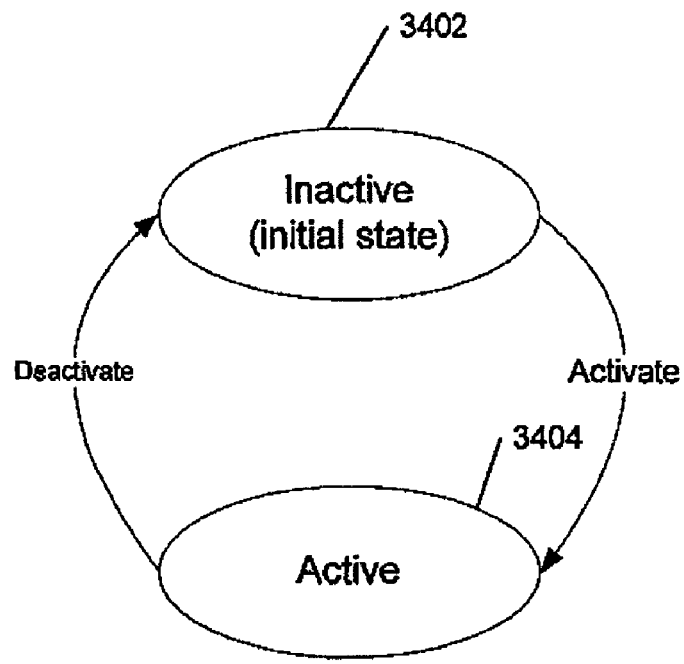
FIG. 34 is a state diagram illustrating an exemplary embodiment of a state machine of a TSCP module for the receive, or mobile station, side of the broadcast system.

FIG. 34 is a state diagram illustrating an exemplary embodiment of a state machine of a TSCP module for the receive, or mobile station, side of the broadcast system. The TSCP module in the receiver begins in an inactive state 3402. The TSCP module remains in the inactive state until receiving an activate command, when it transitions to an active state 3404. In the active state 3404, the TSCP module in the receiver will receive TSCP PDUs from the lower layer and extracts MPEG-2 TS packets to be communicated to a higher level protocol module. Upon receiving a deactivate command the TSCP module will transition to the inactive state 3402.

Signaling Convergence Protocol (SCP) Module

The signaling convergence protocol (SCP) module, for example item 612 in FIG. 6, coordinates transporting management and overhead messages from a transmitter, or base station, to a receiver, or mobile station. The SDUs of the SCP module are typically variable length. For each message, an upper layer bearer protocol is responsible for specifying the CID and whether fragmentation is allowed. The sending protocol can either be a bearer protocol or a control protocol. In one embodiment, the upper level protocol is a control protocol, for example a protocol for management overhead messages. The SCP module serves as an access point for management/overhead messages sent in the base station, and provides a demultiplexing service on the mobile station.

In one embodiment, the SCP module operates independently of the TSCP module, but the two modules can cooperate to share communication link bandwidth. For example, if bandwidth is consumed by the SCP module sending messages the bandwidth remaining for the TSCP module may be reduced. Reducing the bandwidth available o the TSCP module decreases the overall data rate. In one embodiment, this decrease in bandwidth available for the TSCP module can be mitigated by periodically decreasing the amount of data sent by the TSCP module, for example, periodically decreasing the amount of data used for forward error correction.

SCP Transmit Side

At the transmit side of the broadcast system, the SCP module receives an SDU from an upper layer bearer protocol that may be an arbitrary sequence of bytes. Along with each SDU, the upper layer bearer protocol supplies a connection identifier (CID). In one embodiment, some CID message flows do not permit fragmentation. For generality, the upper layer bearer protocol can signal use of fragmentation on a per-CID basis using conventional MAC fragmentation methods. In one embodiment, the PDU generated by SCP module is sent to the lower layer with no additional header or trailer structure. In this embodiment, the format of the PDU is identical to the SDU.

Figure 35:
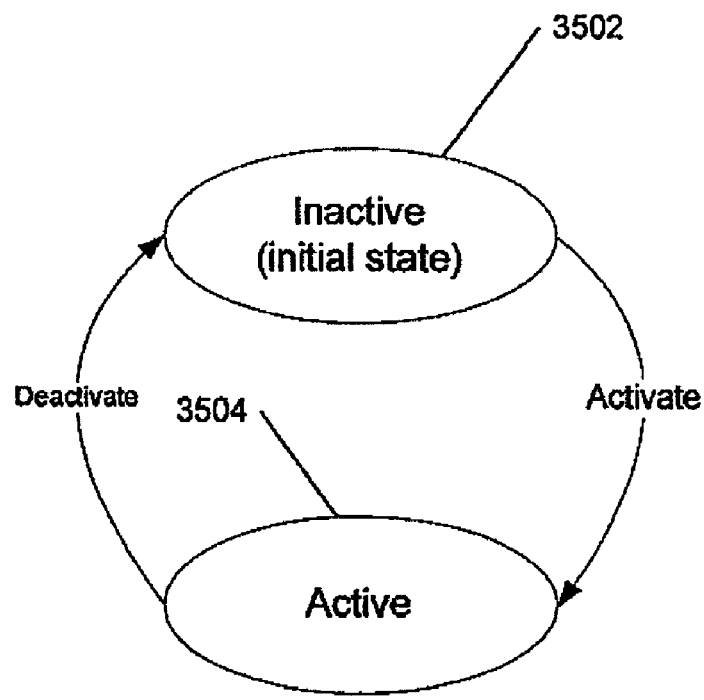
FIG. 35 is an state diagram illustrating an exemplary embodiment of a state machine of an SCP module for the transmit, or base station, side of the broadcast system.

FIG. 35 is a state diagram illustrating an exemplary embodiment of a state machine of an SCP module for the transmit, or base station, side of the broadcast system. The SCP module in the transmitter begins in an inactive state 3502. The SCP module remains in the inactive state 3502 until receiving an activate command, when it transitions to an active state 3504. In the active state 3504, the SCP module in the transmitter will receive SDUs from a sending protocol and forward them to a lower protocol. Upon receiving a deactivate command the SCP module will transition to the inactive state 3502

SCP Receive Side

At the receive side of the broadcast system, the SCP module receives an PDU from the lower layer protocol. The SCP module demultiplexes the received PDU to an appropriate receiving protocol based upon a CID message type included in the PDU.

Figure 36:
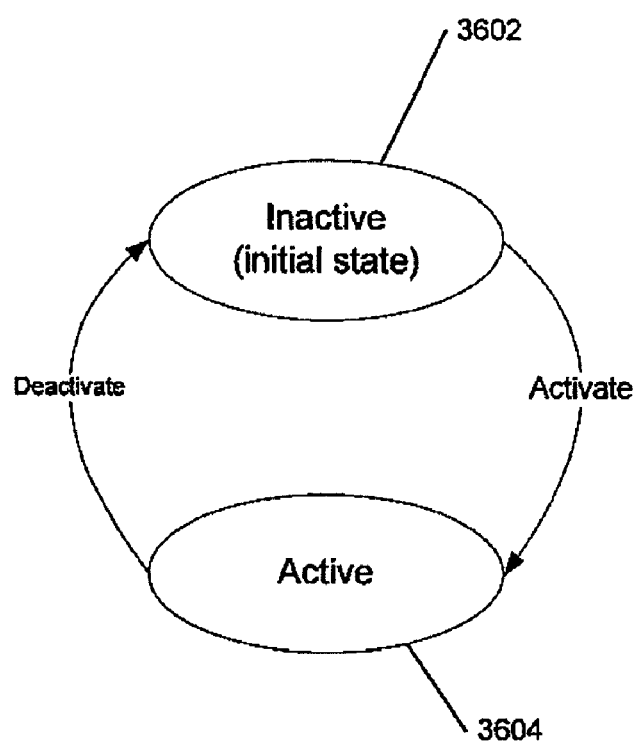
FIG. 36 is state diagram illustrating an exemplary embodiment of a state machine of a SCP module for the receive, or mobile station, side of the broadcast system.

FIG. 36 is state diagram illustrating an exemplary embodiment of a state machine of an SCP module for the receive, or mobile station, side of the broadcast system. The SCP module in the receiver begins in an inactive state 3602. The SCP module remains in the inactive state 3602 until receiving an activate command, when it transitions to an active state 3604. In the active state 3604, the SCP module in the receiver will receive PDUs that were transmitted by a transmitter, or base station, in the broadcast system, and produce SDUs. The SDUs are formatted to an appropriate protocol based on the CID message. Upon receiving a deactivate command the SCP module will transition to the inactive state 3602

Figure 37:
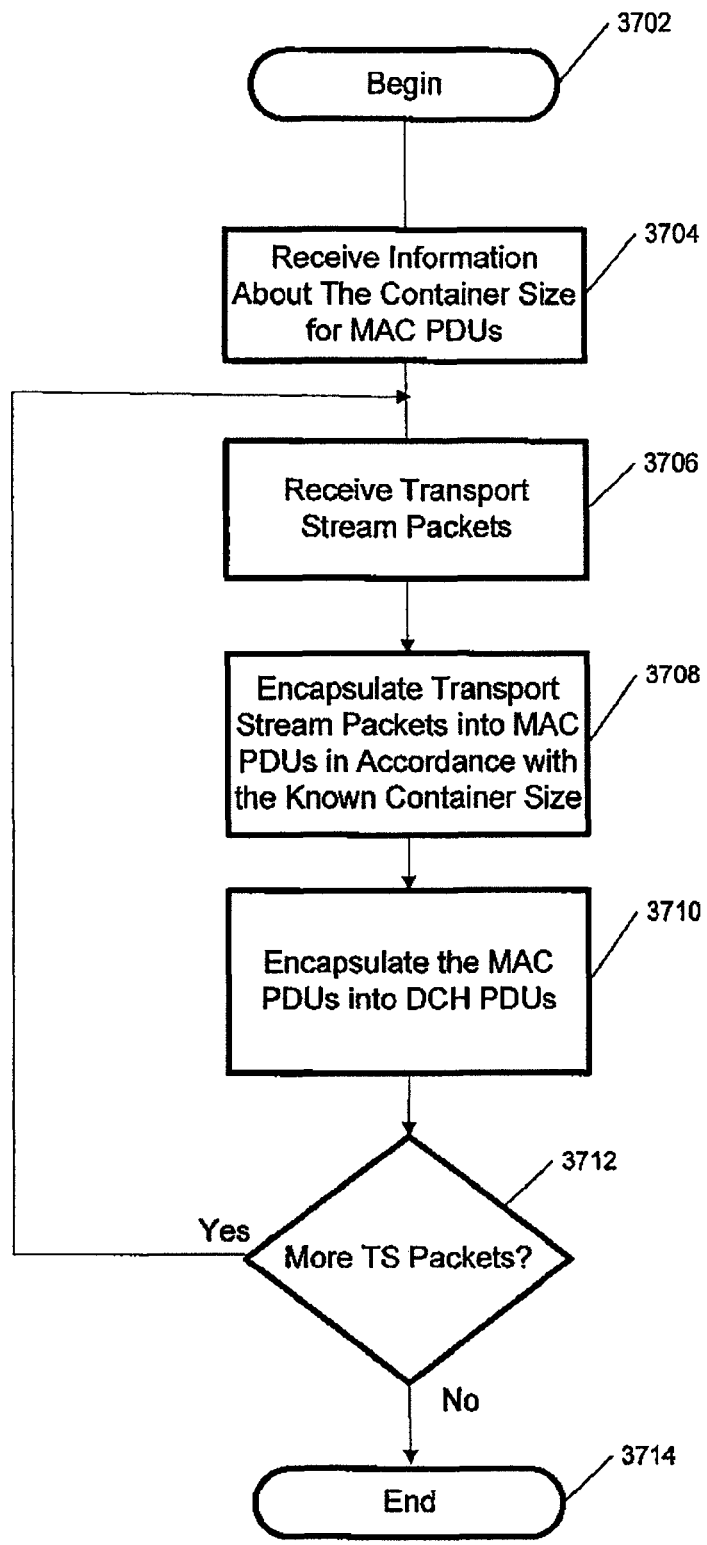
FIG. 37 is a flow diagram of an exemplary embodiment of a method of converging transport stream packets into MAC PDUs in a broad cast system according to the invention.

FIG. 37 is a flow diagram of an exemplary embodiment of a method of converging transport stream packets into MAC PDUs in a broad cast system according to the invention. As shown in FIG. 37, flow begins in block 3702. Flow continues to block 3704 where in formation about the size of MAC PDU containers is received. The container size can be received in different ways. For example, the container size can be communicated to the convergence layer from a lower level layer in the MAC or the PHY layer. Likewise, the size can be constant and known a priori, or the size can change intermittently and when the change occurs the new size information is communicated to the convergence layer.

Flow continues to block 3706 and a stream of transport packets are received. In one embodiment, the stream of transport packets are MPEG-2 transport packets. Flow continues to block 3708 and the stream of transport packets are encapsulated into TSCP PDUs which are then encapsulated by the MAC into MAC PDUs in accordance with the known container size. Then, in block 3710, the MAC PDUs are encapsulated into DCH PDUs for transmission over the air. Using knowledge of the container size allows the transport stream packets to be encapsulated into TSCP PDUs which are sized so that they that fit into the MAC PDU with no fragmentation at the MAC module. In this way improved efficiency, for example lower overhead, can be achieved.

Flow continues to block 3712 where it is determined if there are additional transport stream packets to be encapsulated. If there are additional transport stream packets to be encapsulated flow continues to block 3706 and additional transport packets are received. If, in block 3712, it is determined that there are no more transport stream packets to be encapsulated, flow continues to block 3714 and ends.

Figure 38:
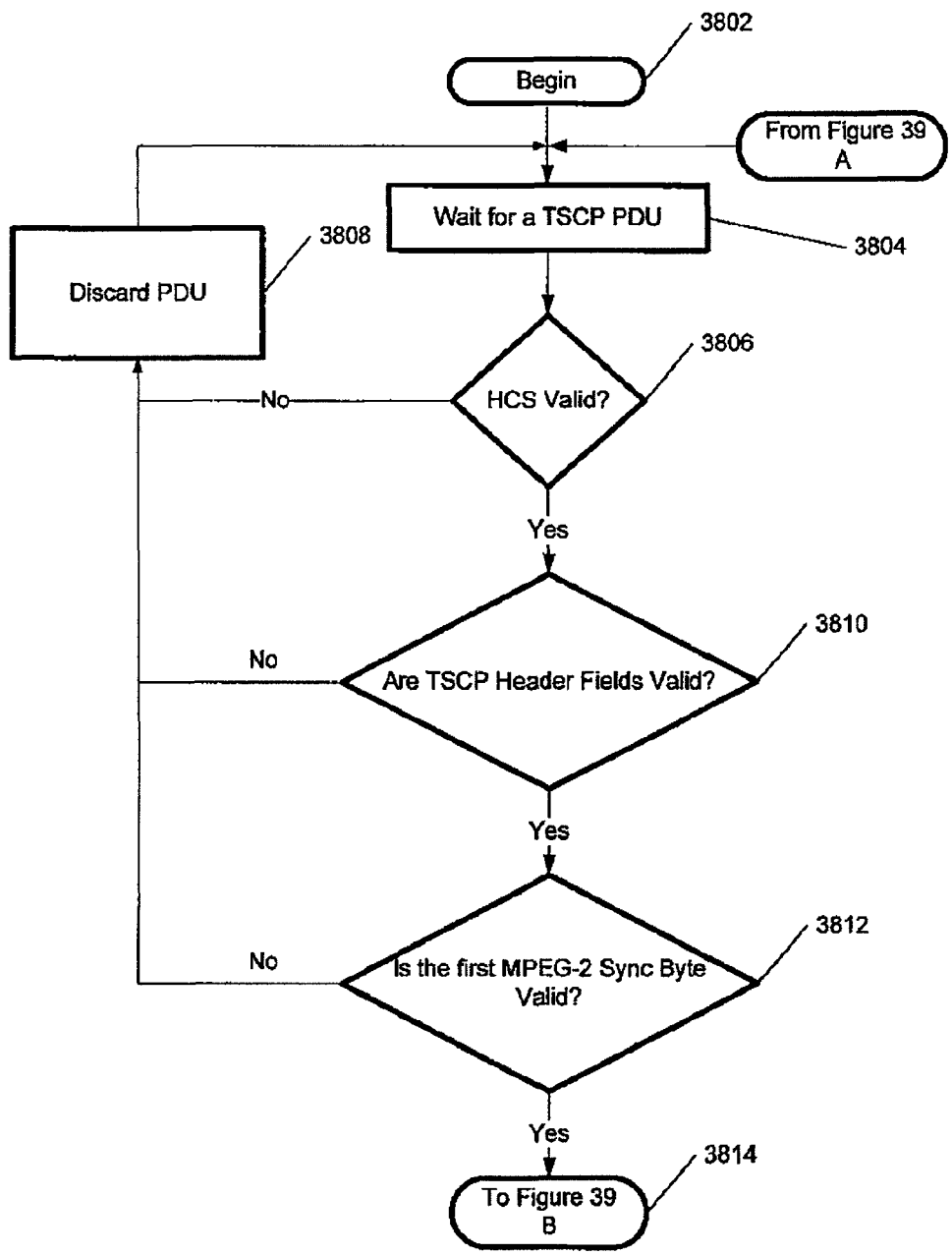
FIG. 38 is a flow diagram of an exemplary embodiment of a method of validating a TSCP packets.

FIG. 38 is a flow diagram of an exemplary embodiment of a method of receiving and validating a TSCP packets. Flow begins in block 3802. Flow continues to block 3804 where the system waits for a TSCP PDU to be received. As described below in connection with FIG. 39, flow to block 3804 can be from a process that extracts packets from the TSCP PDU. After receiving a TSCP PDU, flow continues to block 3806 where it is determined if a Header Check Sequence (HCS) is valid. If it is determined that the HCS is not valid, then flow continues to block 3808 and the PDU is discarded. Flow continues from block 3808 to block 3804 where the system waits for another TSCP PDU to be received.

Returning to block 3806, if it is determined that the HCS is valid, then flow continues to block 3810. In block 3810 it is determined if the TSCP header fields are valid. For example, it can be determined if the TS head fragment in the TS head fragment field is a valid value, if the TS fragment bytes field is a valid value, if the TS packet count field is a valid value, or any combination of header fields can be check to determine if they are valid values. If, in block 3810, it is determined that a TSCP header field is invalid, then flow continues to block 3808 and the PDU is discarded. Flow then continues to block 3804 and the system waits for another TCSP PDU to be received.

Returning to block 3810, if it is determined that the TSCP header fields are valid, then flow continues to block 3812. In block 3812 it is determined if the MPEG-2 sync byte of the first MPEG-2 TS packet in the PDU is valid. If it is determined that it is not valid, then flow continues to block 3808 and the PDU is discarded. Flow then continues to block 3804 and the system waits for another TCSP PDU to be received. In another embodiment, if it is determined that first MPEG-2 sync byte is not valid, the system could search for the next sync byte in the TSCP PDU and attempt to recover some MPEG-2 TS packets rather than discarding the PDU.

Returning to block 3812, if it is determined that the MPEG-2 sync byte of the first MPEG-2 TS packet is valid, then flow continues to block 3814. In block 3814 flow continues to the flow chart of FIG. 39.

Figure 39:
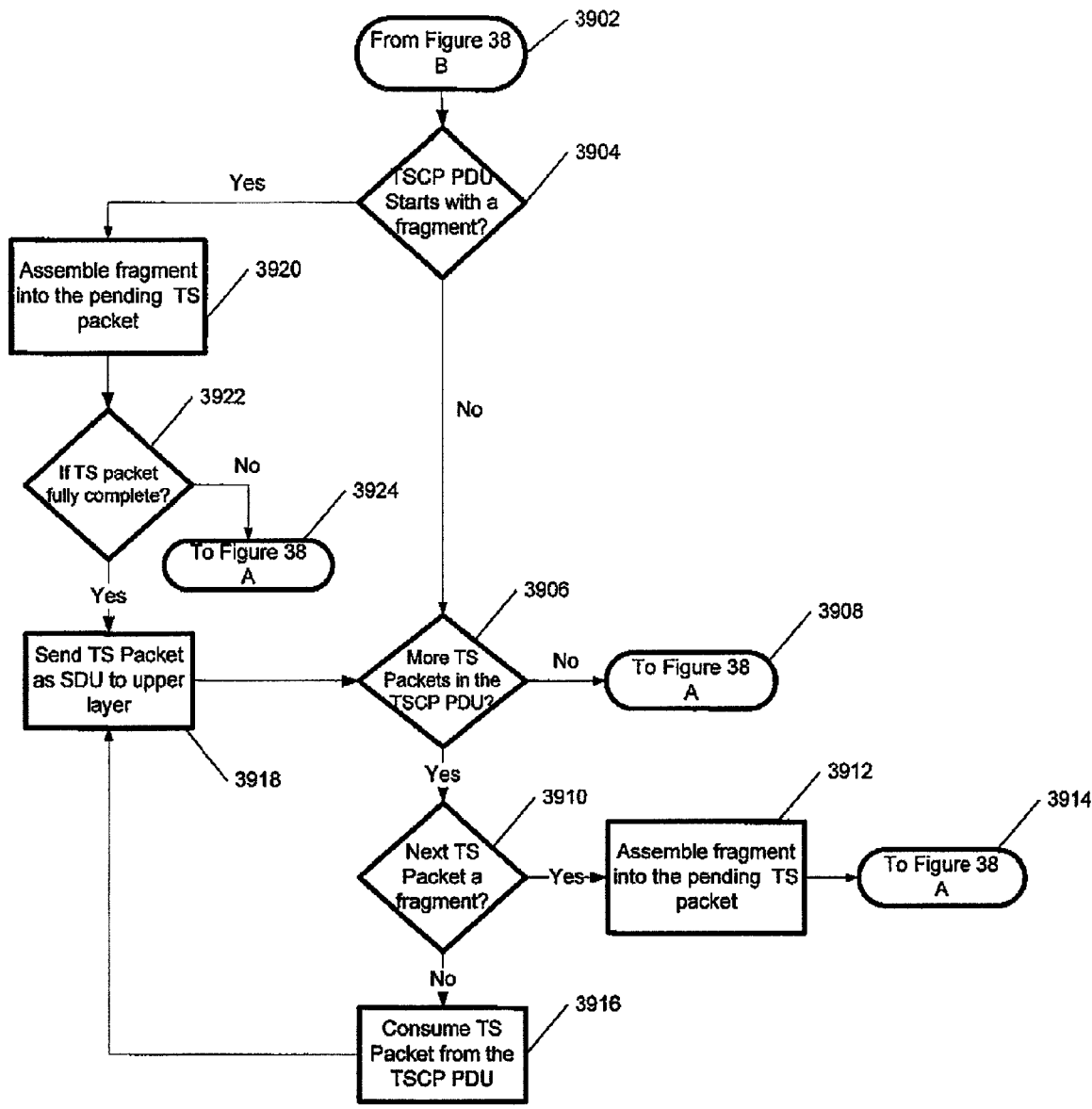
FIG. 39 is a flow diagram of an exemplary embodiment of a method of extracting MPEG-2 TS packets from a TSCP packet.

FIG. 39 is a flow diagram of an exemplary embodiment of a method of extracting MPEG-2 TS packets from a TSCP packet. In FIG. 39, flow begins in block 3902. Flow then continues to block 3904 where it is determined if the TSCP PDU starts with a fragment. Or, explained another way, in block 3904 it is determined if the first MPEG-2 TS packet in the TSCP PDU is not a full MPEG-2 TS packet, but a fragment of an MPEG-2 TS packet. If the TSCP PDU does not start with a fragment, then flow continues to block 3906. In block 3906 it is determined if there are more TS packets in the TSCP PDU. If it is determined that here are no more TS packets, then flow continues to block 3908. In block 3908 flow continues to block 3804 of FIG. 38 and the system waits for another TSCP PDU to be received.

Returning to block 3906, if it is determined that there are more TS packets in the TSCP PDU, then flow continues to block 3910. In block 3910 it is determined if the next TS packet is a fragment. If the next TS packet is a fragment, then flow continues to block 3912. In block 3912 the fragment is assembled into the pending TS packet. Flow then continues to block 3914 where flow continues to block 3804 of FIG. 38 and the system waits for another TSCP PDU to be received, which is expected to have the remaining fragment of the TS packet.

Returning to block 3910, if it is determined that the next TS packet is not a fragment, then flow continues to block 3916 and the TS packet from the TSCP is consumed. Flow then continues to block 3918. In block 3918 the TS packet is sent to an upper layer as a TSCP SDU. Flow then continues to block 3906 where it is determined if there are more TS packets in the TSCP PDU.

Returning to block 3904, if it is determined that the TSCP PDU starts with a fragment, then flow continues to block 3920. In block 3920 the fragment is assembled into the ending TS packet. Flow then continues to block 3922 where it is determined if the TS packet is fully complete. If it is determined that the TS packet is fully complete, then flow continues to block 3918 and the TS packet is sent to the upper layer as an SDU.

In another embodiment the MPEG-2 sync byte in each TS packet can be verified. If the sync byte is not valid, then the process would not forward SDUs to the upper layer.

Returning to block 3922, if it is determined that the TS packet is not fully complete, then flow continues to block 3924. In block 3924 flow continues to block 3804 of FIG. 38 and the system waits for another TSCP PDU to be received, which is expected to have the remaining fragment of the TS packet.

The above description of the disclosed embodiments is provided to enable any person skilled in the art to make or use the invention. Numerous modifications to these embodiments would be readily apparent to those skilled in the art, and the principals defined herein can be applied to other embodiments without departing from the spirit or scope of the invention. Thus, the invention is not intended to be limited to the embodiments shown herein but is to be accorded the widest scope consistent with the principal and novel features disclosed herein.

Various implementations of the invention are realized in electronic hardware, computer software, or combinations of these technologies. Some implementations include one or more computer programs executed by one or more computing devices. For example, in one implementation, the method for monitoring and/or converting the status, running diagnostics, and otherwise providing functions related to status and management of the wireless communication device includes one or more computers executing software implementing the monitoring and management functions. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A method of broadcasting data over a wireless access network, the method comprising:
  receiving one or more content streams of IP packets and processing the IP packets to obtain transport stream convergence (TSC) protocol data units (PDUs) based on a container size established for each respective content stream of the one or more content streams;
  assigning a connection identifier (CID) to each TSC PDU, wherein the CID identifies a content stream of the one or more content streams corresponding to a respective TSC PDU;
  mapping each TSC PDU to one medium access control (MAC) PDU and scheduling the MAC PDUs for transmission; and
  constructing a frame from the TSC PDUs obtained from the one or more content streams based on the CID assigned to each TSC PDU and broadcasting a signal that includes the frame.

2. The method of claim 1, further comprising distributing the signal that includes the frame to one or more transmitters in a particular geographical area and coordinating broadcast of the signal from the one or more transmitters to enable reception of the same signal in any location in the geographical area.

3. The method of claim 2, further comprising synchronizing the one or more transmitters based on a reference time signal.

4. The method of claim 2, wherein each of the one or more transmitters broadcasts the same signal over an air interface via at least one antenna.

5. The method of claim 1, wherein the signal is an Orthogonal Frequency Division Modulation (OFDM) signal.

6. The method of claim 1, wherein the one or more streams of IP packets comprises Motion Picture Expert Group (MPEG) transport packets.

7. The method of claim 1, wherein the one or more streams of IP packets comprises multimedia data.

8. The method of claim 1, wherein the one or more streams of IP packets comprises a television network program.

9. The method of claim 1, wherein the one or more streams of IP packets comprises an electronic program guide.

10. The method of claim 1, wherein the container size is predetermined.

11. The method of claim 1, wherein the container size of the MAC protocol data units is based upon a maximum size provisioned for the MAC PDU.

12. A transmitter system for a wireless access network, comprising:
  a first module configured to:
    receive one or more content streams of IP packets, process the IP packets to obtain transport stream convergence (TSC) protocol data units (PDUs) based on a container size established for each respective content stream of the one or more content streams, and
    assign a connection identifier (CID) to each TSC PDU, wherein the connection identifier identifies a content stream of the one or more content steams corresponding to a respective TSC PDU of the TSC PDUs;

a second module configured to map each TSC PDU to one medium access control (MAC) PDU and schedule the MAC PDUs for transmission; and a transmitter configured to construct a frame from the TSC PDUs obtained from the one or more content streams based on the CID assigned to each TSC PDU and broadcast a signal that includes the frame.

13. The transmitter system of claim 12, wherein the IP packets are formatted using a transport packet protocol standard to obtain Motion Picture Expert Group (MPEG) transport packets.

14. The transmitter system of claim 12, wherein the TSC PDUs comprise multimedia data.

15. The transmitter system of claim 12, wherein the TSC PDUs comprise a television network program.

16. The transmitter system of claim 12, wherein the TSC PDUs comprise an electronic program guide.

17. The transmitter system of claim 12 wherein the container size is predetermined.

18. The transmitter system of claim 12, wherein the container size is based upon a size dimension of a maximum transmission unit.

19. The transmitter system of claim 12, further comprising an adapter for providing the MAC protocol data units to additional transmitters that are synchronized to the transmitter in a single frequency network so that each transmitter in the single frequency network broadcasts the same signal that includes the MAC protocol data units.

20. The transmitter system of claim 19, wherein the signal broadcast from each transmitter of the single frequency network comprises an Orthogonal Frequency Division Modulation (OFDM) signal.

21. The transmitter system of claim 19, wherein each transmitter broadcasts the same signal over an air interface via at least one antenna.

* * * * *